United States Patent
Kobayashi et al.

(10) Patent No.: US 9,781,727 B2
(45) Date of Patent: Oct. 3, 2017

(54) WIRELESS COMMUNICATION SYSTEM, COMMUNICATION CONTROL METHOD, CONTROL DEVICE, CONTROL METHOD, CONTROL PROGRAM, AND WIRELESS TERMINAL

(71) Applicant: FUJITSU LIMITED, Kawasaki-shi, Kanagawa (JP)

(72) Inventors: Takaharu Kobayashi, Yamato (JP); Dai Kimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 150 days.

(21) Appl. No.: 14/609,209

(22) Filed: Jan. 29, 2015

(65) Prior Publication Data
US 2015/0146664 A1    May 28, 2015

Related U.S. Application Data

(63) Continuation of application No. PCT/JP2012/082537, filed on Dec. 14, 2012, and a continuation of application No. PCT/JP2012/069327, filed on Jul. 30, 2012.

(51) Int. Cl.
| | |
|---|---|
| *H04W 72/08* | (2009.01) |
| *H04W 48/20* | (2009.01) |
| *H04W 72/06* | (2009.01) |
| *H04W 72/04* | (2009.01) |
| *H04W 76/02* | (2009.01) |

(52) U.S. Cl.
CPC .......... *H04W 72/08* (2013.01); *H04W 48/20* (2013.01); *H04W 72/048* (2013.01); *H04W 72/06* (2013.01); *H04W 76/02* (2013.01)

(58) Field of Classification Search
None
See application file for complete search history.

(56) References Cited

U.S. PATENT DOCUMENTS

| | | |
|---|---|---|
| 2004/0053606 A1 | 3/2004 | Artamo et al. |
| 2004/0053630 A1 | 3/2004 | Ramos et al. |
| 2004/0057402 A1 | 3/2004 | Ramos et al. |
| 2004/0132486 A1 | 7/2004 | Halonen et al. |

(Continued)

FOREIGN PATENT DOCUMENTS

| | | |
|---|---|---|
| JP | 2000-295650 A | 10/2000 |
| JP | 2008-035563 A | 2/2008 |

(Continued)

OTHER PUBLICATIONS

Office Action of Japanese Patent Application No. 2014-527939 dated Apr. 5, 2016 with partial translation.

(Continued)

*Primary Examiner* — Edan Orgad
*Assistant Examiner* — Saumit Shah
(74) *Attorney, Agent, or Firm* — Arent Fox LLP

(57) ABSTRACT

Connection destinations of a plurality of wireless terminals are selected from a plurality of connection destination candidates to maximize an evaluation value based on each of data rates in cases where each of the wireless terminals is connected to each of the connection destination candidates and each of resource allocation rates for each of the wireless terminals at each of the connection destination candidates.

28 Claims, 41 Drawing Sheets

(56) References Cited

U.S. PATENT DOCUMENTS

| | | | |
|---|---|---|---|
| 2004/0203819 A1* | 10/2004 | Das | H04W 28/14 |
| | | | 455/452.1 |
| 2012/0026986 A1* | 2/2012 | Dass | H04W 72/085 |
| | | | 370/336 |
| 2012/0127869 A1 | 5/2012 | Yin et al. | |
| 2012/0294256 A1* | 11/2012 | Yoshida | H04L 1/16 |
| | | | 370/329 |
| 2013/0252625 A1 | 9/2013 | Benjebbour et al. | |
| 2014/0349647 A1* | 11/2014 | Chen | H04W 36/30 |
| | | | 455/436 |

FOREIGN PATENT DOCUMENTS

| | | | |
|---|---|---|---|
| JP | 2008-288627 A | 11/2008 | |
| JP | 2010-056652 A | 3/2010 | |
| JP | 2010-130494 A | 6/2010 | |
| JP | WO 2011096221 A1 * | 8/2011 | H04L 1/16 |
| JP | 2011-239391 A | 11/2011 | |
| JP | 2012-010018 A | 1/2012 | |
| JP | 2012-095106 A | 5/2012 | |
| JP | 2012-114814 A | 6/2012 | |
| WO | WO 2012/070672 A1 | 5/2012 | |

OTHER PUBLICATIONS

International Search Report and partial translation of the relevant part of the Written Opinion of the International Searching Authority for PCT/JP2012/082537 dated Mar. 19, 2013.

* cited by examiner

FIG. 6

| | CELL #1 | CELL #2 | CELL #3 | CELL #4 | CELL #5 | CELL #6 | CELL #7 | CELL #8 | CELL #9 |
|---|---|---|---|---|---|---|---|---|---|
| USER #1 | 18.24 | 0.00 | 0.00 | 27.54 | 0.00 | 0.00 | 28.27 | 0.00 | 0.00 |
| USER #2 | 10.93 | 0.00 | 1.59 | 10.95 | 0.00 | 1.59 | 10.97 | 0.00 | 1.59 |
| USER #3 | 6.25 | 0.00 | 0.00 | 1.86 | 0.00 | 0.00 | 5.94 | 0.00 | 0.00 |
| USER #4 | 15.88 | 0.00 | 0.00 | 7.09 | 0.00 | 0.00 | 16.37 | 0.00 | 0.00 |
| USER #5 | 4.89 | 0.00 | 4.54 | 4.89 | 0.00 | 4.53 | 4.84 | 0.00 | 4.48 |
| USER #6 | 3.32 | 3.32 | 3.32 | 3.34 | 3.34 | 3.34 | 3.37 | 3.37 | 3.37 |
| USER #7 | 5.64 | 1.77 | 0.72 | 0.52 | 0.00 | 0.00 | 4.01 | 1.38 | 0.32 |
| USER #8 | 0.00 | 14.96 | 0.00 | 0.00 | 7.24 | 0.00 | 0.00 | 6.58 | 0.00 |
| USER #9 | 0.00 | 5.06 | 0.00 | 0.00 | 14.03 | 0.00 | 0.00 | 1.75 | 0.00 |
| USER #10 | 1.43 | 8.65 | 1.54 | 0.00 | 10.64 | 0.00 | 1.50 | 9.60 | 0.00 |
| USER #11 | 0.48 | 0.00 | 11.85 | 0.55 | 0.00 | 16.05 | 0.55 | 0.00 | 16.02 |
| USER #12 | 0.00 | 0.00 | 13.98 | 0.00 | 0.00 | 10.15 | 0.00 | 0.00 | 11.01 |
| USER #13 | 0.00 | 0.00 | 24.21 | 0.00 | 0.00 | 22.72 | 0.00 | 0.00 | 26.11 |
| USER #14 | 0.55 | 0.00 | 16.09 | 0.55 | 0.00 | 16.01 | 0.55 | 0.00 | 16.20 |
| USER #15 | 0.00 | 0.00 | 23.56 | 0.00 | 0.00 | 23.54 | 0.00 | 0.00 | 23.41 |
| USER #16 | 0.00 | 0.00 | 8.82 | 0.00 | 0.00 | 0.00 | 0.00 | 0.00 | 1.28 |

UNIT: Mbps

FIG. 10

| USER / | CELL #1 | CELL #2 | CELL #3 | CELL #4 | CELL #5 | CELL #6 | CELL #7 | CELL #8 | CELL #9 |
|---|---|---|---|---|---|---|---|---|---|
| USER #1 | 0.06 | 0.06 | 0.06 | 0.06 | 0.06 | 0.06 | 0.06 | 0.06 | 0.06 |
| USER #2 | 0.06 | 0.06 | 0.06 | 0.06 | 0.06 | 0.06 | 0.06 | 0.06 | 0.06 |
| USER #3 | 0.06 | 0.06 | 0.06 | 0.06 | 0.06 | 0.06 | 0.06 | 0.06 | 0.06 |
| USER #4 | 0.06 | 0.06 | 0.06 | 0.06 | 0.06 | 0.06 | 0.06 | 0.06 | 0.06 |
| USER #5 | 0.06 | 0.06 | 0.06 | 0.06 | 0.06 | 0.06 | 0.06 | 0.06 | 0.06 |
| USER #6 | 0.06 | 0.06 | 0.06 | 0.06 | 0.06 | 0.06 | 0.06 | 0.06 | 0.06 |
| USER #7 | 0.06 | 0.06 | 0.06 | 0.06 | 0.06 | 0.06 | 0.06 | 0.06 | 0.06 |
| USER #8 | 0.06 | 0.06 | 0.06 | 0.06 | 0.06 | 0.06 | 0.06 | 0.06 | 0.06 |
| USER #9 | 0.06 | 0.06 | 0.06 | 0.06 | 0.06 | 0.06 | 0.06 | 0.06 | 0.06 |
| USER #10 | 0.06 | 0.06 | 0.06 | 0.06 | 0.06 | 0.06 | 0.06 | 0.06 | 0.06 |
| USER #11 | 0.06 | 0.06 | 0.06 | 0.06 | 0.06 | 0.06 | 0.06 | 0.06 | 0.06 |
| USER #12 | 0.06 | 0.06 | 0.06 | 0.06 | 0.06 | 0.06 | 0.06 | 0.06 | 0.06 |
| USER #13 | 0.06 | 0.06 | 0.06 | 0.06 | 0.06 | 0.06 | 0.06 | 0.06 | 0.06 |
| USER #14 | 0.06 | 0.06 | 0.06 | 0.06 | 0.06 | 0.06 | 0.06 | 0.06 | 0.06 |
| USER #15 | 0.06 | 0.06 | 0.06 | 0.06 | 0.06 | 0.06 | 0.06 | 0.06 | 0.06 |
| USER #16 | 0.06 | 0.06 | 0.06 | 0.06 | 0.06 | 0.06 | 0.06 | 0.06 | 0.06 |

FIG. 11

| | CELL #1 | CELL #2 | CELL #3 | CELL #4 | CELL #5 | CELL #6 | CELL #7 | CELL #8 | CELL #9 |
|---|---|---|---|---|---|---|---|---|---|
| USER #1 | 0.00 | 0.00 | 0.00 | 0.00 | 0.00 | 0.00 | 0.50 | 0.00 | 0.00 |
| USER #2 | 0.00 | 0.00 | 0.00 | 0.50 | 0.00 | 0.00 | 0.00 | 0.00 | 0.00 |
| USER #3 | 0.50 | 0.00 | 0.00 | 0.00 | 0.00 | 0.00 | 0.50 | 0.00 | 0.00 |
| USER #4 | 0.00 | 0.00 | 0.00 | 0.50 | 0.00 | 0.00 | 0.00 | 0.00 | 0.00 |
| USER #5 | 0.00 | 0.00 | 0.00 | 0.00 | 0.00 | 0.00 | 0.00 | 0.00 | 0.00 |
| USER #6 | 0.00 | 0.22 | 0.00 | 0.00 | 0.00 | 0.00 | 0.00 | 0.56 | 0.00 |
| USER #7 | 0.50 | 0.00 | 0.00 | 0.00 | 0.00 | 0.00 | 0.00 | 0.00 | 0.00 |
| USER #8 | 0.00 | 0.78 | 0.00 | 0.00 | 0.00 | 0.00 | 0.00 | 0.00 | 0.00 |
| USER #9 | 0.00 | 0.00 | 0.00 | 0.00 | 0.70 | 0.00 | 0.00 | 0.00 | 0.00 |
| USER #10 | 0.00 | 0.00 | 0.00 | 0.00 | 0.30 | 0.50 | 0.00 | 0.44 | 0.00 |
| USER #11 | 0.00 | 0.00 | 0.50 | 0.00 | 0.00 | 0.00 | 0.00 | 0.00 | 0.00 |
| USER #12 | 0.00 | 0.00 | 0.00 | 0.00 | 0.00 | 0.00 | 0.00 | 0.00 | 0.00 |
| USER #13 | 0.00 | 0.00 | 0.00 | 0.00 | 0.00 | 0.50 | 0.00 | 0.00 | 0.50 |
| USER #14 | 0.00 | 0.00 | 0.50 | 0.00 | 0.00 | 0.50 | 0.00 | 0.00 | 0.50 |
| USER #15 | 0.00 | 0.00 | 0.00 | 0.00 | 0.00 | 0.00 | 0.00 | 0.00 | 0.00 |
| USER #16 | 0.00 | 0.00 | 0.00 | 0.00 | 0.00 | 0.00 | 0.00 | 0.00 | 0.00 |

FIG. 16

| | k=1 | k=2 |
|---|---|---|
| Cell#1(Macro) | $P_M$ | 0 |
| Cell#2(Pico) | $P_P$ | $P_P$ |
| Cell#3(Macro) | $P_M$ | 0 |
| Cell#4(Pico) | $P_P$ | $P_P$ |

FIG. 17

- PROBLEM $$\frac{1}{N_{UE}} \sum_{n=1}^{N_{UE}} \log T_n \to \max$$

- CONSTRAINT CONDITION $$p_{n,i,k} \geq 0 (n=1,\cdots,N_{UE}, i=1,\cdots,N_{Cell}, k=1,\cdots,N_k)$$

$$\sum_{n=1}^{N_{UE}} p_{n,i,k} = \beta_{i,k} (i=1,\cdots,N_{Cell}, k=1,\cdots,N_k)$$

FIG. 18

| | k=1 | k=2 |
|---|---|---|
| Cell#1(Macro) | 1 − α | 0 |
| Cell#2(Pico) | 1 − α | α |
| Cell#3(Macro) | 1 − α | 0 |
| Cell#4(Pico) | 1 − α | α |

FIG. 21

| | k=1 | k=2 |
|---|---|---|
| Cell#1(Macro) | $P_m$ | $P_m - \delta$ |
| Cell#2(Pico) | $P_p$ | $P_p$ |
| Cell#3(Macro) | $P_m$ | $P_m - \delta$ |
| Cell#4(Pico) | $P_p$ | $P_p$ |

FIG. 22

|  | k=1 | k=2 |
|---|---|---|
| Cell#1(Macro) | 1−α | α |
| Cell#2(Pico) | 1−α | α |
| Cell#3(Macro) | 1−α | α |
| Cell#4(Pico) | 1−α | α |

FIG. 24

|  | k=1 | k=2 | k=3 | k=4 |
|---|---|---|---|---|
| Cell#1(Macro) | $P_m$ | 0 | 0 | $P_m$ |
| Cell#2(Pico) | $P_p$ | $P_p$ | $P_p$ | $P_p$ |
| Cell#3(Macro) | $P_m$ | 0 | $P_m$ | 0 |
| Cell#4(Pico) | $P_p$ | $P_p$ | $P_p$ | $P_p$ |

FIG. 25

|  | k=1 | k=2 | k=3 | k=4 |
|---|---|---|---|---|
| Cell#1(Macro) | $\alpha_0$ | 0 | 0 | $\alpha_3$ |
| Cell#2(Pico) | $\alpha_0$ | $\alpha_1$ | $\alpha_2$ | $\alpha_3$ |
| Cell#3(Macro) | $\alpha_0$ | 0 | $\alpha_2$ | 0 |
| Cell#4(Pico) | $\alpha_0$ | $\alpha_1$ | $\alpha_2$ | $\alpha_3$ |

FIG. 27

| | k=1 | k=2 | k=3 | k=4 |
|---|---|---|---|---|
| Cell#1(Macro) | $P_m$ | $P_m - \delta$ | $P_m - \delta$ | $P_m$ |
| Cell#2(Pico) | $P_p$ | $P_p$ | $P_p$ | $P_p$ |
| Cell#3(Macro) | $P_m$ | $P_m - \delta$ | $P_m$ | $P_m - \delta$ |
| Cell#4(Pico) | $P_p$ | $P_p$ | $P_p$ | $P_p$ |

FIG. 28

|              | k=1        | k=2        | k=3        | k=4        |
|--------------|------------|------------|------------|------------|
| Cell#1(Macro)| $\alpha_0$ | $\alpha_1$ | $\alpha_2$ | $\alpha_3$ |
| Cell#2(Pico) | $\alpha_0$ | $\alpha_1$ | $\alpha_2$ | $\alpha_3$ |
| Cell#3(Macro)| $\alpha_0$ | $\alpha_1$ | $\alpha_2$ | $\alpha_3$ |
| Cell#4(Pico) | $\alpha_0$ | $\alpha_1$ | $\alpha_2$ | $\alpha_3$ |

WIRELESS COMMUNICATION SYSTEM, COMMUNICATION CONTROL METHOD, CONTROL DEVICE, CONTROL METHOD, CONTROL PROGRAM, AND WIRELESS TERMINAL

CROSS-REFERENCE TO RELATED APPLICATION

This application is a continuation application of International Application PCT/JP2012/082537, filed on Dec. 14, 2012 and designated the U.S., which is based upon and claims the benefit of priority of the prior International Application PCT/JP2012/069327, filed on Jul. 30, 2012. The entire contents of these applications are incorporated herein by reference.

FIELD

The present invention relates to a wireless communication system, a communication control method, a control device, a control method, a control program, and a wireless terminal.

BACKGROUND

A wireless communication system selects at least one connection destination from a plurality of connection destination candidates such as cells provided by wireless base stations, and each wireless terminal which is user equipment (UE) performs communication with a wireless base station through the selected connection destination. In addition, the cell selected as the connection destination may be also referred to as a serving cell.

Patent Literature 1 (Japanese Laid-open Patent Publication No. 2012-95106) discloses a method of improving a throughput at a sector boundary and improving fairness of a user throughput at a sector center and boundary by performing coordinated transmission between neighboring sectors according to a coordinated cluster pattern.

Further, Patent Literature 2 (Japanese Laid-open Patent Publication No. 2011-239391) discloses a method of improving a system throughput by deleting on a timely basis a secondary component carrier which does not satisfy a predetermined rule based on sector channel quality parameters reported from a terminal.

Furthermore, Patent Literature 3 (Japanese Laid-open Patent Publication No. 2010-56652) discloses a method of improving frequency use efficiency by selecting a plurality of terminal stations for which transmission rates are maximum per multiplexing combination pattern of a base station and a plurality of relay stations, and selecting a pattern for which sum of transmission rates of these terminal stations is maximum.

SUMMARY

There is a method of, when user equipment selects a connection destination, selecting the connection destination of the user equipment based on reception strength and reception quality of a wireless signal at each connection destination candidate.

However, the selecting method does not take into account a load balance between users, and therefore the users concentrate on a connection destination candidate whose propagation environment is good and, as a result, a throughput of the wireless communication system lowers.

(1) According to a first aspect of the present disclosure, a wireless communication system is provided. The wireless communication system has: a plurality of wireless terminals; and a control device which selects connection destinations of the plurality of wireless terminals from a plurality of connection destination candidates, and in which the control device includes a processor which selects the connection destinations of the plurality of wireless terminals from the plurality of connection destination candidates to maximize an evaluation value based on each of data rates in cases where each of the wireless terminals is connected to each of the connection destination candidates and each of resource allocation rates for each of the wireless terminals at each of the connection destination candidates, and each of the wireless terminals includes a communicator which performs wireless communication through the connection destinations selected by the processor.

(2) Further, according to a second aspect of the present disclosure, a communication control method of a wireless communication system is provided. The wireless communication system has: a plurality of wireless terminals; and a control device which selects connection destinations of the plurality of wireless terminals from a plurality of connection destination candidates. The control device selects the connection destinations of the plurality of wireless terminals from the plurality of connection destination candidates to maximize an evaluation value based on each of data rates in cases where each of the wireless terminals is connected to each of the connection destination candidates and each of resource allocation rates for each of the wireless terminals at each of the connection destination candidates, and each of the wireless terminals performs wireless communication through the connection destination selected by the control device.

(3) Furthermore, according to a third aspect of the present disclosure, a control device of a wireless communication system is provided. The wireless communication system has: a plurality of wireless terminals; and the control device which selects connection destinations of the plurality of wireless terminals from a plurality of connection destination candidates. The control device has a processor which selects the connection destinations of the plurality of wireless terminals from the plurality of connection destination candidates to maximize an evaluation value based on each of data rates in cases where each of the wireless terminals is connected to each of the connection destination candidates and each of resource allocation rates for each of the wireless terminals at each of the connection destination candidates, and which controls the connection destinations of the plurality of wireless terminals based on a result of the selection.

(4) Still further, according to a fourth aspect of the present disclosure, a wireless terminal of a wireless communication system is provided. The wireless communication system has: a plurality of wireless terminals; and a control device which selects connection destinations of the plurality of wireless terminals from a plurality of connection destination candidates. The wireless terminal has a communicator which performs wireless communication through a connection destination selected by the control device. The control device selects the connection destinations of the plurality of wireless terminals from the plurality of connection destination candidates to maximize an evaluation value based on each of data rates in cases where each of the wireless terminals is connected to each of the connection destination candidates and each of resource allocation rates for each of the wireless terminals at each of the connection destination candidates, and controls the connection destinations of the plurality of wireless terminals based on a result of the selection.

(5) Moreover, according to a fifth aspect of the present disclosure, a control device of a wireless communication system is provided. The wireless communication system has: a plurality of wireless terminals; and the control device which selects connection destinations of the plurality of wireless terminals from a plurality of connection destination candidates. The control device has a processor which selects the connection destinations, to which the wireless terminals are to be connected, from the plurality of connection destination candidates based on each of data rates in cases where each of the wireless terminals is connected to each of the connection destination candidates and each connected terminal number, which is the number of the wireless terminals to be connected to each of the connection destination candidates.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates a view illustrating an example of an expectation rate table.

FIG. 10 illustrates a view illustrating an example of an initial setting of the optimal resource allocation rate table.

FIG. 11 illustrates a view illustrating an example of the optimal resource allocation rate table.

FIG. 16 illustrates a table illustrating an example of transmission power per period and per cell.

FIG. 17 illustrates a view illustrating an example of an optimization problem.

FIG. 18 illustrates a table illustrating an example of a transmittable/receivable time ratio per period and per cell.

FIG. 21 illustrates a table illustrating an example of transmission power per period and per cell.

FIG. 22 illustrates a table illustrating an example of a transmittable/receivable time ratio per period and per cell.

FIG. 24 illustrates a table illustrating an example of transmission power per period and per cell.

FIG. 25 illustrates a table illustrating an example of a transmittable/receivable time ratio per period and per cell.

FIG. 27 illustrates a table illustrating an example of transmission power per period and per cell.

FIG. 28 illustrates a table illustrating an example of a transmittable/receivable time ratio per period and per cell.

DESCRIPTION OF EMBODIMENTS

Embodiments of the present disclosure will be described below with reference to the drawings. However, the following embodiments are only exemplary embodiments, and are not intended to exclude various modifications and application of a technique which are not described in the following embodiments and modified examples. The following embodiments and modified examples can be variously modified and carried out by being combined within the scope of the present invention.

Figure 1:
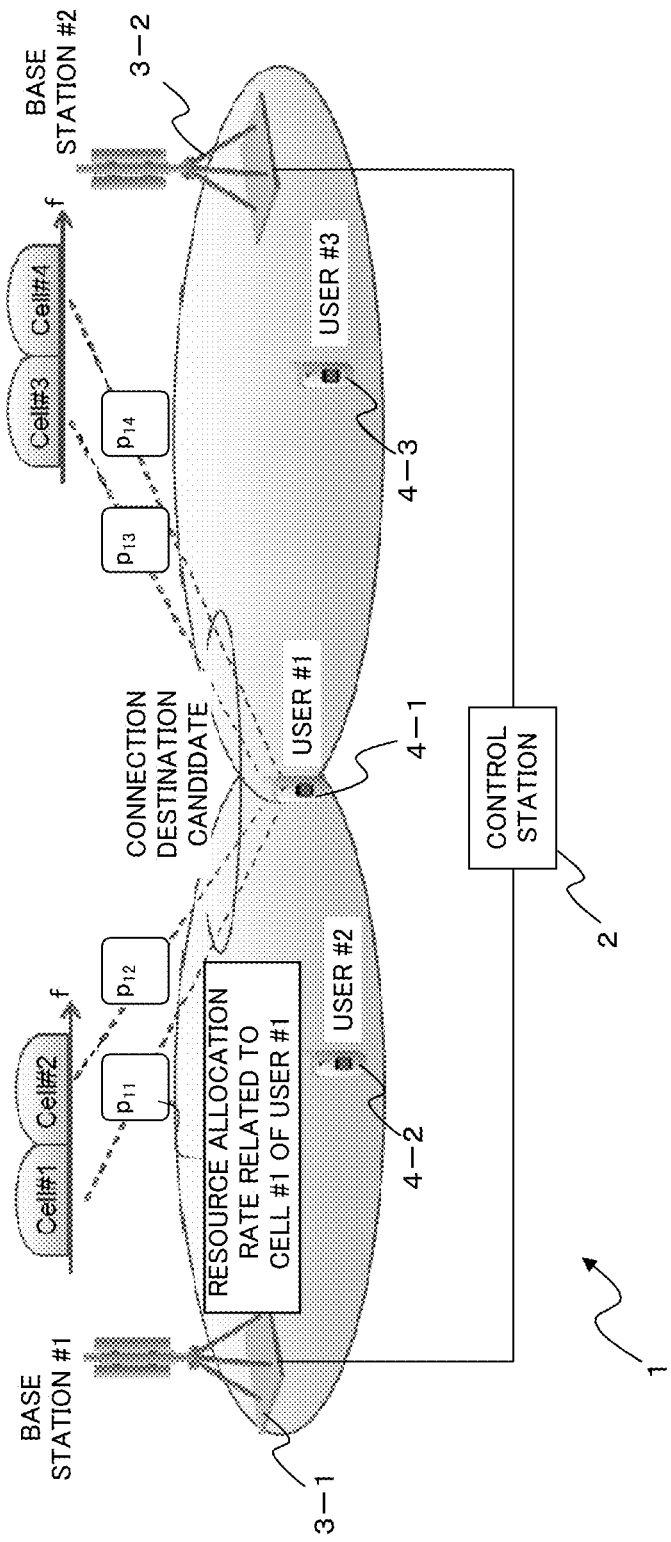
FIG. 1 illustrates a view illustrating a configuration example of a wireless communication system according to a first embodiment.

[1] First Embodiment (1.1) Configuration Example of Wireless Communication System FIG. 1 illustrates a view illustrating a configuration example of a wireless communication system according to the first embodiment.

A wireless communication system 1 illustrated in FIG. 1 includes, for example, a control station 2, wireless base stations 3-1 and 3-2 and wireless terminals 4-1, 4-2 and 4-3 which are examples of user equipment (UE).

In addition, the wireless base stations 3-1 and 3-2 may be also referred to as a base station #1 and a base station #2, respectively. Further, when the wireless base stations 3-1 and 3-2 are not distinguished, each of the wireless base stations 3-1 and 3-2 may be also referred to simply as a wireless base station 3. Furthermore, the wireless terminals 4-1, 4-2 and 4-3 may be also referred to as a user #1, a user #2 and a user #3, respectively, and, when the wireless terminals 4-1, 4-2 and 4-3 are not distinguished, each of the wireless terminals 4-1, 4-2 and 4-3 may be also referred to simply as a wireless terminal 4. Still further, the numbers of the wireless base stations 3 and the wireless terminals 4 are not limited to the numbers illustrated in FIG. 1.

The wireless base station 3 has a function of providing a wireless area such as a cell or a sector, and performing wireless communication with the wireless terminals 4 through the wireless area.

In the example illustrated in FIG. 1 the base station #1 provides, for example, a cell #1 and a cell #2 as wireless areas, and performs wireless communication with the user #1 and the user #2 through at least one of the cell #1 and the cell #2. Further, the base station #2 provides, for example, a cell #3 and a cell #4 as wireless areas and performs wireless communication with the user #1 and the user #3 through at least one of the cell #3 and the cell #4.

In the example illustrated in FIG. 1, connection destination candidates of the user #1 are the cell #1 to the cell #4, connection destination candidates of the user #2 are the cells #1 and #2, and connection destination candidates of the user #3 are the cells #3 and #4. In addition, connection destination candidates of the wireless terminal 4 change depending on movement of the wireless terminal 4 or opening, stopping and closing of the wireless base station 3.

The wireless terminal 4 has a function of performing wireless communication with the wireless base station 3 through a cell selected as a connection destination.

The control station 2 is connected with the wireless base stations 3 through cables, and has a function of controlling the wireless base stations 3. Further, the control station 2 may have a function of controlling the wireless terminals 4 through the wireless base stations 3.

In the present embodiment, the control station 2 functions as an example of a control device which determines (selects) a connection destination of the wireless terminal 4 from a plurality of connection destination candidates.

For example, the control station 2 calculates a data rate (also referred to as an expectation rate) which is expected in cases where each wireless terminal 4 is allocated to each cell of a connection destination candidate, based on information related to a reception strength of a wireless signal which each wireless terminal 4 can receive through each cell of a connection destination candidate.

Further, the control station 2 defines a resource allocation rate related to each cell of each wireless terminal 4. In the example illustrated in FIG. 1, a resource allocation rate $p_{11}$ related to the cell #1 of the user #1, a resource allocation rate $p_{12}$ related to the cell #2 of the user #1, a resource allocation rate $p_{13}$ related to the cell #3 of the user #1 and a resource allocation rate $p_{14}$ related to the cell #4 of the user #1 are defined.

Further, the control station 2 calculates a throughput for each cell of each wireless terminal 4 by multiplying the resource allocation rates defined as described above, and the above calculated expectation rate.

Next, the control station 2 determines a resource allocation rate (also referred to as an optimal resource allocation rate) based on an evaluation index which can be calculated based on the calculated throughput, and selects a serving cell as a connection destination of each wireless terminal 4 based on the determined optimal resource allocation rate.

According to the present embodiment, it is possible to select a connection destination of the wireless terminal 4 taking into account not only a reception strength of a wireless signal but also a load balance and, consequently, prevent a throughput of the wireless communication system 1 from lowering.

Hereinafter, configuration examples of the control station 2, the wireless base station 3 and the wireless terminal 4 and an operation example of the wireless communication system 1 will be described. In addition, the configuration examples of the control station 2, the wireless base station 3 and the wireless terminal 4 and the operation example of the wireless communication system 1 are only examples, and the present disclosure is not limited to configuration examples and operation examples described below.

(1.2) Configuration Example of Control Station 2

Figure 2:
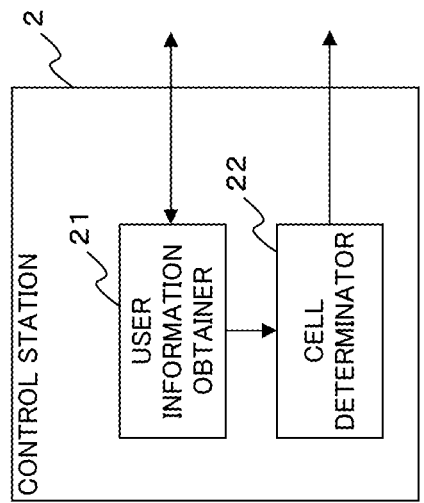
FIG. 2 illustrates a view illustrating a configuration example of a control station illustrated in FIG. 1.

FIG. 2 illustrates a view illustrating a configuration example of the control station 2.

The control station 2 illustrated in FIG. 2 includes, for example, a user information obtainer 21 and a cell determinator 22.

The user information obtainer 21 obtains information related to a reception strength of a wireless signal which each wireless terminal 4 can receive through each cell of a connection destination candidate.

For example, the user information obtainer 21 first instructs the wireless base station 3 to execute a process of optimizing a connection destination.

The wireless base station 3 having received the instruction instructs, for example, the wireless terminal 4 under the wireless base station 3 to measure and feed back reference signal reception power (RSRP) of surrounding cells.

Each wireless terminal 4 having received the above instruction from the wireless base station 3 measures RSRP of surrounding cells, and feeds back the RSRP to the wireless base station 3.

Further, the wireless base station 3 notifies the RSRP of the surrounding cells collected from each wireless terminal 4 to the user information obtainer 21 of the control station 2.

As described above, the user information obtainer 21 obtains the RSRP of the surrounding cells measured by each wireless terminal 4.

In addition, when each wireless terminal 4 measures RSRP on a regular basis and reports the RSRP to the wireless base station 3, the user information obtainer 21 may obtain the RSRP which has already been collected by the wireless base station 3. By so doing, an operation of additionally obtaining RSRP can be skipped, so that it is possible to suppress an increase in a communication amount of the wireless communication system 1. Meanwhile, it is preferable from the point of view of reliability of RSRP that RSRP is additionally obtained as described above.

The cell determinator 22 calculates a data rate (expectation rate) expected in cases where each wireless terminal 4 is allocated to each cell of a connection destination candidate (each wireless terminal 4 is connected to each cell of a connection destination candidate), based on information obtained by the user information obtainer 21 and related to the reception strength.

Next, the cell determinator 22 determines a resource allocation rate (optimal resource allocation rate) based on an evaluation index which can be calculated based on the calculated data rate, and selects (determines) a serving cell of each wireless terminal 4 based on the determined optimal resource allocation rate.

Further, the cell determinator 22 notifies the above selection (determination) result to the wireless base stations 3, and the wireless base stations 3 control cells based on the selection (determination) result, so that cells to which the wireless terminals 4 are connected are changed, added and deleted.

That is, the cell determinator 22 functions as an example of a processor which selects connection destinations of a plurality of wireless terminals 4 from a plurality of connection destination candidates to maximize an evaluation value based on each data rate in cases where each wireless terminal 4 is connected to each connection destination candidate and each resource allocation rate for each wireless terminal 4 at each connection destination candidate.

In addition, details of each operation of the cell determinator 22 will be described below.

(1.3) Configuration Example of Wireless Base Station 3

Figure 3:
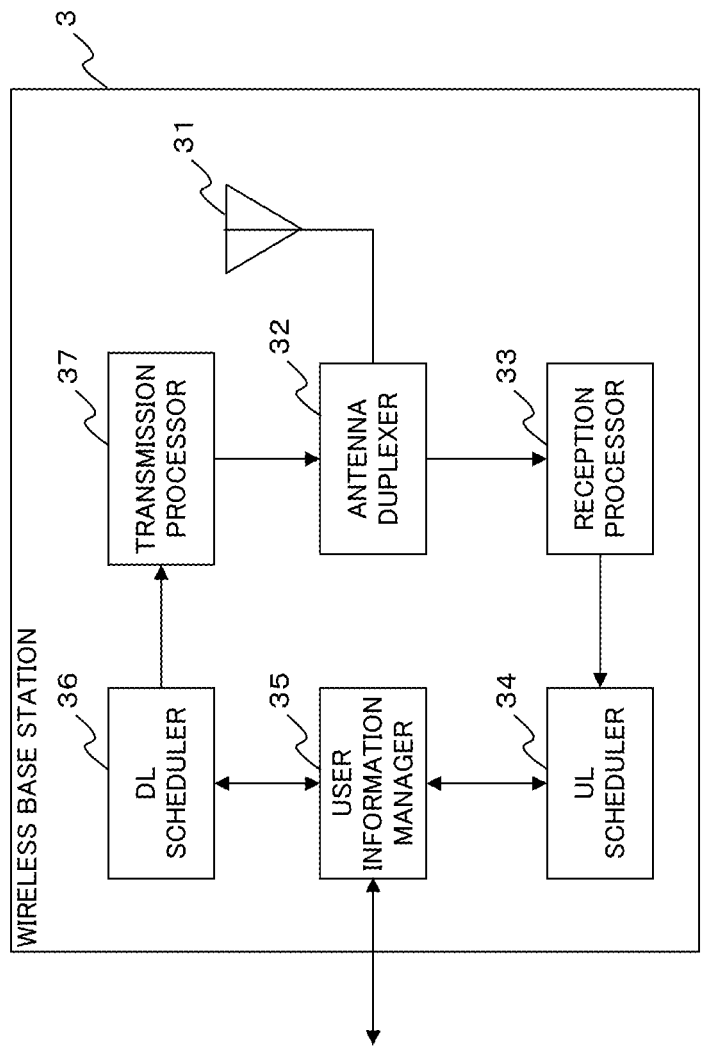
FIG. 3 illustrates a view illustrating a configuration example of a wireless base station illustrated in FIG. 1.

FIG. 3 illustrates a view illustrating a configuration example of the wireless base station 3.

The wireless base station 3 illustrated in FIG. 3 includes, for example, an antenna 31, an antenna duplexer 32, a reception processor 33, a UL (UpLink) scheduler 34, a user information manager 35, a DL (DownLink) scheduler 36 and a transmission processor 37.

The antenna 31 transmits and receives wireless signals to and from the wireless terminals 4 positioned (existing) in a wireless area such as a cell provided by the wireless base station 3. In addition, the antenna 31 may also indirectly transmit and receive wireless signals to and from the wireless terminals 4 positioned outside a range of a wireless area such as a cell provided by the wireless base station 3, through a repeater which relays the wireless signals.

The antenna duplexer 32 is a device which switches a transmitting/receiving function at the antenna 31. In addition, when the wireless base station 3 individually has a transmission antenna and a reception antenna instead of the antenna 31, the antenna duplexer 32 is omitted.

The reception processor 33 performs a certain wireless reception process on wireless signals received at the antenna 31. The wireless reception process includes, for example, a process such as low noise amplification on received wireless signals, frequency conversion into a baseband frequency (down-conversion) and A/D (analog/digital) conversion, and a baseband process.

The UL scheduler 34 schedules communication in uplink (UL). For example, the UL scheduler 34 may perform scheduling of the UL based on the UL received data received by the reception processor 33, and a reception process result of the reception processor 33 and UL reception quality. In addition, a UL scheduling result, UL received data received by the reception processor 33, and a reception process result of the reception processor 33 and UL reception quality may be notified to the user information manager 35.

The DL scheduler 36 schedules communication in downlink (DL). For example, the DL scheduler 36 may perform scheduling of the DL based on user information managed by the user information manager 35.

The transmission processor 37 performs a certain wireless transmission process on wireless signals transmitted from the antenna 31. The wireless transmission process includes, for example, a process such as D/A (Digital/Analog) conversion of transmission data, frequency conversion into a wireless frequency (up-conversion) and power amplification, and a baseband process.

The user information manager 35 has a function of obtaining and managing scheduling results of the UL scheduler 34 and the DL scheduler 36, UL received data received by the reception processor 33, and a reception process result of the reception processor 33 and UL reception quality.

Further, the user information manager 35 may cause each wireless terminal 4 to measure RSRP of the surrounding cells and transmit a feedback of a measurement result by collaborating with the UL scheduler 34, the DL scheduler 36, the transmission processor 37 and the reception processor 33 in response to an instruction from the user information obtainer 21 of the control station 2.

In addition, the user information manager 35 may collect and notify the obtained information to the user information obtainer 21 of the control station 2. In addition, as described below, information fed back from the UE 4 includes RSRP and a cell ID. The user information manager 35 may notify RSRP, a cell ID and, in addition, information (user ID) for identifying the wireless terminal 4 (user) to the control station 2.

Further, the user information manager 35 may change, add and delete a connection destination cell of each wireless terminal 4 based on the serving cell selection (determination) process result notified from the cell determinator 22 of the control station 2.

(1.4) Configuration Example of Wireless Terminal 4

Figure 4:
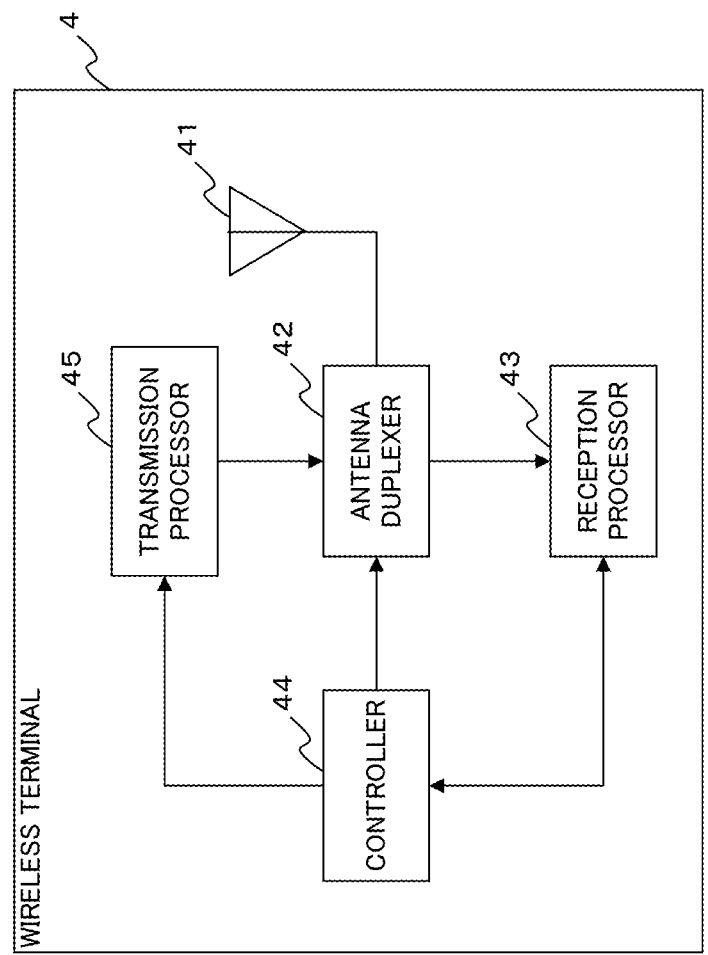
FIG. 4 illustrates a view illustrating a configuration example of a wireless terminal illustrated in FIG. 1.

FIG. 4 illustrates a view illustrating a configuration example of the wireless terminal 4.

The wireless terminal 4 illustrated in FIG. 4 includes, for example, an antenna 41, an antenna duplexer 42, a reception processor 43, a controller 44 and a transmission processor 45.

The antenna 41 transmits and receives wireless signals to and from the wireless base station 3 providing a wireless area such as a cell in which the wireless terminal 4 exists. In addition, the antenna 41 may also indirectly transmit and receive wireless signals to and from the wireless base station 3 which is different from the wireless base station 3 which provides the wireless area such as a cell in which the wireless terminal 4 exists, through a repeater which relays the wireless signals.

Further, the antenna 41 performs wireless communication with the wireless base station 3 through a connection destination selected by the control station 2.

That is, the antenna 41 functions as an example of a communicator which performs wireless communication through a connection destination selected by the control station 2.

The antenna duplexer 42 is a device which switches a transmitting/receiving function of the antenna 41. In addition, when the UE 4 individually has a transmission antenna and a reception antenna instead of the antenna 41, the antenna duplexer 42 is omitted.

The reception processor 43 performs a certain wireless reception process on wireless signals received at the antenna 41. The wireless reception process includes, for example, a process such as low noise amplification on received wireless signals, frequency conversion into a baseband frequency (down-conversion) and A/D conversion.

The transmission processor 45 performs a certain wireless transmission process on wireless signals transmitted from the antenna 41. The wireless transmission process includes, for example, a process such as D/A conversion of transmission data, frequency conversion into a wireless frequency (up-conversion) and power amplification.

The controller 44 controls operations of the antenna duplexer 42, the reception processor 43 and the transmission processor 45. Further, the controller 44 may generate UL transmission data transmitted from the antenna 41, and provide DL received data received by the antenna 41 and the reception processor 43, to various application processors (not illustrated).

Furthermore, when the reception processor 43 receives from the wireless base station 3 an instruction to measure and feed back RSRP, the controller 44 obtains RSRP of each cell by measuring reception power of wireless signals received in the surrounding cells of the wireless terminal 4.

Still further, the controller 44 associates the obtained RSRP and information (cell ID) for identifying a cell corresponding to a RSRP value, and transmits a feedback to the wireless base station 3.

(1.5) Operation Example of Wireless Communication System 1

Figure 5:
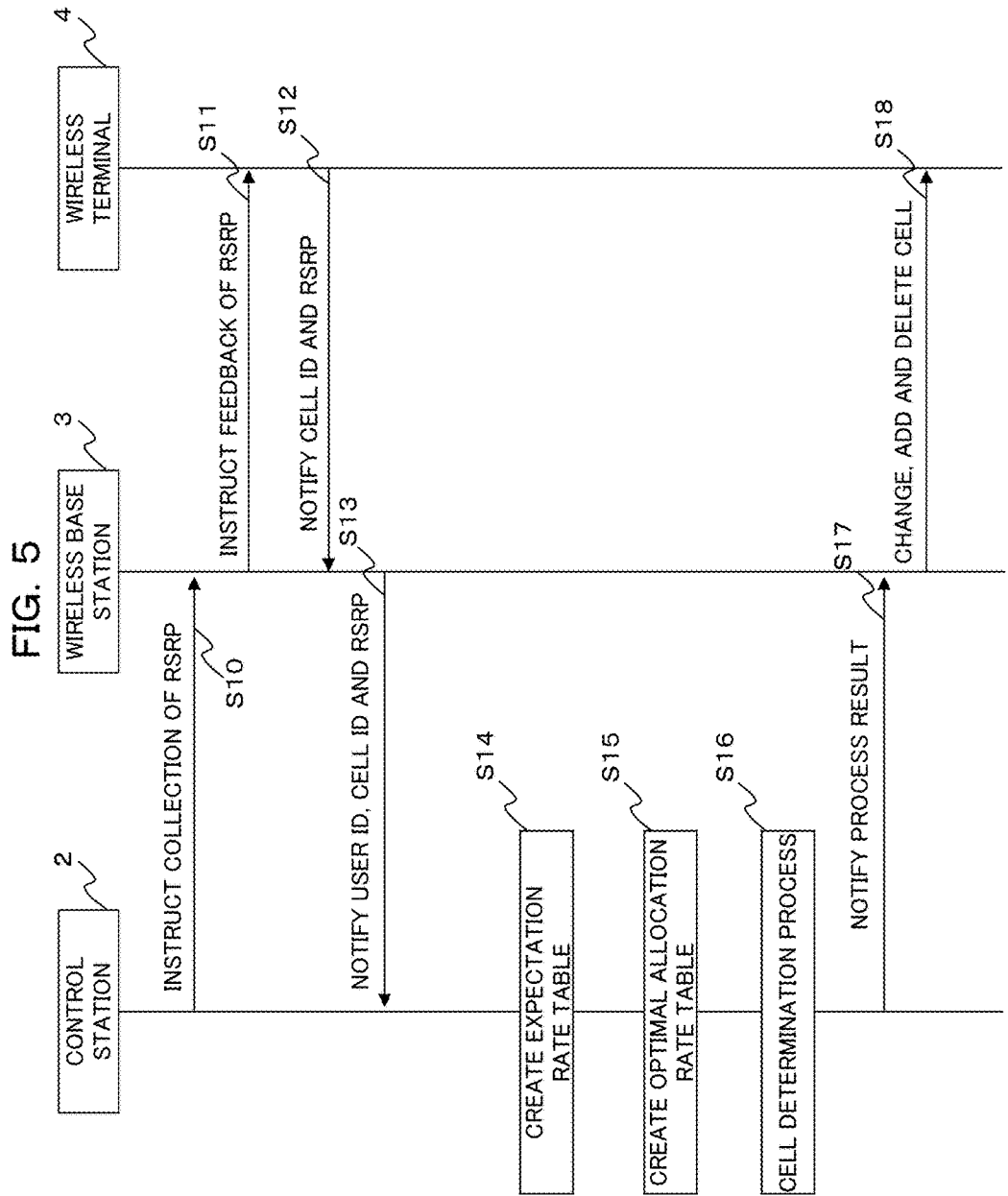
FIG. 5 illustrates a view illustrating an operation example of the wireless communication system according to the first embodiment.

FIG. 5 is a flowchart illustrating an operation example of the wireless communication system 1.

As illustrated in FIG. 5, when a process of selecting (determining) a connection destination of the wireless terminal 4 is performed, the control station 2 first instructs the wireless base station 3 to collect RSRP (step S10).

The wireless base station 3 having been instructed by the control station 2 to collect the RSRP instructs each wireless terminal 4 under the wireless base station 3 to measure RSRP of surrounding cells and feed back a measurement result (step S11).

The wireless terminal 4 having been instructed by the wireless base station 3 to measure the RSRP and feed back the measurement result measures RSRP of wireless signals received from surrounding cells, and report the measured RSRP and a cell ID corresponding to the measured RSRP to the wireless base station 3 (step S12).

The wireless base station 3 having received the RSRP and the cell ID from the wireless terminal 4 notifies a user ID for identifying the report source wireless terminal 4 and, in addition, the RSRP and the cell ID reported from the wireless terminal 4, to the control station 2 (step S13).

Further, when the user information obtainer 21 of the control station 2 receives the report of the user ID, the cell ID and the RSRP from the wireless base station 3, the cell determinator 22 calculates a signal-to-interference plus noise power ratio (SINR) in cases where each wireless terminal 4 is connected to each cell, according to following formula (1) using each RSRP obtained by the user information obtainer 21.

In addition, the cell determinator 22 may use a value obtained by dividing transmission power by a path loss value instead of RSRP. The control station 2 stores transmission power of each wireless base station 3 in advance. In addition, the control station 2 may also receive a notification of transmission power from each wireless base station 3. Further, the control station 2 calculates a path loss value based on the RSRP and the transmission power of a reference signal. In addition, in the present embodiment, the transmission power, the path loss value and the RSRP are true values.

[Mathematical Formula 1]

$$SINR_{n,i} = \frac{RSRP_{n,i}}{\sum_{j \neq i} PSRP_{n,j} + N} \quad (1)$$

$SINR_{n,i}$ represents a SINR in cases where it is assumed that a wireless terminal 4-n (user #n) (n represents a natural number) is connected to a cell #i (i represents a natural number), $RSRP_{n,i}$ represents reception power of the user #n from the cell #i, and N represents noise power.

Next, the cell determinator 22 creates an expectation rate table by calculating a data rate (expectation rate) for the cell #i of a wireless terminal 4-n in cases where it is assumed that the wireless terminal 4-n is connected to the cell #i using following formula (2) (step S14 in FIG. 5).

[Mathematical Formula 2]

$$t_{n,i} = \eta_B B \log_2(1 + SINR_{n,i}/\eta_{SINR}) \quad (2)$$

$t_{n,i}$ represents an expectation rate in cases where it is assumed that the user #n is connected to the cell #i, B represents a communication band width, $\eta_B$ represents band width efficiency, and $\eta_{SINR}$ represents SINR efficiency.

Next, FIG. 6 illustrates an example of an expectation rate table. In the example illustrated in FIG. 6, expectation rates $t_{1,1}$ to $t_{16,9}$ [Mbps] in cases where it is assumed that the user #1 to a user #16 are connected to the cell #1 to a cell #9, respectively are illustrated in table formats.

Further, the cell determinator 22 estimates a throughput (user throughput) in each cell of each wireless terminal 4 by defining a resource allocation rate $p_{n,i}$ related to each cell #i of each user #n and multiplying the defined resource allocation rate $p_{n,i}$ and the calculated expectation rate $t_{n,i}$.

That is, a total throughput $T_n$ which is a value obtained by summing for cells each throughput in cases where it is assumed that each wireless terminal 4 is connected to each cell is expressed by following formula (3).

[Mathematical Formula 3]

$$T_n = \sum_i p_{n,i} t_{n,i} \quad (3)$$

Figure 7:
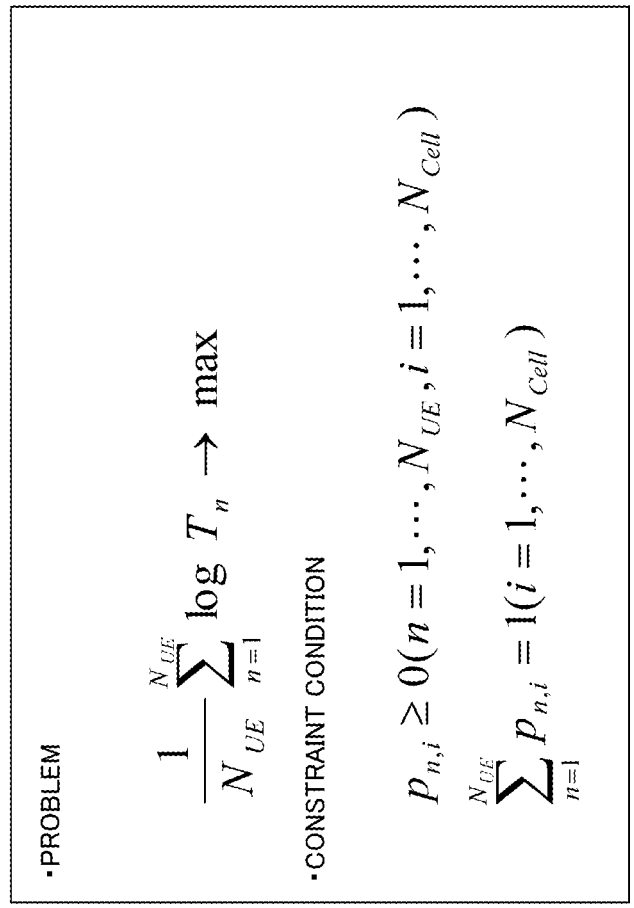
FIG. 7 illustrates a view illustrating an example of an optimization problem.

When, for example, maximizing a logarithmic mean value of a total throughput $T_n$ (a logarithm of a geometric mean of the total throughput $T_n$ for the wireless terminals 4 in the present example) as an evaluation index (evaluation value) is taken into account, a problem illustrated in FIG. 7 may be defined.

In FIG. 7, $N_{UE}$ represents a total number of users ($N_{UE}$=16 in the example illustrated in FIG. 6) which are servicing cell selection (determination) process targets, and $N_{Cell}$ represents a total number of cells ($N_{Cell}$=9 in the example illustrated in FIG. 6) related to the serving cell selection (determination) process.

A solution of the problem illustrated in FIG. 7 can be expressed by following formula (4) and following formula (5) by deforming KKT (Karush-Kuhn-Tucker) condition.

[Mathematical Formula 4]

$$\sum_n \max\left(\mu_i - \frac{T'_{n,i}}{t_{n,i}}, 0\right) = 1 \quad (4)$$

[Mathematical Formula 5]

$$p_{n,i} = \max\left(\mu_i - \frac{T'_{n,i}}{t_{n,i}}, 0\right) \quad (5)$$

$\mu_i$ represents a parameter which is determined to satisfy a constraint condition expressed by formula (4). $T'_{n,i}$ represents a total value of throughputs of the user #n which is expected in each of other cells #q(q=1,... $N_{Cell}$, and q≠i) when the cell #i is focused upon.

$T'_{n,i}$ is expressed by following formula.

[Mathematical Formula 6]

$$T'_{n,i} = \sum_{\substack{l=1 \\ l \neq i}}^{N_{Cell}} p_{n,l} t_{n,l}$$

Figure 8:
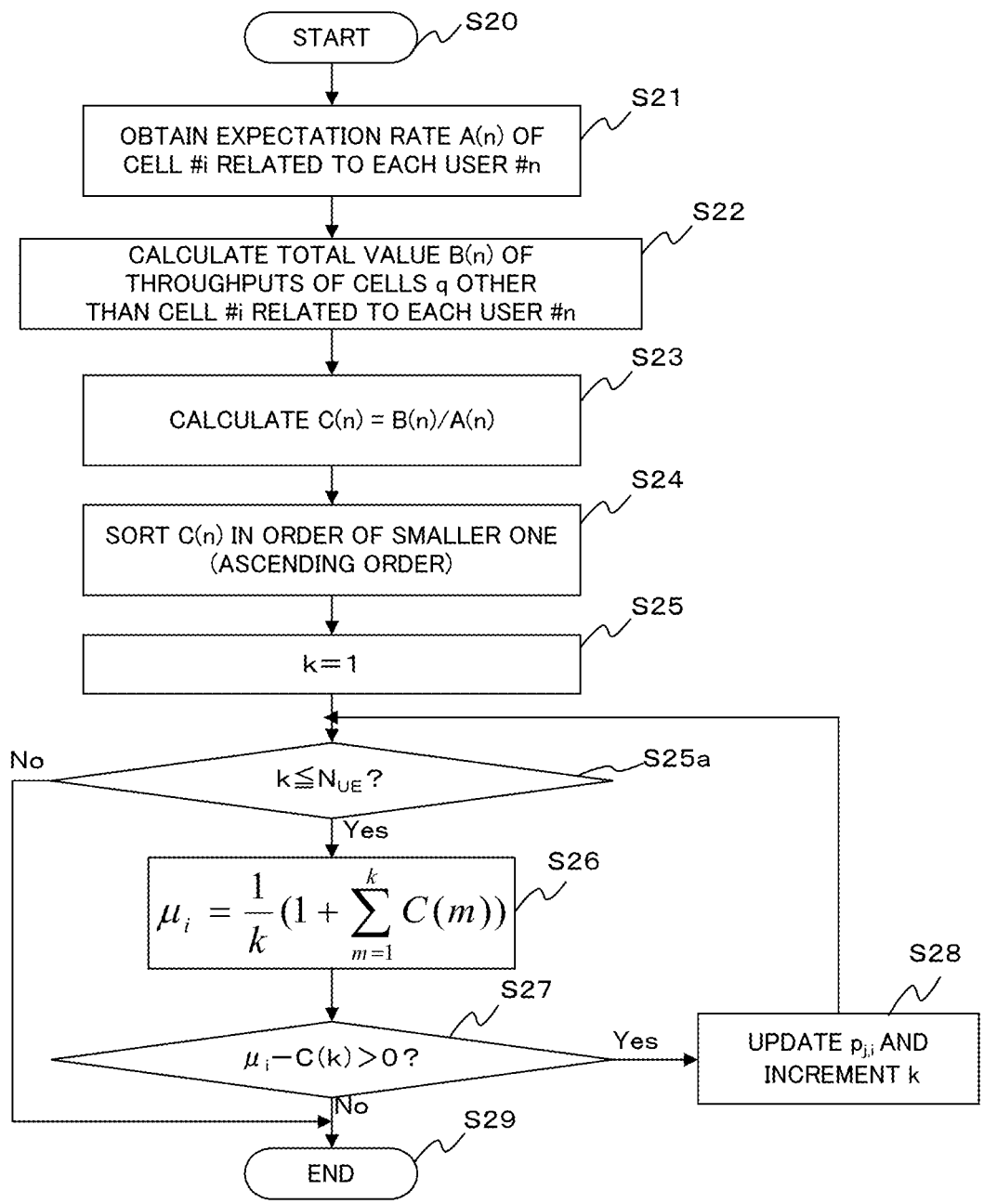
FIG. 8 illustrates a view illustrating an example of a process of creating an optimal resource allocation rate table.

This means that, when a total value $T'_{n,i}$ of throughputs of the user #n which are expected in other cells #q (q=1, ..., $N_{Cell}$ and q≠i) in cases where the cell #i is focused upon is known, it is possible to calculate a solution of the problem in FIG. 7 according to the procedure illustrated in FIG. 8.

As illustrated in FIG. 8, when a process of calculating the solution of the problem in FIG. 7 is started (step S20 in FIG. 8), the cell determinator 22 obtains an expectation rate A(n) of the cell #i related to the user #n from the expectation rate table (step S21 in FIG. 8).

Next, the cell determinator 22 calculates a total value B(n) of throughputs of the cells #q other than the cell #i related to the user #n (step S22 in FIG. 8).

Further, the cell determinator 22 calculates for all cells #i

[Mathematical Formula 7]

$$C(n) = \frac{B(n)}{A(n)}$$

based on A(n) obtained in step S21 in FIG. 8 and B(n) calculated in step S22 in FIG. 8 (step S23 in FIG. 8), and sorts the calculated C(n) in order of smaller one (ascending order) (step S24 in FIG. 8).

Next, the cell determinator 22 sets a parameter k to an initial value "1" (step S25 in FIG. 8), and determines whether or not the parameter k is equal to or less than the total number of users $N_{UE}$ (step S25a in FIG. 8). When the parameter k is larger than the total number of users $N_{UE}$, the cell determinator 22 finishes the process in FIG. 8 (a No route of step S25a in FIG. 8). Meanwhile, when the parameter k is equal to or less than the total number of users $N_{UE}$, the cell determinator 22 moves to step S26 (a Yes route of step S25a in FIG. 8) and calculates a parameter $\mu_i$ using following formula (6) in order sorted in step S24 in FIG. 8 (step S26 in FIG. 8)

[Mathematical Formula 8]

$$\mu_i = \frac{1}{k}\left(1 + \sum_{m=1}^{k} C(m)\right) \quad (6)$$

Further, the cell determinator 22 determines for $\mu_i$ calculated in step S26 in FIG. 8 whether or not following formula (7) holds (step S27 in FIG. 8).

[Mathematical Formula 9]

$$\mu_i - C(k) > 0 \quad (7)$$

When determining that above formula (7) does not hold (a No route of step S27 in FIG. 8), the cell determinator 22 finishes the process of calculating the solution of the problem in FIG. 7 (step S29 in FIG. 8).

Meanwhile, when determining that above formula (7) holds (a Yes route of step S27 in FIG. 8), the cell determinator 22 updates a resource allocation rate $p_{j,i}$ for each wireless terminal 4 (i.e., j=1, ..., $N_{UE}$) in the cell #i using above formula (5), increases (increments) the parameter k by 1 (step S28 in FIG. 8) and repeats the processes in steps S25a to S28 in FIG. 8.

By so doing, the cell determinator 22 creates an optimal resource allocation rate table illustrated in FIG. 11 (step S15 in FIG. 5).

When a user throughput which is expected based on past scheduling in other cells #q in cases where the cell #i is focused upon is known, the cell determinator 22 may calculate $T'_{n,i}$ using the user throughput and perform the process illustrated in FIG. 8. When a resource allocation rate in other cells #q is known, the cell determinator 22 may calculate $T'_{n,i}$ using the resource allocation rate, and create the optimal resource allocation rate table illustrated in FIG. 11. The user information obtainer 21 may obtain the past scheduling, the user throughput and the resource allocation rate in other cells #q in cases where the cell #i is focused upon, from the wireless base station 3.

Figure 9:
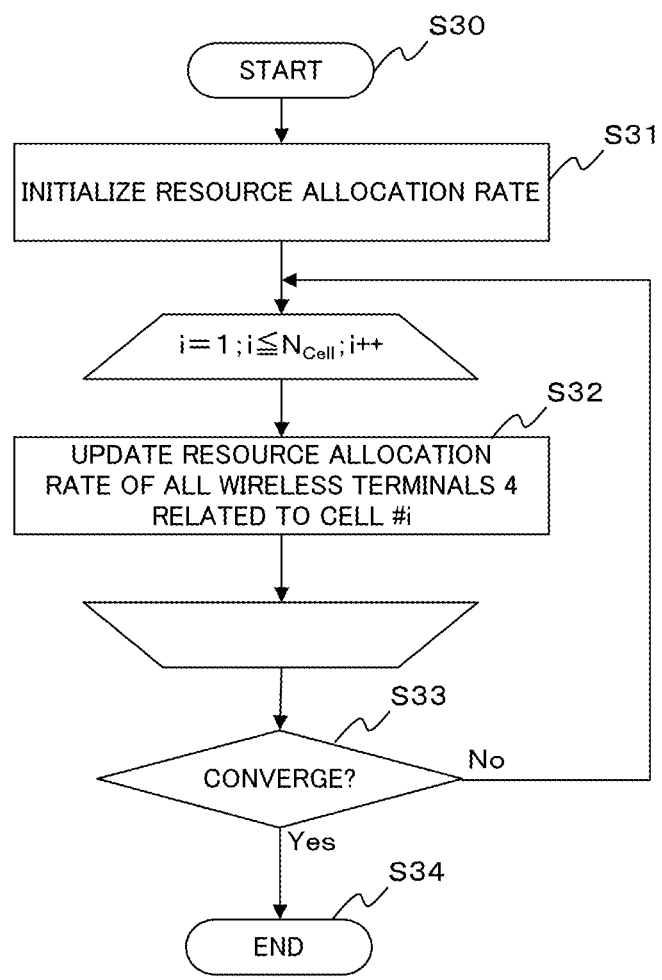
FIG. 9 illustrates a view illustrating an example of a process of creating an optimal resource allocation rate table.

Meanwhile, when the resource allocation rate $p_{n,i}$ is not known or is not determined, an optimal resource allocation rate table may be created by assuming an initial value of the resource allocation rate of each cell #i as illustrated in FIG. 10 and sequentially updating the resource allocation rate using the process flow illustrated in FIG. 9.

For example, as illustrated in FIG. 9, when the process is started (step S30 in FIG. 9), the cell determinator 22 initializes each resource allocation rate to be values illustrated in FIG. 10 (step S31 in FIG. 9).

Next, the cell determinator 22 repeats a process of updating the resource allocation rates of all wireless terminals 4 related to the cell #i while incrementing i from 1 to $N_{cell}$ by applying the process illustrated in FIG. 8 (step S32 in FIG. 9).

Further, the cell determinator 22 determines whether or not each resource allocation rate updated in step S32 in FIG. 9 converges (step S33 in FIG. 9). For example, when a difference between a value of each resource allocation rate currently updated in step S32 in FIG. 9 and a value of each resource allocation rate previously updated in step S32 in FIG. 9 is equal to or less than a certain fluctuation range, the cell determinator 22 determines that each resource allocation rate updated in step S32 in FIG. 9 converges. Alternatively, when the loop process of step S32 in FIG. 9 is repeated a certain number of times, the cell determinator 22 may determine that each resource allocation rate updated in step S32 in FIG. 9 converges.

When determining that each updated resource allocation rate converges (a Yes route of step S33 in FIG. 9), the cell determinator 22 finishes the process (step S34 in FIG. 9).

Meanwhile, when determining that each updated resource allocation rate does not converge (a No route of step S33 in FIG. 9), the cell determinator 22 repeats the processes in steps S32 and S33 in FIG. 9 until it is determined that each updated resource allocation rate converges.

As described above, even when optimal resource allocation rates are sequentially calculated, it is possible to create the optimal resource allocation rate table illustrated in FIG. 11.

Further, the cell determinator 22 selects (determines) a serving cell of each user by referring to the optimal resource allocation rate table created as described above (step S16 in FIG. 5).

For example, the cell determinator 22 may select (determine) a cell whose optimal resource allocation rate is the highest as a serving cell per user based on the optimal resource allocation rate table.

For example, the cell determinator 22 selects for the user #1 the cell #7 as a serving cell, selects for the user #2 the cell #4 as a serving cell and selects for the user #3 the cell #1 as a serving cell. Similarly, for example, the cell determinator 22 selects for the users #4 to #16 the cell #7, the cell #4, the cell #8, the cell #1, the cell #2, the cell #5, the cell #8, the cell #6, the cell #3, the cell #9, the cell #9, the cell #6, and the cell #3 as serving cells, respectively.

When the calculated resource allocation rate is lower than a certain threshold, the cell determinator 22 may set a connection destination candidate corresponding to the resource allocation rate no to be selected as connection destinations of the wireless terminals 4.

By the way, 3GPP (3rd Generation Partnership Project) is advancing standardization of LTE-Advanced (LTE-A). LTE-A adopts a carrier aggregation technique of performing broadband transmission using a plurality of component carriers to achieve a peak data rate exceeding 1 Gbps.

The wireless terminals 4 which support carrier aggregation can perform wireless communication with the wireless base stations 3 using one or more component carriers selected as serving cells depending on carrier aggregation capability. Consequently, it is possible to perform broadband communication of 20 [MHz]×5 component carriers=100 [MHz] at maximum.

Hence, the cell determinator 22 may select (determine) a serving cell in descending order of, for example, optimal resource allocation rates per user for the wireless terminals 4 which support carrier aggregation.

For example, when each wireless terminal 4 supports carrier aggregation, the cell determinator 22 selects for the users #1 to #5, #7 to #9 and #11 to #16 a cell whose optimal resource allocation rate is maximum as serving cells, and selects for the user #6 the cells #2 and #8 as serving cells and selects for the user #10 the cells #5 and #8 as serving cells.

Alternatively, the cell determinator 22 may select (determine) a certain number of cells as serving cells in descending order of optimal resource allocation rates per user. When, for example, the number of component carriers which the wireless terminals 4 support is limited or when a scheduling process amount is reduced, this selecting method may be performed.

Alternatively, when an optimal resource allocation rate related to a cell which is not selected as a serving cell is equal to or more than a certain value, the optimal resource allocation rate may be calculated again according to the above-described method by setting an expectation rate of the cell to zero. Consequently, it is possible to improve optimal resource allocation rates related to other cells.

Alternatively, when a throughput of a cell selected as a serving cell for the user is larger than a throughput requested by the user, an optimal resource allocation rate may be calculated again according to the above-described method by reducing the resource allocation rate of the cell to a value corresponding to the throughput requested by the user.

For example, when a reduction amount of a resource allocation rate of a user #a (a=1, ..., $N_{UE}$) in this case is x (>0), the above formula (4) is deformed to following formula (4)'.

[Mathematical Formula 10]

$$\sum_{\substack{n \\ n \neq a}} \max\left(\mu_i - \frac{T'_{n,i}}{t_{n,i}}, 0\right) = 1 - (p_{a,i} - x) \quad (4)'$$

The cell determinator 22 may also create the optimal resource allocation rate table based on deformed formula (4)' and formula (5), and select (determine) a serving cell of each user according to the created optimal resource allocation rate table.

Information about the selected (determined) serving cell is notified to the wireless base station 3 by the cell determinator 22 (step S17 in FIG. 5), and the wireless base station 3 changes, adds and deletes the serving cell of each user based on the notification (step S18).

As described above, according to the present embodiment, a serving cell is selected taking into account a load balance between users, so that it is possible to prevent a throughput of the wireless communication system 1 from lowering.

[2] First Modified Example

A wireless base station 3 may have a function and a configuration of a control station 2, and, in this case, the control station 2 may be omitted.

Figure 12:
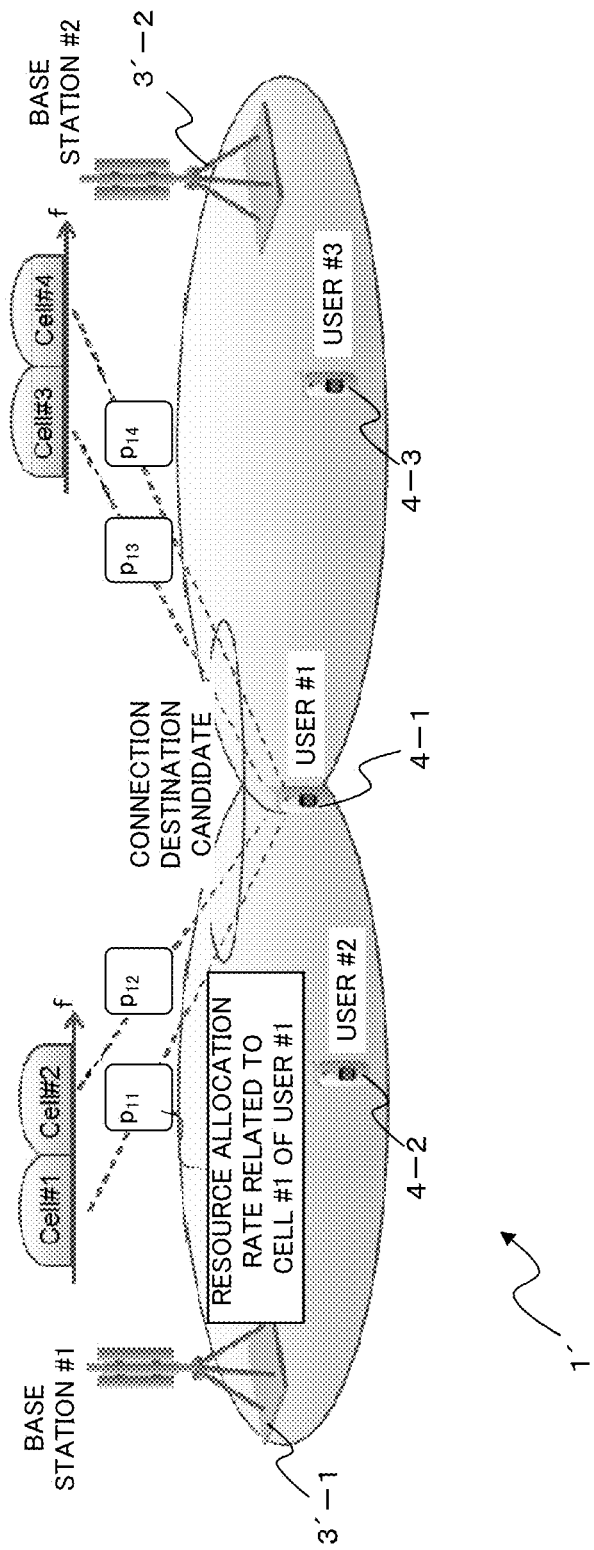
FIG. 12 illustrates a view illustrating a configuration example of a wireless communication system according to a first modified example.

FIG. 12 illustrates a configuration example of a wireless communication system 1' according to the present example.

The wireless communication system 1' illustrated in FIG. 12 includes, for example, wireless base stations 3'-1 and 3'-2 and wireless terminals 4-1, 4-2 and 4-3 which are examples of user equipment (UE). In addition, in FIG. 12, the wireless terminals 4-1, 4-2 and 4-3 have the same function and configuration as those of the wireless terminals 4-1, 4-2 and 4-3 illustrated in FIG. 1 and therefore will not be described. When the wireless base stations 3'-1 and 3'-2 are not distinguished, each of the wireless base stations 3'-1 and 3'-2 may be also referred to simply as the wireless base stations 3'. Furthermore, the numbers of wireless base stations 3' and wireless terminals 4 are not limited to the numbers illustrated in FIG. 12.

Figure 13:
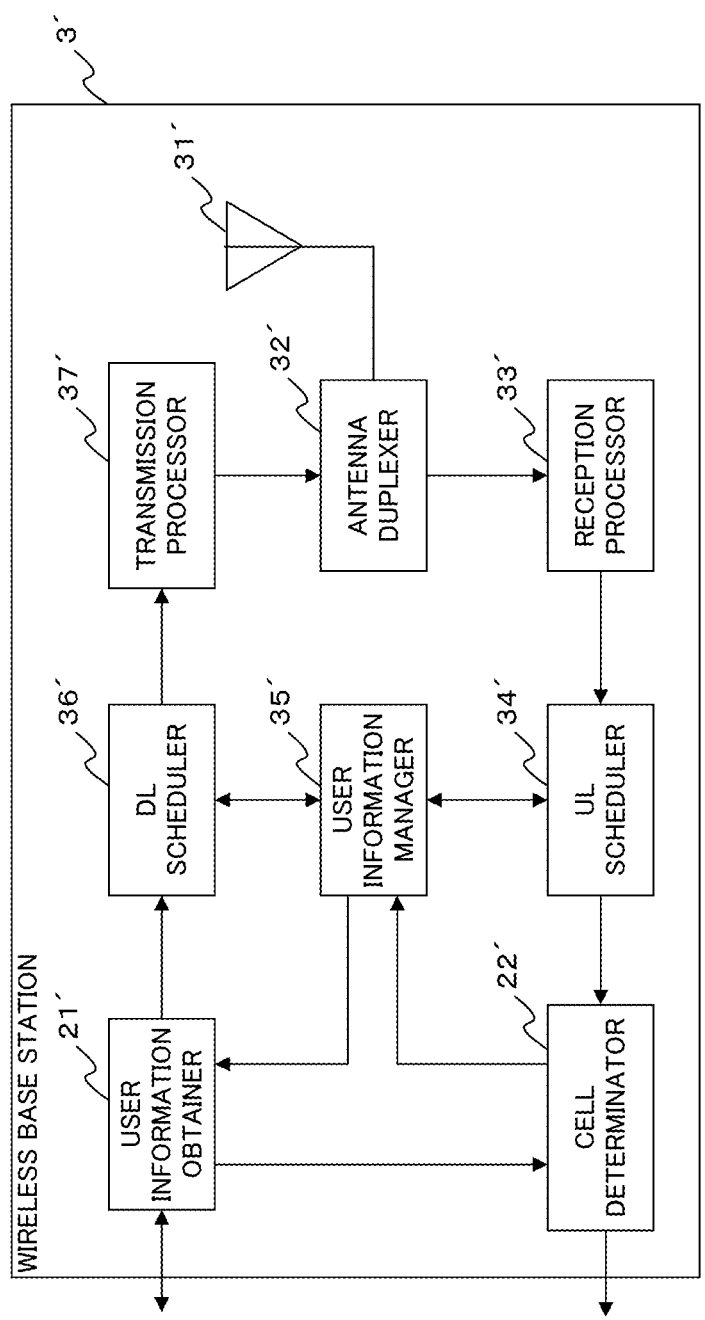
FIG. 13 illustrates a view illustrating a configuration example of a wireless base station illustrated in FIG. 12.

FIG. 13 illustrates a configuration example of the wireless base station 3'.

As illustrated in FIG. 13, the wireless base station 3' includes an antenna 31', an antenna duplexer 32', a reception processor 33', a UL scheduler 34', a user information manager 35', a DL scheduler 36', a transmission processor 37', a user information obtainer 21' and a cell determinator 22'.

The antenna 31', the antenna duplexer 32', the reception processor 33', the UL scheduler 34', the user information manager 35', the DL scheduler 36' and the transmission processor 37' have the same functions as those of an antenna 31, an antenna duplexer 32, a reception processor 33, a UL scheduler 34, a user information manager 35, a DL scheduler 36 and a transmission processor 37 illustrated in FIG. 3, and therefore will not be described.

The user information obtainer 21' obtains cell IDs and RSRP from wireless terminals 4 under the wireless base station 3', and obtains cell IDs and RSRP from the wireless terminals 4 under the other wireless base stations 3'.

Hence, the user information obtainer 21' is adapted to communicate with the other wireless base stations 3' through a so-called backhaul network.

Further, similar to the cell determinator 22 illustrated in FIG. 2, the cell determinator 22' creates an optimal resource allocation rate table based on various pieces of user information obtained by the user information obtainer 21', and selects (determines) a serving cell of each user based on the created optimal resource allocation rate table.

Furthermore, the cell determinator 22' notifies a serving cell selection (determination) result of the wireless terminals 4 under the other wireless base stations 3', to the other wireless base stations 3' through the backhaul network.

Still further, the cell determinator 22' notifies a serving cell selection (determination) result of the wireless terminals 4 under the wireless base station 3', to the user information manager 35'.

In the present example, the wireless base station 3' functions as an example of a control device which determines (selects) a connection destination of the wireless terminal 4 from a plurality of connection destination candidates. The cell determinator 22' functions as an example of a processor which selects connection destinations of a plurality of wireless terminals 4 from a plurality of connection destination candidates to maximize an evaluation value based on each data rate in cases where each wireless terminal 4 is connected to each connection destination candidate and each resource allocation rate for each wireless terminal 4 at each connection destination candidate.

In the present example, an antenna 41 of the wireless terminal 4 functions as an example of a communicator which performs wireless communication through a connection destination selected by the wireless base station 3'.

Each wireless base station 3' changes, adds and deletes a serving cell of each user based on each notification. Consequently, it is possible to provide the similar effect to that of the first embodiment while further simplifying the configuration of the wireless communication system 1' according to the present example.

[3] Second Modified Example (3.1) Configuration Example of Wireless Communication System 1A Next, a wireless communication system according to the second modified example of the first embodiment of the present disclosure will be described. The wireless communication system according to the second modified example differs from the wireless communication system according to the first embodiment in selecting connection destination candidates based on a data rate and a resource allocation rate for each of periods whose data rates are different from each other. This difference will be mainly described below.

Figure 14:
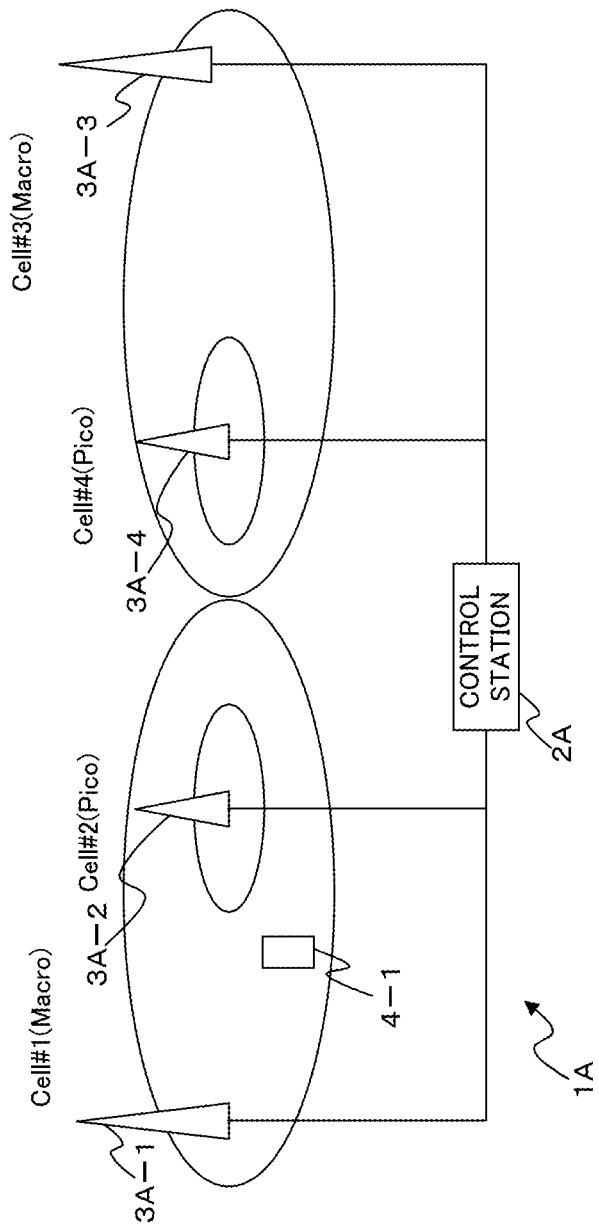
FIG. 14 illustrates a view illustrating a configuration example of a wireless communication system according to a second modified example of the first embodiment.

As illustrated in FIG. 14, a wireless communication system 1A according to the second modified example configures a HetNet (Heterogeneous Network). The wireless communication system 1A illustrated in FIG. 14 includes, for example, a control station 2A, wireless base stations 3A-1, 3A-2, 3A-3 and 3A-4 and a wireless terminal 4-1 which is an example of user equipment (UE).

In FIG. 14, the wireless terminal 4-1 has the same function and configuration as those of each wireless terminal 4-1, 4-2 or 4-3 illustrated in FIG. 1, and therefore will not be described. The wireless base stations 3A-1, 3A-2, 3A-3 and 3A-4 may be also referred to as a base station #1, a base station #2, a base station #3 and a base station #4, respectively. Furthermore, when the wireless base stations 3A-1, 3A-2, 3A-3 and 3A-4 are not distinguished, each of the wireless base stations 3A-1, 3A-2, 3A-3 and 3A-4 may be also referred to simply as a wireless base station 3A or the base station 3A. Still further, the number of wireless base stations 3A and the number of wireless terminals 4 are not limited to the numbers illustrated in FIG. 14.

The wireless communication system 1A has a plurality of cells of different types such as macrocells, microcells, picocells and femtocells.

The wireless base station 3A has the same function and configuration as those of a wireless base station 3 illustrated in FIG. 1. In the present example, the wireless base stations 3A-1 and 3A-3 have functions of providing wireless areas as macrocells, and performing wireless communication with the wireless terminals 4 through the wireless areas. In the present example, the wireless base stations 3A-2 and 3A-4 have functions of providing wireless areas as picocells, and performing wireless communication with the wireless terminals 4 through the wireless areas.

In the present example, a picocell (cell #2) provided by the base station #2 is included in a macrocell (cell #1) provided by the base station #1. Similarly, a picocell (cell #4) provided by the base station #4 is included in a macrocell (cell #3) provided by the base station #3.

In the present example, connection destination candidates of the wireless terminals 4 are the cell #1 to the cell #4. The connection destination candidates of the wireless terminals 4 may vary depending on movement of the wireless terminals 4 and opening, stopping or closing of the wireless base station 3A.

Wireless signals in a plurality of cells interfere with each other in a region in which the plurality of cells is provided. Hence, in the present example, the wireless communication system 1A uses eICIC (Enhanced Inter Cell Interference Coordination) to reduce an inter-cell interference.

For example, the wireless communication system 1A uses "Time domain resource partitioning" which is one of control methods of eICIC. In the present example, the wireless communication system 1A does not perform communication in a part of a cycle period in a macrocell (i.e., transmission and reception of data in a part of a plurality of subframes forming a frame are stopped). A subframe in which transmission and reception of data are stopped may be referred to as an ABS (Almost Blank Subframe).

Figure 15:
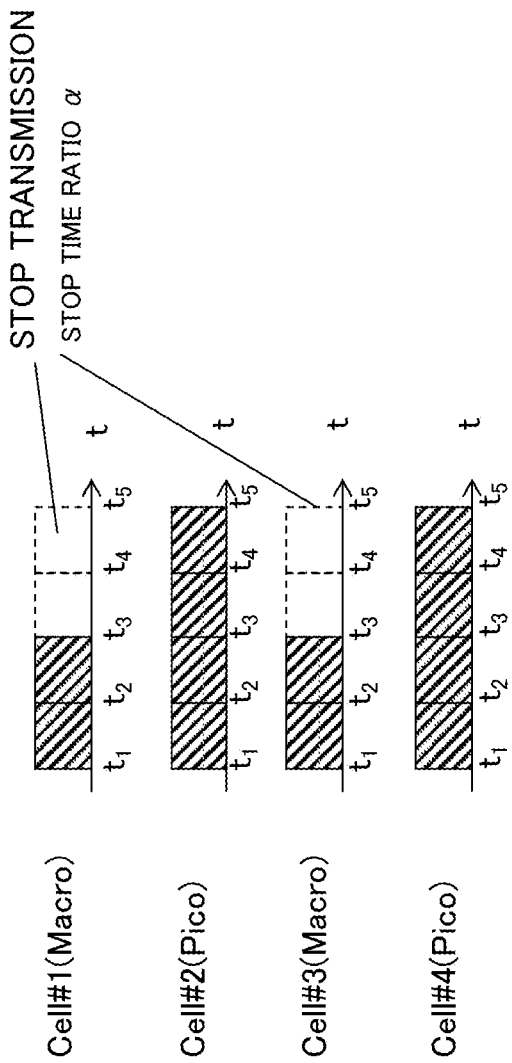
FIG. 15 is a time chart illustrating an example of transmission power per period and per cell.

As illustrated in FIG. 15, the wireless communication system 1A has a frame including four subframes consecutive in time. Each subframe has the same time duration.

For example, a period from a time $t_1$ to a time $t_2$ is allocated to a first subframe, a period from the time $t_2$ to a time $t_3$ is allocated to a second subframe, a period from the time $t_3$ to a time $t_4$ is allocated to a third subframe and a period from the time $t_4$ to a time $t_5$ is allocated to a fourth subframe.

In addition, a plurality of subframes may have different time durations.

Each of the base station #1 and the base station #3 transmits and receives data in the first subframe and the second subframe. Meanwhile, each of the base station #1 and the base station #3 stops transmitting and receiving data in the third subframe and the fourth subframe. That is, each of the base station #1 and the base station #3 sets the third subframe and the fourth subframe as ABSs. Further, each of the base station #2 and the base station #4 transmits and receives data in all subframes.

The wireless communication system 1A has a plurality of periods whose data rates are different in a cycle (one frame period in the present example). For example, the first period (period #1) is a period of the first subframe plus the second subframe, and the second period (period #2) is a period of the third subframe plus the fourth subframe.

In the present example, a stop time ratio α is 0.5. The stop time ratio α represents a ratio of a time during which transmission and reception of data are stopped using eICIC (i.e., a sum of a time duration of the third subframe and a time duration of the fourth subframe) with respect to a time during which data can be transmitted and received without using eICIC (i.e., a time duration of one frame). The stop time ratio α may be set to an arbitrary value from 0 through 1.

A cell determinator 22 according to the second modified example calculates a data rate (expectation rate) expected in cases where each wireless terminal 4 is allocated to each cell of a connection destination candidate in each period (each wireless terminal 4 is connected to each cell of a connection destination candidate), based on information related to the reception strength obtained by a user information obtainer 21.

Next, the cell determinator 22 determines a resource allocation rate (optimal resource allocation rate) in each period based on an evaluation index which can be calculated based on the calculated data rate, and selects (determines) a serving cell of each wireless terminal 4 in each period based on the determined optimal resource allocation rate.

Further, the cell determinator 22 notifies the selection (determination) result to the wireless base station 3A, and the wireless base station 3A controls the cells based on the selection (determination) result to change, add and delete the cells to which the wireless terminals 4 are to be connected.

That is, the cell determinator 22 functions as an example of a processor which selects connection destinations of a plurality of wireless terminals 4 in each period from a plurality of connection destination candidates to maximize an evaluation value based on each data rate in cases where each wireless terminal 4 is connected to each connection destination candidate in each period and each resource allocation rate for each wireless terminal 4 at each connection destination candidate in each period.

Each operation of the cell determinator 22 will be described in detail below.

(3.2) Operation Example of Wireless Communication System 1A

The wireless communication system 1A according to the second modified example executes the process illustrated in FIG. 5 similar to a wireless communication system 1. In this case, unlike the wireless communication system 1, the wireless communication system 1A calculates a signal-to-interference plus noise power ratio (SINR) in cases where each wireless terminal 4 is connected to each cell in each period according to following formula (8).

[Mathematical Formula 11]

$$SINR_{n,i,k} = \frac{P_{i,k}/L_{n,i}}{\sum_{\substack{j=1 \\ j \neq i}}^{N_{Cell}} P_{j,k}/L_{n,j} + N} \quad (8)$$

$SINR_{n,i,k}$ represents a SINR in cases where it is assumed that a wireless terminal 4-n (user #n) (n represents a natural number) is connected to a cell #i (i represents a natural number) in a kth (k represents a natural number) period (period #k), $P_{i,k}$ represents transmission power of the cell #i in the period #k, $L_{n,i}$ represents a path loss value between the user #n and the cell #i (i.e., propagation loss for the user #n in the cell #i), and N represents noise power.

In the present example, the control station 2A stores transmission power of each wireless base station 3A in advance. For example, transmission power $P_{i,k}$ is stored as illustrated in FIG. 16. $P_M$ represents a basic value of transmission power in a macrocell, and $P_p$ represents a basic value of transmission power in a picocell.

The control station 2A may receive a notification of transmission power from each wireless base station 3A. The control station 2A calculates a path loss value based on RSRP and transmission power of a reference signal.

Next, the cell determinator 22 creates an expectation rate table by calculating a data rate (expectation rate) for the cell #i of the wireless terminal 4-n in cases where it is assumed that the wireless terminal 4-n is connected to the cell #i in the period #k, using following formula (9).

[Mathematical Formula 12]

$$t_{n,i,k} = \eta_B B \log_2(1 + SINR_{n,i,k}/\eta_{SINR}) \quad (9)$$

$t_{n,i,k}$ represents an expectation rate in cases where it is assumed that the user #n is connected to the cell #i in the period #k, B represents a communication bandwidth, $\eta_B$ represents bandwidth efficiency, and $\eta_{SINR}$ represents SINR efficiency.

The cell determinator 22 estimates a throughput (user throughput) of each wireless terminal 4 in each cell in each period by defining the resource allocation rate $p_{n,i,k}$ related to each cell #i of each user #n in each period #k and multiplying the defined resource allocation rate $p_{n,i,k}$ and an expectation rate $t_{n,i,k}$.

A total throughput $T_n$ which is a value obtained by summing each throughput for cells and for periods in cases where it is assumed that each wireless terminal 4 is connected to each cell in each period is expressed by following formula (10).

[Mathematical Formula 13]

$$T_n = \sum_{i=1}^{N_{Cell}} \sum_{k=1}^{N_k} p_{n,i,k} t_{n,i,k} \quad (10)$$

When, for example, maximizing a logarithmic mean value of a total throughput $T_n$ (a logarithm of a geometric mean of the total throughput $T_n$ for the wireless terminals 4 in the present example) as an evaluation index (evaluation value) is taken into account, a problem illustrated in FIG. 17 may be defined.

In FIG. 17, $N_k$ represents the number of periods (2 in the present example).

A solution of the problem illustrated in FIG. 17 can be expressed by following formula (11) and following formula (12) by deforming KKT (Karush-Kuhn-Tucker) condition.

[Mathematical Formula 14]

$$\sum_n \max\left(\mu_{i,k} - \frac{T'_{n,i,k}}{t_{n,i,k}}, 0\right) = \beta_{i,k} \quad (11)$$

[Mathematical Formula 15]

$$p_{n,i,k} = \max\left(\mu_{i,k} - \frac{T'_{n,i,k}}{t_{n,i,k}}, 0\right) \quad (12)$$

$\mu_{i,k}$ represents a parameter which is determined to satisfy a constraint condition expressed by formula (11), and $\beta_{i,k}$ represents a transmittable/receivable time ratio. The transmittable/receivable time ratio is a ratio of a duration of a time during which data can be transmitted and received in the period #k with respect to a duration of a cycle (a time duration of one frame in the present example) in the cell #i. The transmittable/receivable time ratio may also be rephrased as a value obtained by summing for the wireless terminals 4 the resource allocation rates $p_{n,i,k}$ in the cell #i and the period #k.

In the present example, the control station 2A stores the transmittable/receivable time ratio of each wireless base station 3A in advance. For example, a transmittable/receivable time ratio $\beta_{i,k}$ is stored as illustrated in FIG. 18. α represents a stop time ratio (0.5 in the present example). The control station 2A may receive a notification of the transmittable/receivable time ratio from each wireless base station 3A.

$T'_{n,i,k}$ represents a total value of throughputs of the user #n which is expected in other cells #l (l=1, . . . , $N_{cell}$, and l≠i) when the cell #i is focused upon in other periods #m (m=1, . . . , $N_k$, and m≠k) in cases where the period #k is focused upon.

$T'_{n,i,k}$ is expressed by following formula.

[Mathematical Formula 16]

$$T'_{n,i,k} = \sum_{\substack{l=1 \\ l \neq i}}^{N_{Cell}} \sum_{\substack{m=1 \\ m \neq k}}^{N_k} p_{n,l,m} t_{n,l,m}$$

Figure 19:
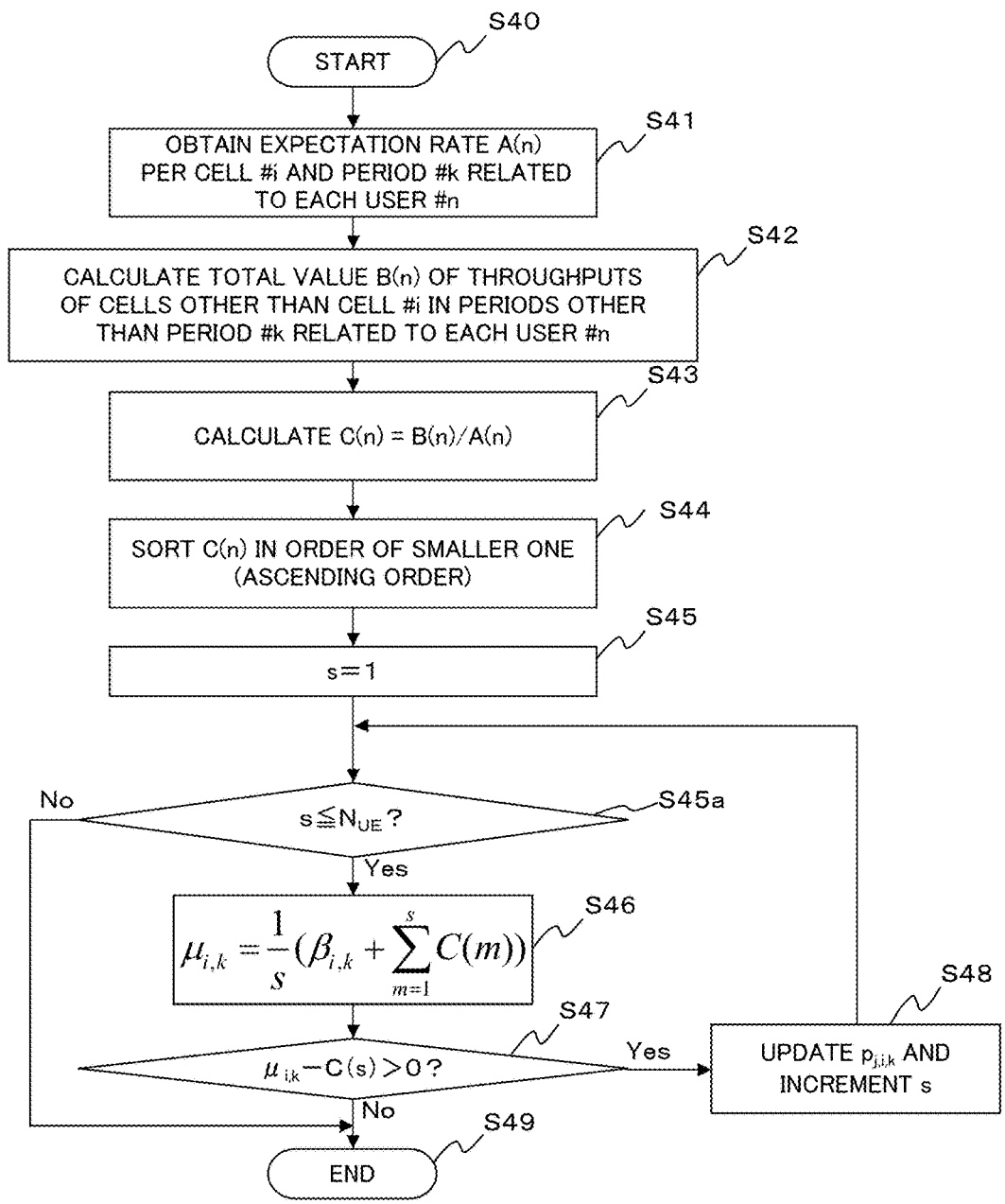
FIG. 19 illustrates a view illustrating an example of a process of creating an optimal resource allocation rate table.

This means that, when a total value of throughputs of the user #n which are expected in the other cells #l (l=1, . . . , $N_{Cell}$, and l≠i) in cases where the cell #i is focused upon in the other periods #m (m=1, . . . , $N_k$, and m≠k) in cases where the period #k is focused upon is known, it is possible to calculate a solution of the problem in FIG. 17 according to the procedure illustrated in FIG. 19.

As illustrated in FIG. 19, when a process of calculating the solution of the problem in FIG. 17 is started (step S40 in FIG. 19), the cell determinator 22 obtains an expectation rate A(n) of the cell #i in the period #k related to the user #n from the expectation rate table (step S41 in FIG. 19).

Next, the cell determinator 22 calculates a total value B(n) of throughputs of the cells #l other than the cell #i in the periods #m other than the period #k related to the user #n (step S42 in FIG. 19).

Further, the cell determinator 22 calculates for all cells #i and all periods #k

[Mathematical Formula 17]

$$C(n) = \frac{B(n)}{A(n)}$$

based on A(n) obtained in step S41 in FIG. 19 and B(n) calculated in step S42 in FIG. 19 (step S43 in FIG. 19), and sorts the calculated C(n) in order of smaller one (ascending order) (step S44 in FIG. 19).

Next, the cell determinator 22 sets a parameter s to an initial value "1" (step S45 in FIG. 19), and determines whether or not the parameter s is equal to or less than the total number of users $N_{UE}$ (step S45a in FIG. 19). When the parameter s is larger than the total number of users $N_{UE}$, the cell determinator 22 finishes the process in FIG. 19 (a No route of step S45a in FIG. 19). Meanwhile, when the parameter s is equal to or less than the total number of users $N_{UE}$, the cell determinator 22 moves to step S46 (a Yes route of step S45a in FIG. 19) and calculates a parameter $p_{i,k}$ using following formula (13) in order sorted in step S44 in FIG. 19 (step S46 in FIG. 19).

[Mathematical Formula 18]

$$\mu_{i,k} = \frac{1}{s}\left(\beta_{i,k} + \sum_{m=1}^{s} C(m)\right) \quad (13)$$

Further, the cell determinator 22 determines for $p_{i,k}$ calculated in step S46 in FIG. 19 whether or not following formula (14) holds (step S47 in FIG. 19).

[Mathematical Formula 19]

$$\mu_{i,k} - C(s) > 0 \quad (14)$$

When determining that the above formula (14) does not hold (a No route of step S47 in FIG. 19), the cell determinator 22 finishes the process of calculating the solution of the problem in FIG. 17 (step S49 in FIG. 19).

Meanwhile, when determining that the above formula (14) holds (a Yes route of step S47 in FIG. 19), the cell determinator 22 updates a resource allocation rate $p_{j,i,k}$ for each wireless terminal 4 (i.e., j=1, . . . , $N_{UE}$) in the cell #i in the period #k using the above formula (12), increases (increments) the parameter s by 1 (step S48 in FIG. 19) and repeats the processes in steps S45a to S48 in FIG. 19.

By so doing, the cell determinator 22 creates an optimal resource allocation rate table.

When a user throughput which is expected based on past scheduling in other cells in cases where the cell #i is focused upon and in other periods in cases where the period #k is focused upon is known, the cell determinator 22 may calculate using the user throughput and perform the process illustrated in FIG. 19. Alternatively, when a resource allocation rate for other cells in cases where the cell #i is focused upon and in other periods in cases where the period #k is focused upon is known, the cell determinator 22 may calculate using the resource allocation rate, and create the optimal resource allocation rate table. The user information obtainer 21 may obtain the past scheduling, the user throughput and the resource allocation rate in other cells in cases where the cell #i is focused upon and in other periods in cases where the period #k is focused upon, from the wireless base station 3A.

Meanwhile, when the resource allocation rate $p_{n,i,k}$ is not known or is not determined, an optimal resource allocation rate table may be created by assuming an initial value of the resource allocation rate of each cell #i in each period #k and sequentially updating the resource allocation rate using the process flow illustrated in FIG. 9 similar to the wireless communication system 1 according to the first embodiment.

Further, the cell determinator 22 selects (determines) a serving cell of each user (each wireless terminal 4) in each period by referring to the optimal resource allocation rate table created as described above.

For example, the cell determinator 22 may select (determine) a cell whose optimal resource allocation rate is the highest as a serving cell per user based on the optimal resource allocation rate table.

When the calculated resource allocation rate is lower than a certain threshold, the cell determinator 22 may set a connection destination candidate corresponding to the resource allocation rate no to be selected as connection destinations of the wireless terminals 4.

Alternatively, the cell determinator 22 may select (determine) a serving cell in descending order of, for example, optimal resource allocation rates per user for the wireless terminal 4 which supports carrier aggregation.

Alternatively, the cell determinator 22 may select (determine) a certain number of cells as serving cells in descending order of optimal resource allocation rates per user. When, for example, the number of component carriers which the wireless terminals 4 support is limited or when a scheduling process amount is reduced, this selecting method may be performed.

When an optimal resource allocation rate related to a cell which is not selected as a serving cell is equal to or more than a certain value, the optimal resource allocation rate may be calculated again according to the above-described method by setting an expectation rate of the cell to zero. Consequently, it is possible to improve optimal resource allocation rates related to other cells.

When a throughput of a cell selected as a serving cell for the user is larger than a throughput requested by the user, an optimal resource allocation rate may be calculated again according to the above-described method by reducing the resource allocation rate of the cell to a value corresponding to the throughput requested by the user.

Information about the selected (determined) serving cell is notified to the wireless base station 3A by the cell determinator 22, and the wireless base station 3A changes, adds and deletes the serving cell of each user based on the notification.

As described above, according to the present example, a serving cell is selected taking into account a load balance between users, so that it is possible to prevent a throughput of the wireless communication system 1A from lowering.

Alternatively, similar to the first modified example of the first embodiment, in the wireless communication system 1A according to the second modified example, the wireless base station 3A may have the function and the configuration of the control station 2A, and, in this case, the control station 2A may be omitted. According to this modified example, it is also possible to provide the same effect as that of the second modified example.

In the above example, each of the base station #1 and the base station #3 is configured to stop transmitting and receiving data in the third subframe and the fourth subframe (i.e., stop transmitting and receiving data in the third subframe and the fourth subframe in macrocells (the cell #1 and the cell #3)).

Figure 20:
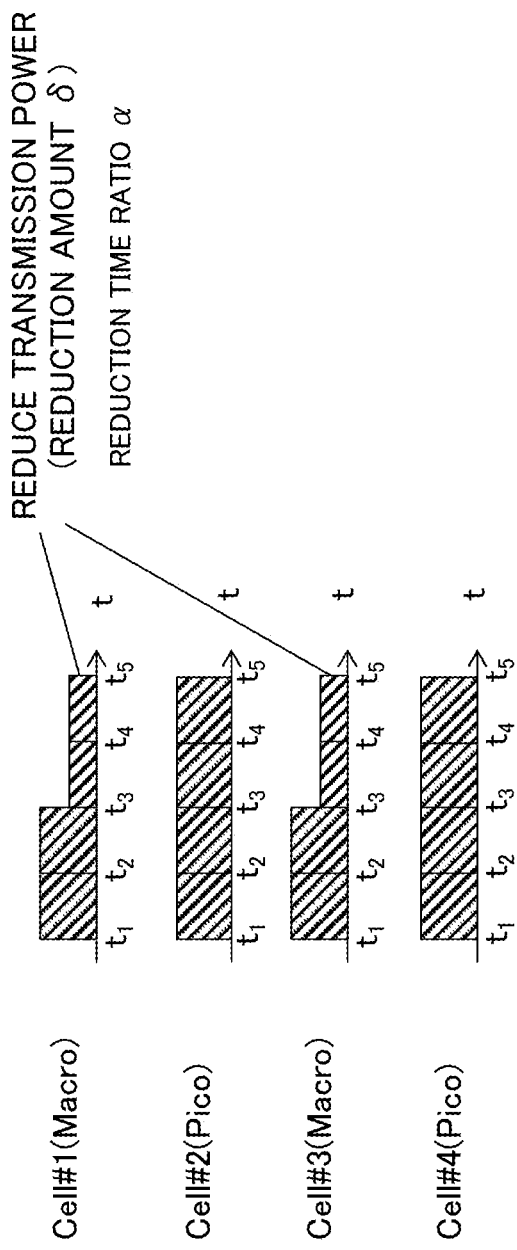
FIG. 20 is a time chart illustrating an example of transmission power per period and per cell.

By the way, each of the base station #1 and the base station #3 may be configured to make transmission power in the third subframe and the fourth subframe lower than transmission power in other subframes as illustrated in FIG. 20.

In the present example, each of the base station #1 and the base station #3 sets transmission power in the first subframe and the second subframe to a basic value $P_m$ of transmission power in a macrocell. Further, each of the base station #1 and the base station #3 sets transmission power in the third subframe and the fourth subframe to a value $P_m - \delta$ obtained by subtracting a reduction amount $\delta$ from the basic value $P_m$. Furthermore, each of the base station #2 and the base station #4 sets transmission power in each subframe to a basic value $P_p$ of transmission power in a picocell.

The control station 2A stores the transmission power $P_{i,k}$ as illustrated in FIG. 21. Alternatively, the control station 2A may receive a notification of transmission power from each wireless base station 3A.

Further, the control station 2A stores the transmittable/receivable time ratio $\beta_{i,k}$ as illustrated in FIG. 22. $\alpha$ represents a reduction time ratio (0.5 in the present example). The reduction time ratio $\alpha$ is a ratio of a time (i.e., a sum of a time duration of the third subframe and a time duration of the fourth subframe) during which transmission power is reduced with respect to a time (i.e., a time duration of one frame) during which data can be transmitted and received. Alternatively, the reduction time ratio $\alpha$ may be set to an arbitrary value from 0 through 1. In addition, the control station 2A may receive a notification of the transmittable/receivable time ratio from each wireless base station 3A.

In the present example, the wireless communication system 1A operates similar to the above case, so that it is also possible to prevent the throughput of the wireless communication system 1A from lowering.

Figure 23:
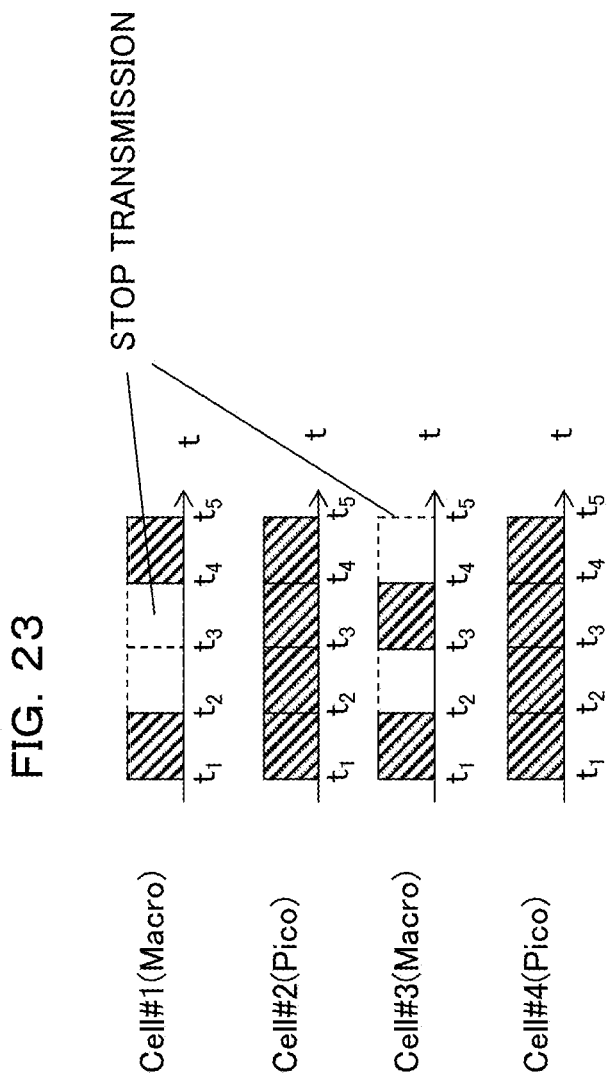
FIG. 23 is a time chart illustrating an example of transmission power per period and per cell.

Alternatively, as illustrated in FIG. 23, the base station #1 and the base station #3 may be configured to stop transmitting and receiving data in different subframes. For example, the base station #1 may be configured to stop transmitting and receiving data in the second subframe and the third subframe, and the base station #3 may be configured to stop transmitting and receiving data in the second subframe and the fourth subframe.

In the present example, the base station #1 sets transmission power in the first subframe and the fourth subframe to the basic value $P_m$ of transmission power in a macrocell. Further, the base station #3 sets transmission power in the first subframe and the third subframe to the basic value $P_m$. Furthermore, each of the base station #2 and the base station #4 sets transmission power in each subframe to the basic value $P_p$ of transmission power in a picocell.

The control station 2A stores the transmission power $P_{i,k}$ as illustrated in FIG. 24. Alternatively, the control station 2A may receive a notification of transmission power from each wireless base station 3A.

Further, the control station 2A stores the transmittable/receivable time ratio $\beta_{i,k}$ as illustrated in FIG. 25. $\alpha_0$ represents a time duration of the first subframe (i.e., a time from a time point $t_1$ to a time point $t_2$), $\alpha_1$ represents a time duration of the second subframe (i.e., a time from the time point $t_2$ to a time point $t_3$), $\alpha_2$ represents a time duration of the third subframe (i.e., a time from the time point $t_3$ to a time point $t_4$) and $\alpha_3$ represents a time duration of the fourth subframe (i.e., a time from the time point $t_4$ to a time point $t_5$). The control station 2A may receive a notification of the transmittable/receivable time ratio from each wireless base station 3A.

In the present example, the wireless communication system 1A operates similar to the above case, so that it is also possible to prevent the throughput of the wireless communication system 1A from lowering.

Figure 26:
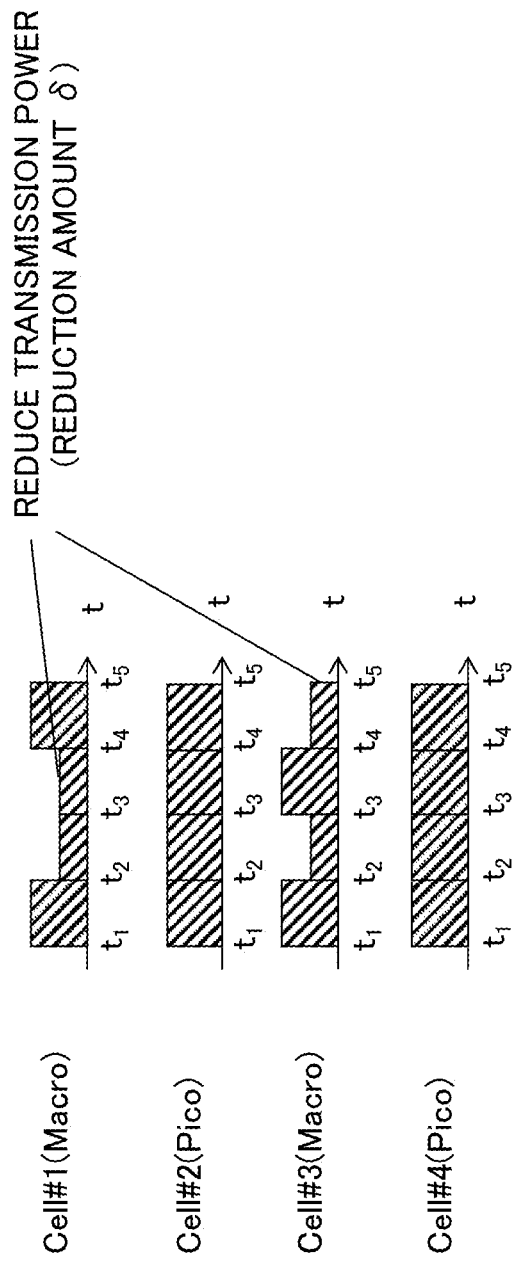
FIG. 26 is a time chart illustrating an example of transmission power per period and per cell.

Alternatively, the base station #1 and the base station #3 may be configured to make transmission power in different subframes lower than transmission power in other subframes as illustrated in FIG. 26.

In the present example, the base station #1 sets transmission power in the first subframe and the fourth subframe to the basic value $P_m$ of transmission power in a macrocell. Further, the base station #1 sets transmission power in the second subframe and the third subframe to the value $P_m-\delta$ obtained by subtracting the reduction amount $\delta$ from the basic value $P_m$. Furthermore, the base station #3 sets transmission power in the first subframe and the third subframe to the basic value $P_m$. Still further, the base station #3 sets transmission power in the second subframe and the fourth subframe to the value $P_m-\delta$ obtained by subtracting the reduction amount $\delta$ from the basic value $P_m$. Moreover, each of the base station #and the base station #4 sets transmission power in each subframe to the basic value $P_p$ of transmission power in a picocell.

Hence, the control station 2A stores the transmission power $P_{i,k}$ as illustrated in FIG. 27. Alternatively, the control station 2A may receive a notification of transmission power from each wireless base station 3A.

The control station 2A stores the transmittable/receivable time ratio $\beta_{i,k}$ as illustrated in FIG. 28. $\alpha_0$ represents a time duration of the first subframe (i.e., a time from a time point $t_1$ to a time point $t_2$), $\alpha_1$ represents a time duration of the second subframe (i.e., a time from the time point $t_2$ to a time point $t_3$), $\alpha_2$ represents a time duration of a third subframe (i.e., a time from the time point $t_3$ to a time point $t_4$) and $\alpha_3$ represents a time duration of the fourth subframe (i.e., a time from the time point $t_4$ to a time point $t_5$). The control station 2A may receive a notification of the transmittable/receivable time ratio from each wireless base station 3A.

In the present example, the wireless communication system 1A operates similar to the above case, so that it is also possible to prevent the throughput of the wireless communication system 1A from lowering.

[4] Hardware Configuration Example

Figure 29:
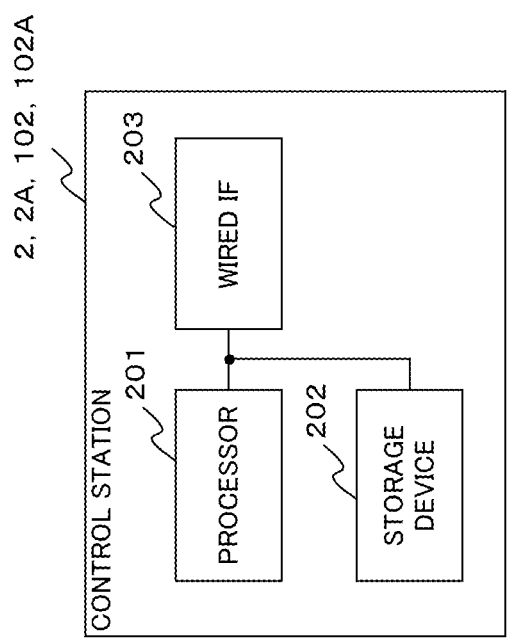
FIG. 29 illustrates a view illustrating a hardware configuration example of a control station.

Next, FIG. 29 illustrates a hardware configuration of control station 2 or 2A.

As illustrated in FIG. 29, the control station 2 or 2A includes, for example, a processor 201, a storage device 202 and a wired interface (IF) 203.

The processor 201 is a device which processes data, and includes, for example, a CPU (Central Processing Unit), a DSP (Digital Signal Processor), a LSI (Large Scale Integration), and a FPGA (Field Programmable Gate Array).

The storage device 202 is a device which stores data, and includes, for example, a ROM (Read Only Memory), a RAM (Random Access Memory), a magnetic disk, an optical disk and a flash memory.

The wired IF 203 is an interface device which performs communication with a core network and the wireless base stations 3 or 3A.

In addition, a correlation relationship between each configuration of the control station 2 illustrated in FIG. 2 and each configuration of the control station 2 illustrated in FIG. 29 is, for example, as follows.

The wired IF 203 corresponds to, for example, the user information obtainer 21, and the processor 201 and the storage device 202 correspond to, for example, the cell determinator 22.

That is, the processor 201 and the storage device 202 may function as an example of a processor which selects connection destinations of a plurality of wireless terminals 4 from a plurality of connection destination candidates to maximize an evaluation value based on each data rate in cases where each wireless terminal 4 is connected to each connection destination candidate and each resource allocation rate for each wireless terminal 4 at each connection destination candidate.

Further, a correlation relationship between each configuration of the control station 2A and each configuration of the control station 2A illustrated in FIG. 29 is, for example, as follows.

The wired IF 203 corresponds to, for example, the user information obtainer 21, and the processor 201 and the storage device 202 correspond to, for example, the cell determinator 22.

That is, the processor 201 and the storage device 202 may function as an example of a processor which selects connection destinations of a plurality of wireless terminals 4 in each period from a plurality of connection destination candidates to maximize an evaluation value based on each data rate in cases where each wireless terminal 4 is connected to each connection destination candidate in each period and each resource allocation rate for each wireless terminal 4 at each connection destination candidate in each period.

Figure 30:
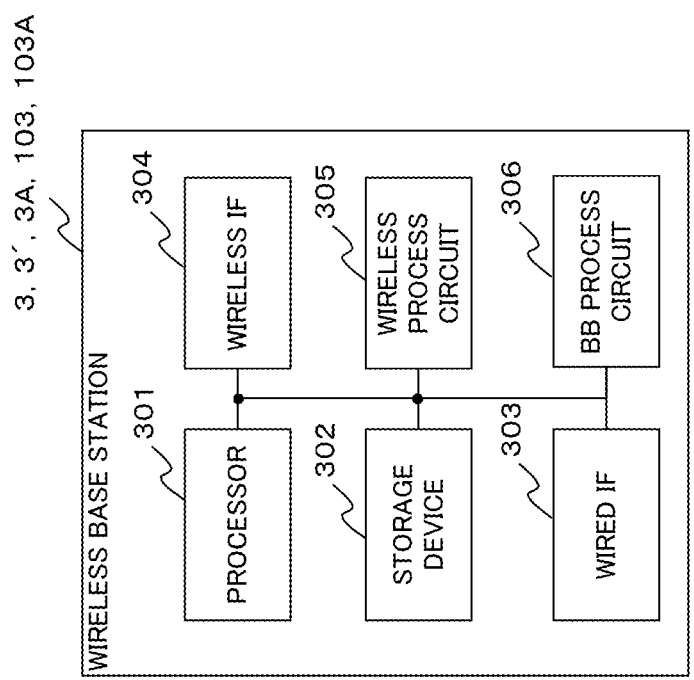
FIG. 30 illustrates a view illustrating a hardware configuration example of a wireless base station.

FIG. 30 illustrates a hardware configuration example of wireless base station 3, 3' or 3A.

As illustrated in FIG. 30, the wireless base station 3, 3' or 3A includes, for example, a processor 301, a storage device 302, a wired IF 303, a wireless interface (IF) 304, a wireless process circuit 305 and a baseband (BB) process circuit 306.

The processor 301 is a device which processes data, and includes, for example, a CPU, a DSP, a LSI and a FPGA.

The storage device 302 is a device which stores data, and includes, for example, a ROM, a RAM, a magnetic disk, an optical disk and a flash memory.

The wired IF 303 is an interface device which performs wired communication with the control station 2 or 2A and a network (so-called backhaul network) on a core network side.

The wireless IF 304 is an interface device which performs wireless communication with the wireless terminals 4.

The wireless process circuit 305 is a circuit which performs a process such as low noise amplification, frequency conversion into a baseband frequency (down-conversion) and A/D (analog/digital) conversion on wireless signals received by the wireless IF 304, and D/A conversion of transmission data, frequency conversion into a wireless frequency (up-conversion) and power amplification on the wireless signals transmitted from the wireless IF 304.

The BB process circuit 306 is a circuit which performs a certain baseband process on wireless signals received by the wireless IF 304 and performs a certain baseband process on signals transmitted through the wireless IF 304, and includes, for example, a LSI and a FPGA.

A correlation relationship between each configuration of the wireless base station 3 illustrated in FIG. 3 and each configuration of the wireless base station 3 illustrated in FIG. 30 is, for example, as follows.

The wireless IF 304 corresponds to, for example, an antenna 31 and an antenna duplexer 32, and the wireless process circuit 305 and the BB process circuit 306 correspond to, for example, a transmission processor 37 and a reception processor 33.

Further, the processor 301 and the storage device 302 correspond to, for example, a UL scheduler 34, a user information manager 35 and a DL scheduler 36, and the wired IF 303 corresponds to, for example, the user information manager 35.

A correlation relationship between each configuration of the wireless base station 3' illustrated in FIG. 13 and each configuration of the wireless base station 3' illustrated in FIG. 30 is, for example, as follows.

The wireless IF 304 corresponds to, for example, an antenna 31' and an antenna duplexer 32', and the wireless process circuit 305 and the BB process circuit 306 correspond to, for example, a transmission processor 37' and a reception processor 33'.

Further, the processor 301 and the storage device 302 correspond to, for example, a UL scheduler 34', a user information manager 35', a DL scheduler 36' and a cell determinator 22', and the wired IF 303 corresponds to, for example, a user information obtainer 21'.

The processor 301 and the storage device 302 may function as an example of a processor which selects connection destinations of a plurality of wireless terminals 4 from a plurality of connection destination candidates to maximize an evaluation value based on each data rate in cases where each wireless terminal 4 is connected to each connection destination candidate and each resource allocation rate for each wireless terminal 4 at each connection destination candidate.

A correlation relationship between each configuration of the wireless base station 3A and each configuration of the wireless base station 3A illustrated in FIG. 30 is, for example, as follows.

The wireless IF 304 corresponds to, for example, the antenna 31 and the antenna duplexer 32, and the wireless process circuit 305 and the BB process circuit 306 correspond to, for example, the transmission processor 37 and the reception processor 33.

Further, the processor 301 and the storage device 302 correspond to, for example, the UL scheduler 34, the user information manager 35 and the DL scheduler 36, and the wired IF 303 corresponds to, for example, the user information manager 35.

Figure 31:
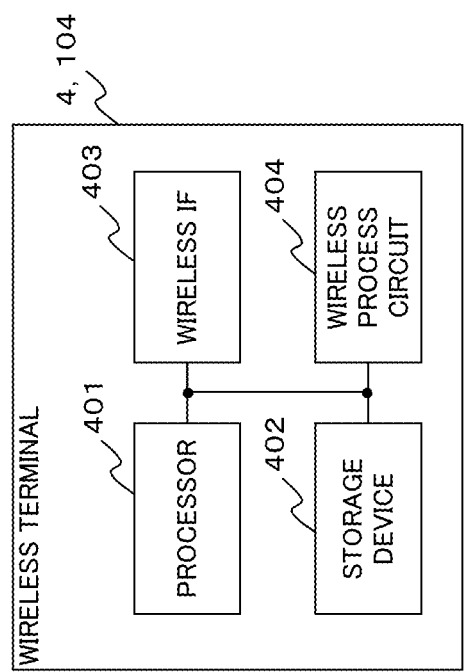
FIG. 31 illustrates a view illustrating a hardware configuration example of a wireless terminal.

FIG. 31 illustrates a hardware configuration example of the wireless terminal 4.

As illustrated in FIG. 31, the wireless terminal 4 includes, for example, a processor 401, a storage device 402, a wireless IF 403 and a wireless process circuit 404.

The processor 401 is a device which processes data, and includes, for example, a CPU, a DSP, a LSI or a FPGA.

The storage device 402 is a device which stores data and includes, for example, a ROM, a RAM, a magnetic disk, an optical disk or a flash memory.

The wireless IF 403 is an interface device which performs wireless communication with the wireless base station 3, 3' or 3A.

The wireless process circuit 404 is a circuit which performs a process such as low noise amplification, frequency conversion into a baseband frequency (down-conversion) and A/D (analog/digital) conversion on wireless signals received by the wireless IF 403, and a process such as D/A conversion of transmission data, frequency conversion into a wireless frequency (up-conversion) and power amplification on the wireless signals transmitted from the wireless IF 403.

A correlation relationship between each configuration of the wireless terminal 4 illustrated in FIG. 4 and each configuration of the wireless terminal 4 illustrated in FIG. 31 is, for example, as follows.

The wireless IF 403 corresponds to, for example, an antenna 41 and an antenna duplexer 42, the wireless process circuit 404 corresponds to, for example, a transmission processor 45 and a reception processor 43 and the processor 401 and the storage device 402 correspond to, for example, a controller 44.

The wireless IF 403 functions as an example of a communicator which performs wireless communication through a connection destination selected by the control station 2 or 2A or the wireless base station 3'.

[5] Others

Each configuration, each means and each function of the above wireless communication systems 1, 1' and 1A, the control stations 2 and 2A, the wireless base stations 3, 3' and 3A, and the wireless terminals 4 may be taken and left when necessary or may be optionally combined. That is, each configuration and each function may be taken and left or may be optionally combined and used to fulfill the above function of the present disclosure.

Alternatively, the above serving cell selection (determination) process targets may be, for example, all wireless terminals 4 which are connected to the wireless communication system 1, 1' or 1A or may be limited to the wireless terminals 4 which are actually performing communication.

Alternatively, the above serving cell selection (determination) process targets may be, for example, the wireless terminals 4 which continue communication for a certain time or more or may be limited to the wireless terminals 4 whose moving speeds are smaller than a certain speed.

Each serving cell is determined for each wireless terminal 4 in the above serving cell selection (determination) process. When, for example, a plurality of wireless terminals 4 concentrates in a certain range, the above serving cell selection (determination) process may be performed by regarding a group including a plurality of wireless terminals 4 as one user. In this case, an average value in the group can be used as RSRP, an expectation rate, a resource allocation rate and a throughput.

For example, in this case, an average throughput $$\overline{T}_n$$

of a user group #n in the cell #i is expressed by following formula (3)'.

[Mathematical Formula 20]

$$\overline{T}_n = \sum_i \overline{p}_{n,i} \overline{r}_{n,i} \qquad (3)'$$

Here, $$\overline{p}_{n,i}$$

represents a resource allocation rate related to the cell #i of the user group #n, and $$\overline{r}_{n,i}$$

represents an average expectation rate related to the cell i of the user group #n.

When, for example, maximizing a logarithmic mean value of an average throughput $$\overline{T}_n$$

Figure 32:
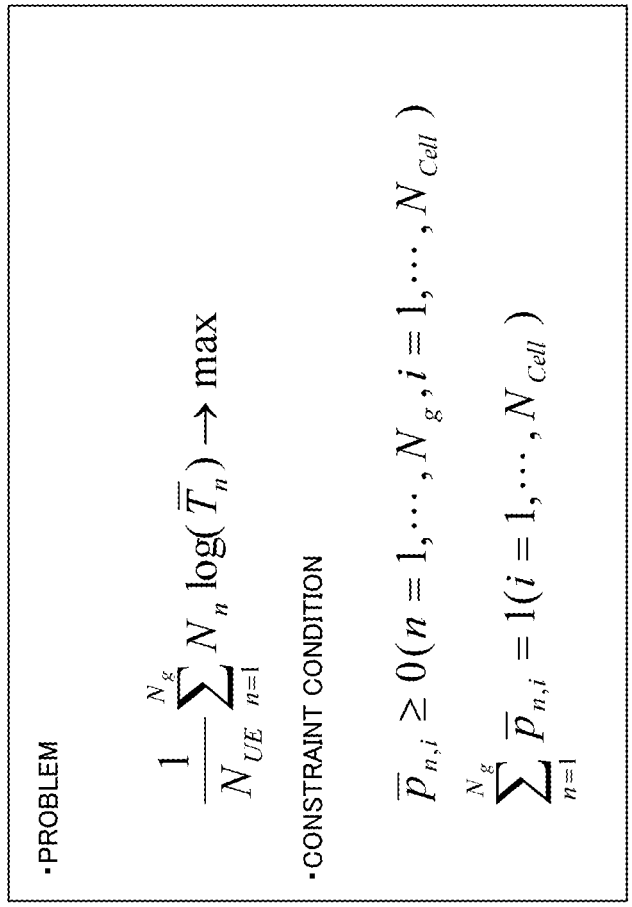
FIG. 32 illustrates a view illustrating an example of an optimization problem.

(a logarithm of a geometric mean for user group of a value obtained by multiplying the average throughput of the user group with the number of users in the user group in the present example) as an evaluation index is taken into account, a problem illustrated in FIG. 32 may be defined.

In FIG. 32, $N_g$ represents the total number of user groups which are serving cell selection (determination) process targets, and $N_n$ represents the number of users in the user group #n.

A solution of the problem illustrated in FIG. 32 may be expressed by following formula (15) and following formula (16) by deforming KKT (Karush-Kuhn-Tucker) condition.

[Mathematical Formula 21]

$$\sum_{n}^{N_g} \max\left(N_n \mu_i - \frac{\overline{T}'_{n,i}}{\overline{t}_{n,i}}, 0\right) = 1 \quad (15)$$

[Mathematical Formula 22]

$$\overline{p}_{n,i} = \max\left(N_n \mu_i - \frac{\overline{T}'_{n,i}}{\overline{t}_{n,i}}, 0\right) \quad (16)$$

Here,
$\overline{T}'_{n,i}$ represents a total value of average throughputs of the user group #n which is expected in other cells #q (q=1, ..., $N_{cell}$, and q≠i) when the cell #i is focused upon.

This means that, when a total value $\overline{T}'_{n,i}$ of average throughputs of the user group #n which is expected in the other cells #q (q=1, ..., $N_{cell}$, and q≠i) in cases where the cell #i is focused upon, it is possible to calculate a solution of the problem in FIG. 32 according to the procedure illustrated in FIG. 8.

Subsequently, it is possible to calculate the solution of the problem in FIG. 32 as described above with reference to FIGS. 8 to 11, and the cell determinator 22 or 22' may select (determine) the serving cell of each user group #n based on the calculated solution.

The control station 2 or 2A or the wireless base station 3' may be configured to determine whether or not to change a wireless parameter based on the above evaluation index. For example, the wireless parameter includes at least one of transmission power, a carrier on/off pattern, a FFR (Fractional Frequency Reuse) cell edge band pattern, a connection bias and an antenna beam.

For example, before actually changing the wireless parameter, the control station 2 or 2A or the wireless base station 3' calculates the optimal resource allocation rate in cases where the changed wireless parameter is assumingly used, and performs the determination based on the evaluation index (changed evaluation index) based on the calculated optimal resource allocation rate and a current evaluation index (an evaluation index which is not yet changed, i.e., an evaluation index based on the optimal resource allocation rate in cases where the wireless parameter which is not yet changed is used).

For example, the control station 2 or 2A or the wireless base station 3' actually changes the wireless parameter when the changed evaluation index is improved (increases in the present example) compared to the evaluation index which is not yet changed, and stops changing the wireless parameter when the changed evaluation index is not improved (decreases in the present example) compared to the evaluation index which is not yet changed.

Alternatively, the control station 2 or 2A or the wireless base station 3' may control resources (e.g., at least one of a time domain (communication timing) and a frequency domain (allocated frequency)) related to scheduling of each wireless terminal 4 based on the calculated optimal resource allocation rate. For example, the control station 2 or 2A or the wireless base station 3' sets or changes resources related to the scheduling of each wireless terminal 4 such that the actual resource allocation rate for each wireless terminal 4 matches the calculated optimal resource allocation rate.

Figure 33:
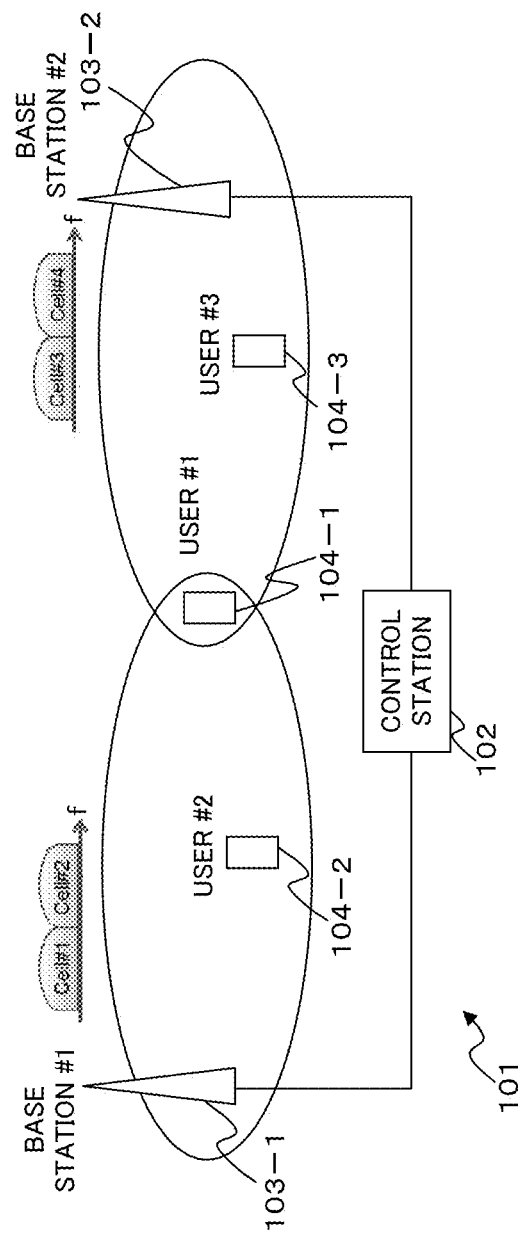
FIG. 33 illustrates a view illustrating a configuration example of a wireless communication system according to a second embodiment.

[6] Second Embodiment (6.1) Configuration Example of Wireless Communication System FIG. 33 illustrates a view illustrating a configuration example of a wireless communication system according to the second embodiment.

A wireless communication system 101 illustrated in FIG. 33 includes, for example, a control station 102, wireless base stations 103-1 and 103-2 and wireless terminals 104-1, 104-2 and 104-3 which are examples of user equipment (UE).

The wireless base stations 103-1 and 103-2 may be also referred to as a base station #1 and a base station #2, respectively. Further, when the wireless base stations 103-1 and 103-2 are not distinguished, each of the wireless base stations 103-1 and 103-2 may be also referred to simply as a wireless base station 103 or the base station 103. Furthermore, the wireless terminals 104-1, 104-2 and 104-3 may be also referred to as a user #1, a user #2 and a user #3, respectively, and, when the wireless terminals 104-1, 104-2 and 104-3 are not distinguished, each of the wireless terminals 104-1, 104-2 and 104-3 may be also referred to simply as a wireless terminal 104. Still further, the number of wireless base stations 103 and the number of wireless terminals 104 are not limited to the numbers illustrated in FIG. 33, respectively.

The wireless base station 103 has a function of providing a wireless area such as a cell or a sector, and performing wireless communication with the wireless terminal 104 through the wireless area.

In the example illustrated in FIG. 33, the base station #1 provides a cell #1 and a cell #2 as wireless areas, and perform wireless communication with the user #1 and the user #2 through at least one of the cell #1 and the cell #2. Further, the base station #2 provides, for example, a cell #3 and a cell #4 as wireless areas and perform wireless communication with the user #1 and the user #3 through at least one of the cell #3 and the cell #4.

In the example illustrated in FIG. 33, connection destination candidates of the user #1 are the cell #1 to the cell #4, connection destination candidates of the user #2 are the cells #1 and #2, and connection destination candidates of the user #3 are the cells #3 and #4. In addition, connection destination candidates of the wireless terminal 104 may be changed depending on movement of the wireless terminal 104 or opening, stopping and closing of the wireless base station 103.

The wireless terminal 104 has a function of performing wireless communication with the wireless base station 103 through a cell selected as a connection destination.

The control station 102 is connected with the wireless base stations 103 through cables, and has a function of controlling the wireless base stations 103. Further, the control station 102 may have a function of controlling the wireless terminals 104 through the wireless base stations 103.

In the present example, the control station 102 functions as an example of a control device which determines (selects) a connection destination of the wireless terminal 104 from a plurality of connection destination candidates.

For example, the control station 102 calculates a data rate (also referred to as an expectation rate) which is expected in cases where each wireless terminal 104 is allocated to each cell of a connection destination candidate, based on information related to a reception strength of a wireless signal which each wireless terminal 104 can receive through each cell of a connection destination candidate.

Further, the control station 102 calculates a metric value based on the calculated expectation rate and the connected terminal number, which is the number of wireless terminals 104 to be connected to each connection destination candidate.

Next, the control station 102 selects a serving cell as a connection destination of each wireless terminal 104 based on the calculated metric value.

According to the present example, it is possible to select the connection destination of the wireless terminal 104 by taking into account not only reception strengths of wireless signals but also a load balance, so that it is possible to prevent a throughput of the wireless communication system 101 from lowering.

Configuration examples of the control station 102, the wireless base station 103 and the wireless terminal 104 and an operation example of the wireless communication system 101 will be described below. The configuration examples of the control station 102, the wireless base station 103 and the wireless terminal 104 and the operation example of the wireless communication system 101 are only examples, and the present disclosure is not limited to the configuration example and the operation example described below.

(6.2) Configuration Example of Control Station 102

Figure 34:
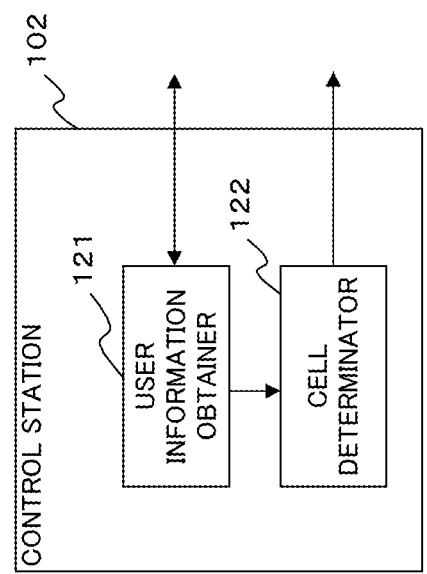
FIG. 34 illustrates a view illustrating a configuration example of a control station illustrated in FIG. 33.

FIG. 34 illustrates a view illustrating a configuration example of the control station 102.

The control station 102 illustrated in FIG. 34 includes, for example, a user information obtainer 121 and a cell determinator 122.

The user information obtainer 121 obtains information related to a reception strength of a wireless signal which each wireless terminal 104 can receive through each cell of a connection destination candidate.

For example, the user information obtainer 121 first instructs the wireless base station 103 to execute a process of optimizing a connection destination.

The wireless base station 103 having received the instruction instructs, for example, the wireless terminal 104 under the wireless base station 103 to measure and feed back reference signal reception power (RSRP) of surrounding cells.

Each wireless terminal 104 having received the above instruction from the wireless base station 103 measures RSRP of surrounding cells, and feeds back the RSRP to the wireless base station 103.

Further, the wireless base station 103 notifies the RSRP of the surrounding cells collected from each wireless terminal 104, to the user information obtainer 121 of the control station 102.

As described above, the user information obtainer 121 obtains the RSRP of the surrounding cells measured by each wireless terminal 104.

Alternatively, when each wireless terminal 104 measures RSRP on a regular basis and reports the RSRP to the wireless base station 103, the user information obtainer 121 may obtain the RSRP which has already been collected by the wireless base station 103. By so doing, an operation of additionally obtaining RSRP can be skipped, so that it is possible to suppress an increase in a communication amount of the wireless communication system 101. Meanwhile, it is preferable from the point of view of reliability of RSRP that RSRP is additionally obtained as described above.

The cell determinator 122 calculates a data rate (expectation rate) expected in cases where each wireless terminal 104 is allocated to each cell of a connection destination candidate (each wireless terminal 104 is connected to each cell of a connection destination candidate), based on information obtained by the user information obtainer 121 and related to the reception strength.

Next, the cell determinator 122 calculates a metric value based on the calculated data rate and the connected terminal number, which is the number of wireless terminals 104 to be connected to each connection destination candidate. Further, the cell determinator 122 selects (determines) a serving cell as a connection destination of each wireless terminal 104 based on the calculated metric value.

Subsequently, the cell determinator 122 notifies the above selection (determination) result to the wireless base stations 103, and the wireless base stations 103 controls cells based on the selection (determination) result, so that cells to which the wireless terminals 104 are to be connected are changed, added and deleted.

That is, the cell determinator 122 functions as an example of a processor which selects connection destinations to which the wireless terminals 104 are connected, from a plurality of connection destination candidates, based on each data rate in cases where each wireless terminal 104 is connected to each connection destination candidate and the connected terminal number, which is the number of wireless terminals 104 to be connected to each connection destination candidate.

Details of each operation of the cell determinator 122 will be described below.

(6.3) Configuration Example of Wireless Base Station 103

Figure 35:
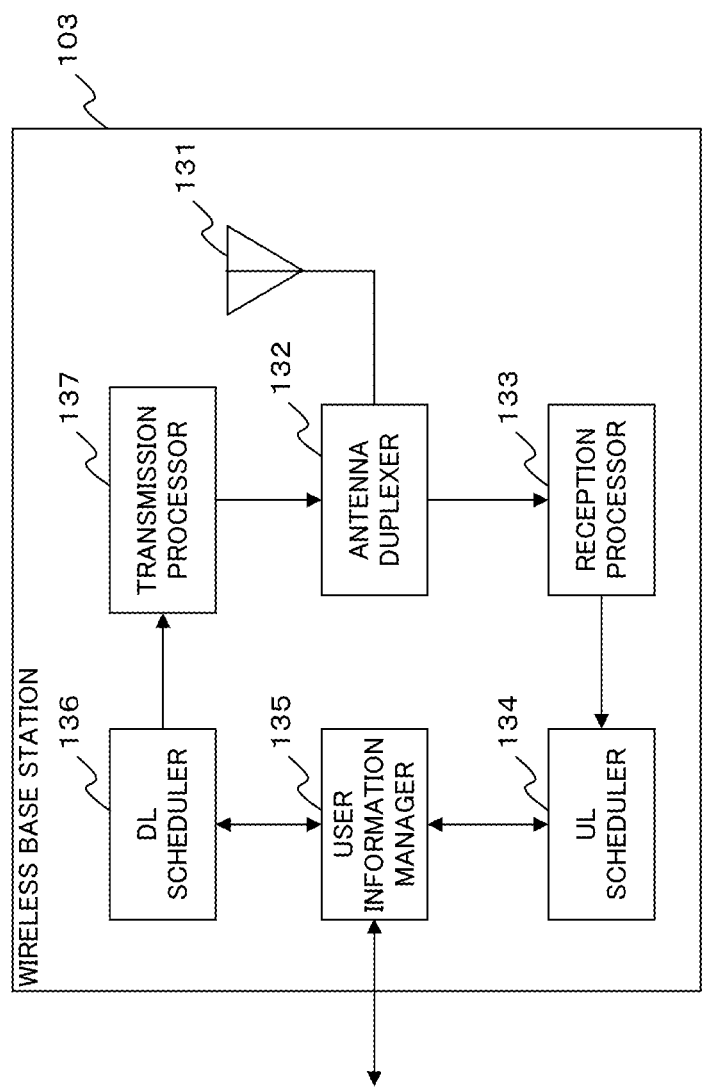
FIG. 35 illustrates a view illustrating a configuration example of a wireless base station illustrated in FIG. 33.

FIG. 35 illustrates a view illustrating a configuration example of the wireless base station 103.

The wireless base station 103 illustrated in FIG. 35 includes, for example, an antenna 131, an antenna duplexer 132, a reception processor 133, a UL (UpLink) scheduler 134, a user information manager 135, a DL (DownLink) scheduler 136 and a transmission processor 137.

The antenna 131 transmits and receives wireless signals to and from the wireless terminals 104 positioned (existing) in a wireless area such as a cell provided by the wireless base station 103. Alternatively, the antenna 131 may also indirectly transmit and receive wireless signals to and from the wireless terminals 104 positioned outside a range of a wireless area such as a cell provided by the wireless base station 103, through a repeater which relays the wireless signals.

The antenna duplexer 132 is a device which switches a transmitting/receiving function at the antenna 131. When the wireless base station 103 individually has a transmission antenna and a reception antenna instead of the antenna 131, the antenna duplexer 132 is omitted.

The reception processor 133 performs a certain wireless reception process on wireless signals received at the antenna 131. The wireless reception process includes, for example, a process such as low noise amplification on received wireless signals, frequency conversion into a baseband frequency (down-conversion) and A/D (analog/digital) conversion, and a baseband process.

The UL scheduler 134 schedules communication in uplink (UL). For example, the UL scheduler 134 may perform scheduling of the UL based on the UL received data received by the reception processor 133, and a reception process result of the reception processor 133 and UL reception quality. A UL scheduling result, UL received data received by the reception processor 133, and a reception process result of the reception processor 133 and UL reception quality may be notified to the user information manager 135.

The DL scheduler 136 schedules communication in downlink (DL). For example, the DL scheduler 136 may perform scheduling of the DL based on user information managed by the user information manager 135.

The transmission processor 137 performs a certain wireless transmission process on wireless signals transmitted from the antenna 131. The wireless transmission process includes, for example, a process such as D/A (Digital/Analog) conversion of transmission data, frequency conversion into a wireless frequency (up-conversion) and power amplification, and a baseband process.

The user information manager 135 includes a function of obtaining and managing scheduling results of the UL scheduler 134 and the DL scheduler 136, UL received data received by the reception processor 133, and a reception process result of the reception processor 133 and UL reception quality.

The user information manager 135 may cause each wireless terminal 104 to measure RSRP of the surrounding cells and transmit a feedback of a measurement result by collaborating with the UL scheduler 134, the DL scheduler 136, the transmission processor 137 and the reception processor 133 in response to an instruction from the user information obtainer 121 of the control station 102.

The user information manager 135 may collect and notify the obtained information to the user information obtainer 121 of the control station 102. As described below, information fed back from the UE 104 includes RSRP and a cell ID. The user information manager 135 may notify RSRP, a cell ID and, in addition, information (user ID) for identifying the wireless terminal 104 (user) to the control station 102.

The user information manager 135 may change, add and delete a connection destination cell of each wireless terminal 104 based on the serving cell selection (determination) process result notified from the cell determinator 122 of the control station 102.

(6.4) Configuration Example of Wireless Terminal 104

Figure 36:
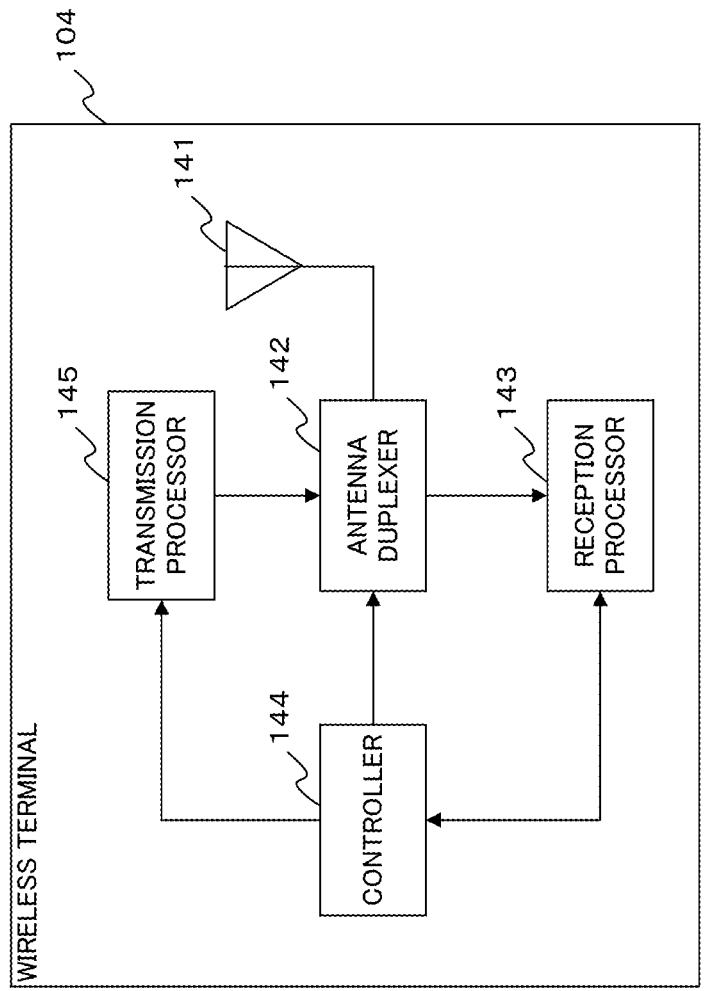
FIG. 36 illustrates a view illustrating a configuration example of a wireless terminal illustrated in FIG. 33.

FIG. 36 illustrates a view illustrating a configuration example of the wireless terminal 104.

The wireless terminal 104 illustrated in FIG. 36 includes, for example, an antenna 141, an antenna duplexer 142, a reception processor 143, a controller 144 and a transmission processor 145.

The antenna 141 transmits and receives wireless signals to and from the wireless base station 103 provided by a wireless area such as a cell in which the wireless terminal 104 exists. The antenna 141 may also indirectly transmit and receive wireless signals to and from the wireless base station 103 which is different from the wireless base station 103 which provides the wireless area such as a cell in which the wireless terminal 104 exists, through a repeater which relays the wireless signals.

Further, the antenna 141 performs wireless communication with the wireless base station 103 through a connection destination selected by the control station 102.

That is, the antenna 141 functions as an example of a communicator which performs wireless communication through a connection destination selected by the control station 102.

The antenna duplexer 142 is a device which switches a transmitting/receiving function of the antenna 141. When the UE 104 individually has a transmission antenna and a reception antenna instead of the antenna 141, the antenna duplexer 142 is omitted.

The reception processor 143 performs a certain wireless reception process on wireless signals received at the antenna 141. The wireless reception process includes, for example, a process such as low noise amplification on received wireless signals, frequency conversion into a baseband frequency (down-conversion) and A/D conversion.

The transmission processor 145 performs a certain wireless transmission process on wireless signals transmitted from the antenna 141. The wireless transmission process includes, for example, a process such as D/A conversion of transmission data, frequency conversion into a wireless frequency (up-conversion) and power amplification.

The controller 144 controls operations of the antenna duplexer 142, the reception processor 143 and the transmission processor 145. Further, the controller 144 generates UL transmission data transmitted from the antenna 141, and provides DL received data received by the antenna 141 and the reception processor 143, to various application processors (not illustrated).

Furthermore, when the reception processor 143 receives from the wireless base station 103 an instruction to measure and feed back RSRP, the controller 144 obtains RSRP of each cell by measuring reception power of wireless signals received in the surrounding cells of the wireless terminal 104.

Still further, the controller 144 associates the obtained RSRP and information (cell ID) for identifying a cell corresponding to the obtained RSRP, and transmits a feedback to the wireless base station 103.

(6.5) Operation Example of Wireless Communication System 101

Figure 37:
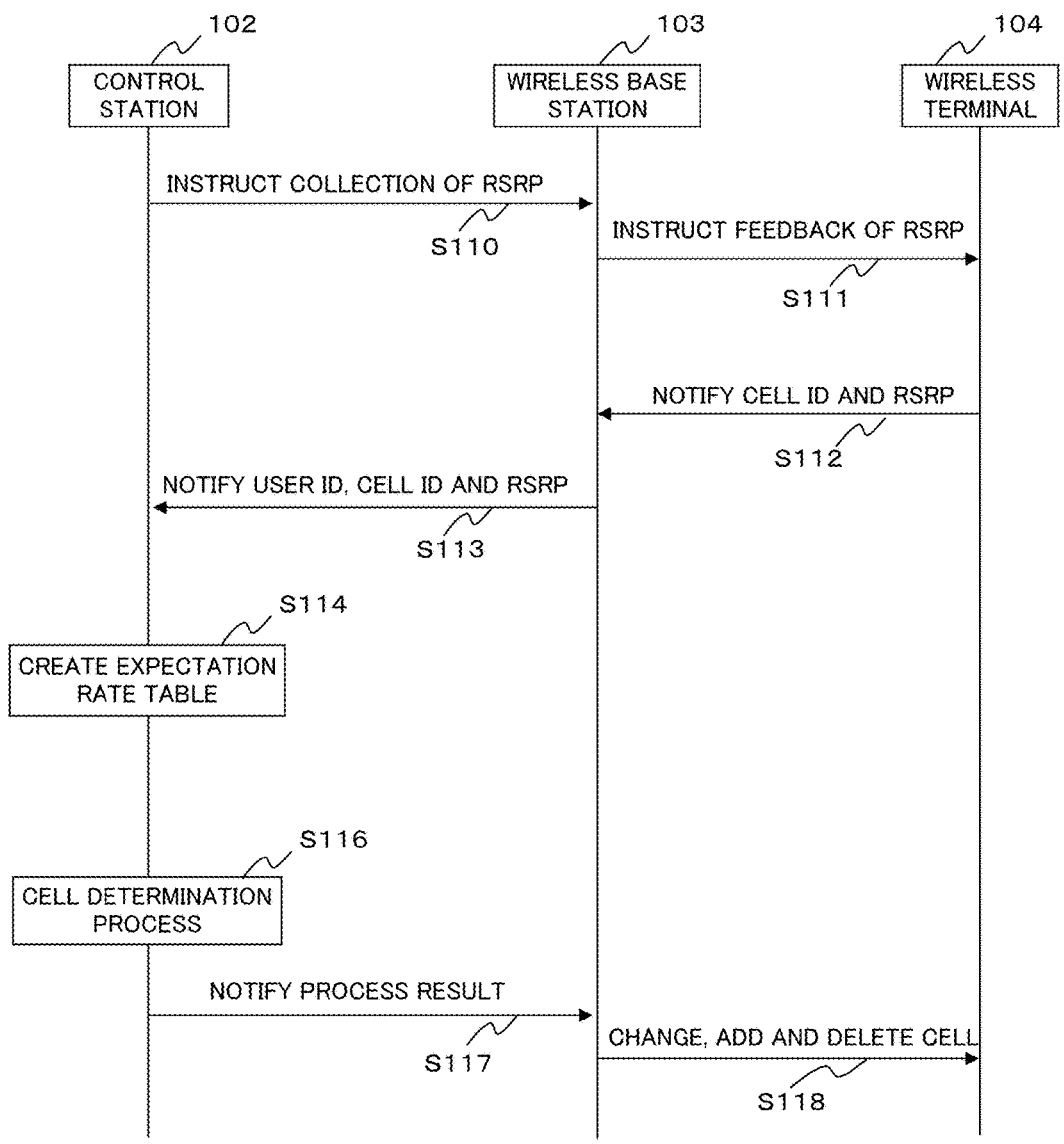
FIG. 37 illustrates a view illustrating an operation example of the wireless communication system according to the second embodiment.

FIG. 37 is a flowchart illustrating an operation example of the wireless communication system 101. The wireless communication system 101 is configured to execute the operation illustrated in FIG. 37 every time a certain execution cycle passes. Alternatively, the wireless communication system 101 may be configured to execute the operation illustrated in FIG. 37 according to an instruction inputted by a user or when certain conditions are satisfied.

As illustrated in FIG. 37, when a process of selecting (determining) a connection destination of the wireless terminal 104 is performed, the control station 102 first instructs the wireless base station 103 to collect RSRP (step S110).

The wireless base station 103 having been instructed by the control station 102 to collect the RSRP instructs each wireless terminal 104 under the wireless base station 103 to measure RSRP of surrounding cells and feed back a measurement result (step S111).

The wireless terminal 104 having been instructed by the wireless base station 103 to measure the RSRP and feed back the measurement result measures RSRP of wireless signals received from surrounding cells, and reports the measured RSRP and a cell ID corresponding to the measured RSRP to the wireless base station 103 (step S112).

The wireless base station 103 having received the RSRP and the cell ID from the wireless terminal 104 notifies a user ID for identifying the report source wireless terminal 104 and, in addition, the RSRP and the cell ID reported from the wireless terminal 104, to the control station 102 (step S113).

Further, when the user information obtainer 121 of the control station 102 receives the report of the user ID, the cell ID and the RSRP from the wireless base station 103, the cell determinator 122 calculates a signal-to-interference plus noise power ratio (SINR) in cases where each wireless terminal 104 is connected to each cell, according to following formula (17) using each RSRP obtained by the user information obtainer 121.

[Mathematical Formula 23]

$$SINR_{n,i} = \frac{P_i / L_{n,i}}{\sum_{\substack{j=1 \\ j \neq i}}^{N_{Cell}} P_j / L_{n,j} + N} \quad (17)$$

$SINR_{n,i}$ represents a SINR in cases where it is assumed that a wireless terminal 4-n (user #n) (n represents a natural number) is connected to a cell #i (i represents a natural number), $P_i$ represents transmission power of the cell #i, $L_{n,i}$ represents a path loss value between the user #n and the cell #i (i.e., propagation loss for the user #n in the cell #i), and N represents noise power.

In the present embodiment, the control station 102 stores transmission power of each wireless base station 103 in advance. Alternatively, the control station 102 may receive a notification of transmission power from each wireless base station 103. The control station 102 calculates a path loss value based on RSRP and transmission power of a reference signal. Alternatively, the control station 102 may be configured to use RSRP instead of a value obtained by dividing transmission power by the path loss value.

Next, the cell determinator 122 creates an expectation rate table by calculating a data rate (expectation rate) for the cell #i of the wireless terminal 4-n in cases where it is assumed that the wireless terminal 4-n is connected to the cell #i using following formula (18) (step S114 in FIG. 37).

[Mathematical Formula 24]

$$t_{n,i} = \eta_B B \log_2(1 + SINR_{n,i}/\eta_{SINR}) \quad (18)$$

$t_{n,i}$ represents an expectation rate in cases where it is assumed that the user #n is connected to the cell #i, B represents a communication bandwidth, $\eta_B$ represents bandwidth efficiency, and $\eta_{SINR}$ represents SINR efficiency.

Further, the cell determinator 122 executes a cell determination process of selecting (determining) a serving cell of each user by referring to the expectation rate table created as described above (step S116 in FIG. 37).

By the way, 3GPP (3rd Generation Partnership Project) is advancing standardization of LTE-Advanced (LTE-A). LTE-A adopts a carrier aggregation technique of performing broadband transmission using a plurality of component carriers to achieve a peak data rate exceeding 1 Gbps.

In the present embodiment, the wireless terminal 104 is a terminal which supports carrier aggregation. Hence, the wireless terminal 104 may perform wireless communication with the wireless base station 103 using one or more selected component carriers as serving cells depending on carrier aggregation capability. Consequently, it is possible to perform broadband communication of 20 [MHz]×5 component carriers=100 [MHz] at maximum.

Hence, the cell determinator 122 may select (determine) serving cells corresponding to the upper limit number of cells (one or plural, for example, five) set in advance for each wireless terminal 104. For example, the upper limit number of cells may be set based on a limitation of the number of component carriers which the wireless terminals 104 support or a limitation of a scheduling process amount. In the present embodiment, the upper limit number of cells is set per wireless terminal 104.

Figure 38:
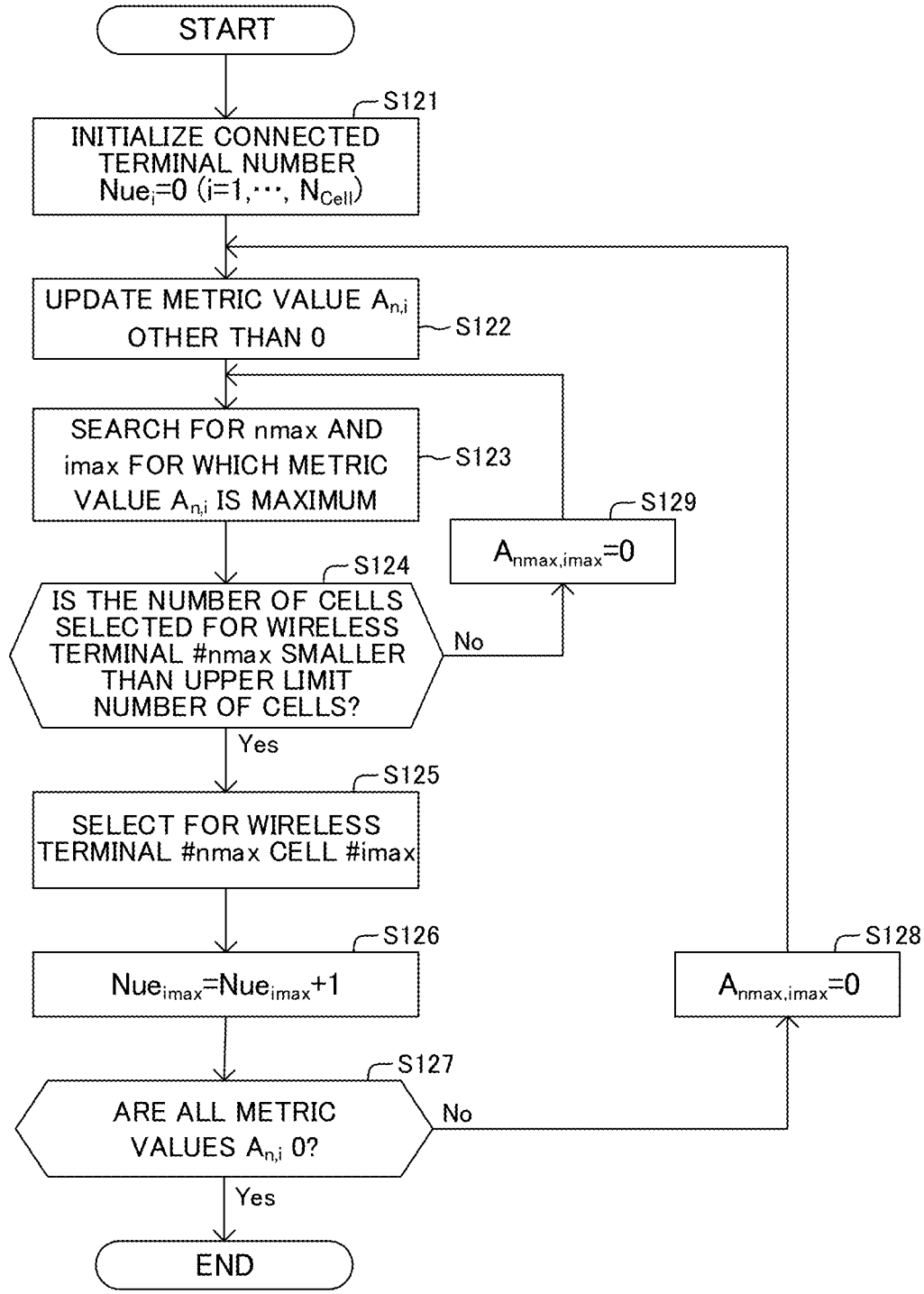
FIG. 38 is a flowchart illustrating an example of a process executed by a control station according to the second embodiment.

For example, the cell determinator 122 executes a process according to the flowchart illustrated in FIG. 38 as a cell determination process.

First, the cell determinator 122 initializes the connected terminal number $Nue_i$ (i=1. . . , $N_{cell}$) for each connection destination candidate (a cell in the present embodiment) (sets the connected terminal number to "0" as an initial value) (step S121 in FIG. 38). $N_{Cell}$ represents the number of all cells (i.e., the total number of connection destination candidates) related to a cell selection (determination) process.

Next, the cell determinator 122 updates metric values $A_{n,i}$ whose values are other than 0 based on following formula (19) (step S122 in FIG. 38). n represents an index of the n-th wireless terminal 104 (a number for identifying the n-th wireless terminal 104). The index n of the wireless terminal 104 represents one of natural numbers from 1 to $N_{UE}$ (i.e., n=1, . . . , $N_{UE}$). Further, i represents an index of an ith cell (a number for identifying the ith cell). The index i of the cell represents one of natural numbers from 1 to $N_{cell}$ (i.e., i=1, . . . , $N_{cell}$). In addition, $N_{UE}$ represents the total number of wireless terminals 104. In the present embodiment, the initial value of the metric value $A_{n,i}$ is set to a value (e.g., a negative value) other than 0.

[Mathematical Formula 25]

$$A_{n,i} = \frac{t_{n,i}/(Nue_i + 1)}{\sum_{m=1}^{N_{Cell}} \{t_{n,m}/(Nue_m + 1)\}} \quad (19)$$

That is, the metric value $A_{n,i}$ takes a value as a numerator. The value is obtained by dividing a data rate $t_{n,i}$ in cases where a wireless terminal #n of a calculation target pair is connected to a connection destination candidate #i of the pair, by the connected terminal number ($Nue_i$+1), which is the number of wireless terminals 104 to be connected to the connection destination candidate #i of the pair. Further, the metric value $A_{n,i}$ takes a value as a denominator. The value is obtained by summing element values for all of a plurality of connection destination candidates. The element value is obtained by dividing a data rate $t_{n,m}$ in cases where the wireless terminal #n of a calculation target pair is connected to a connection destination candidate #m, by the connected terminal number ($Nue_m$+1), which is the number of wireless terminals 104 to be connected to the connection destination candidate #m.

Alternatively, the cell determinator 122 may update the metric value $A_{n,i}$ based on following formula (19)'.

[Mathematical Formula 26]

$$A_{n,i} = \frac{t_{n,i}/(Nue_i + 1)}{\sum_{\substack{m=1 \\ m \neq i}}^{N_{Cell}} \{t_{n,m}/(Nue_m + 1)\}} \quad (19)'$$

In this case, the metric value $A_{n,i}$ takes a value as a numerator. The value is obtained by dividing the data rate $t_{n,i}$ in cases where the wireless terminal #n of the calculation target pair is connected to the connection destination candidate #i of the pair, by the connected terminal number (Nue$_i$+1), which is the number of wireless terminals 104 to be connected to the connection destination candidate #i of the pair. In this case, the metric value $A_{n,i}$ takes a value as a denominator. The value is obtained by summing element values for all of connection destination candidates other than the connection destination candidate #i of the pair among a plurality of connection destination candidates. The element value is obtained by dividing the data rate $t_{n,m}$ in cases where the wireless terminal #n of a calculation target pair is connected to a connection destination candidate #m, by the connected terminal number (Nue$_m$+1), which is the number of wireless terminals 104 to be connected to the connection destination candidate #m.

Alternatively, the metric value $A_{n,i}$ may be calculated according to a formula other than formula (19) and formula (19)'. The metric value $A_{n,i}$ may preferably increase as the value of the numerator in formula (19) or formula (19)' increases, and increase as the value of the denominator in formula (19) or formula (19)' decreases.

Further, the cell determinator 122 searches for and obtains the index nmax of the wireless terminal 104 and the index imax of the cell corresponding to the metric value $A_{n,i}$ which is maximum among the metric values updated in step S122 (step S123 in FIG. 38).

Next, the cell determinator 122 determines whether or not the number of cells selected for the wireless terminal #nmax (the wireless terminal 104 identified based on the index nmax) is smaller than the upper limit number of cells set for the wireless terminal #nmax in advance (step S124 in FIG. 38).

When the number of cells selected for the wireless terminal #nmax is smaller than the upper limit number of cells (a Yes route of step S124 in FIG. 38), the cell determinator 122 selects the cell #imax (the cell identified based on the index imax) for the wireless terminal #nmax (i.e., selects the cell #imax as a connection destination to which the wireless terminal #nmax is to be connected) (step S125 in FIG. 38).

Further, the cell determinator 122 adds 1 to the connected terminal number Nue$_{imax}$ for the cell #imax (step S126 in FIG. 38). Next, the cell determinator 122 determines whether or not all metric values $A_{n,i}$ are "0" (step S127 in FIG. 38).

When all metric values $A_{n,i}$ are "0" (a Yes route of step S127 in FIG. 38), the cell determinator 122 finishes the process illustrated in FIG. 38.

Meanwhile, when one of the metric values $A_{n,i}$ is not 0 (a No route of step S127 in FIG. 38), the cell determinator 122 sets a metric value $A_{nmax,imax}$ to "0" (step S128 in FIG. 38) and then returns to step S122 in FIG. 38. Further, the cell determinator 122 repeatedly executes the processes in step S122 to step S129.

Hence, in step S122 in FIG. 38, the cell determinator 122 updates (calculates) a metric value based on the connected terminal number having been changed by the selection in step S125. Further, when moving to step S125 in FIG. 38 again, the cell determinator 122 selects the cell #imax as a connection destination to which the wireless terminal #nmax corresponding to the metric value $A_{n,i}$, which is maximum, is to be connected. That is, the processes in step S122 to step S129 in FIG. 38 are an example of a selection process.

Further, when the cell determinator 122 moves to step S124 in FIG. 38, if the number of cells selected for the wireless terminal #nmax is equal to or more than the upper limit number of cells (a No route of step S124 in FIG. 38), the cell determinator 122 sets the metric value $A_{nmax,imax}$ to "0" (step S129 in FIG. 38), and then returns to step S123 in FIG. 38.

By so doing, the cell determinator 122 executes the cell determination process. By this means, the cell determinator 122 selects a connection destination (a serving cell in the present embodiment) to which each wireless terminal 104 is to be connected, from a plurality of connection destination candidates.

Alternatively, when the calculated metric value is lower than a certain threshold, the cell determinator 122 may set a connection destination candidate corresponding to the metric value not to be selected as connection destinations of the wireless terminals 104.

Information about the selected (determined) serving cell is notified to the wireless base station 103 by the cell determinator 122 (step S117 in FIG. 37), and the wireless base station 103 changes, adds and deletes the serving cell of each user based on the notification (step S118 in FIG. 37).

As described above, according to the present embodiment, a serving cell is selected taking into account a load balance between users, so that it is possible to prevent a throughput of the wireless communication system 101 from lowering.

Alternatively, in the wireless communication system 101, the wireless terminal 104 may be a terminal which does not support carrier aggregation. In this case, the wireless communication system 101 is preferably configured to select only one connection destination candidate as a connection destination to which each wireless terminal 104 is to be connected.

Alternatively, the wireless communication system 101 may be configured such that the wireless base station 103 has the function and the configuration of the control station 102. In this case, the wireless communication system 101 may omit the control station 102.

[7] First Modified Example

Next, a wireless communication system according to the first modified example of the second embodiment of the present disclosure will be described. The wireless communication system according to the first modified example of the second embodiment differs from the wireless communication system according to the second embodiment in changing a cell to which a wireless terminal has already been connected, based on a metric value. This difference will be mainly described below.

Figure 39:
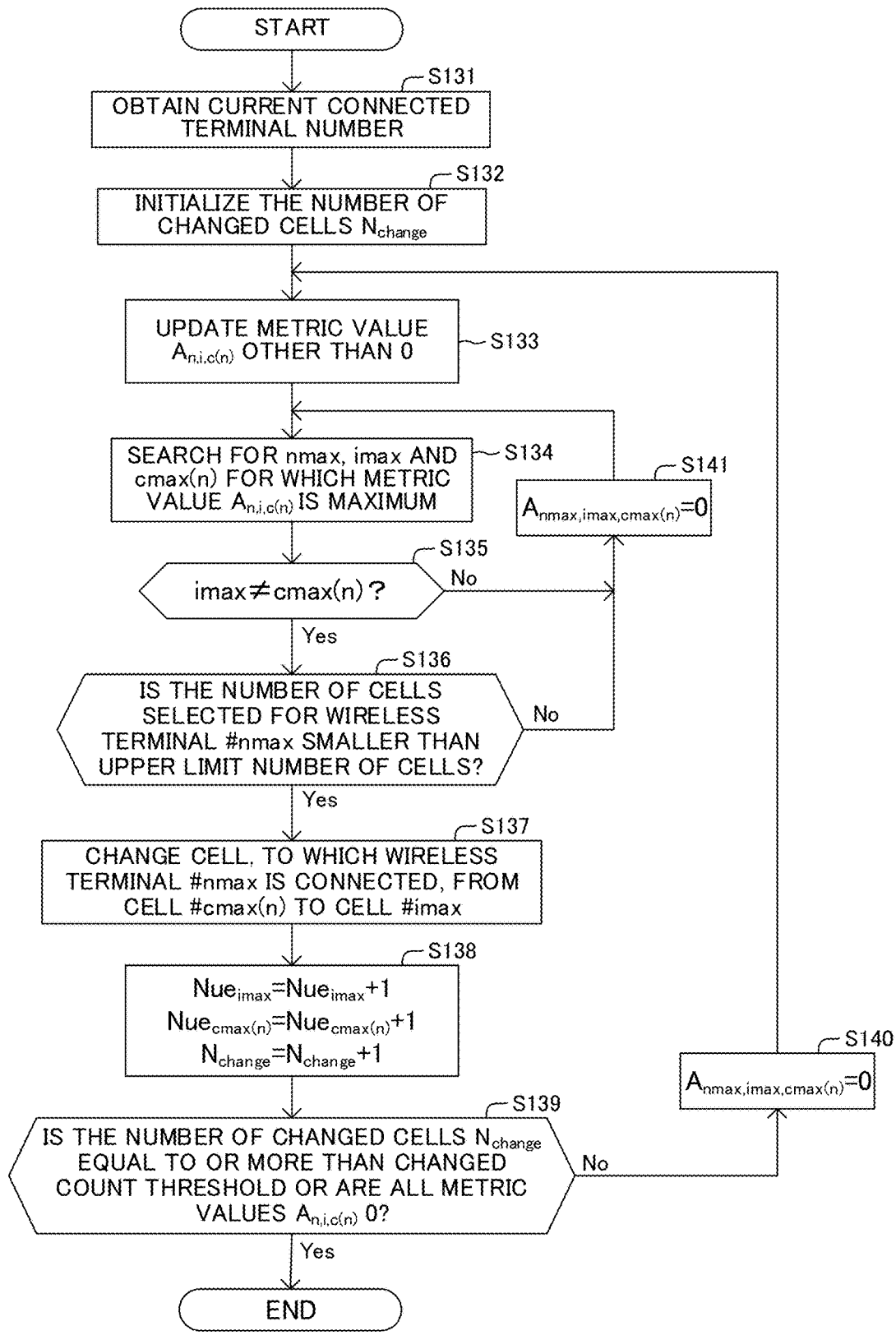
FIG. 39 is a flowchart illustrating an example of a process executed by a control station according to a first modified example of the second embodiment.

After a wireless communication system 101 executes the operation illustrated in FIG. 37, a cell determinator 122 according to the first modified example executes a process (cell change process) according to the flowchart illustrated in FIG. 39 every time a certain change cycle passes. The wireless communication system 101 is preferably configured to update an expectation rate table by executing the operations in step S110 to step S114 in FIG. 37 before executing the cell change process.

For example, the cell determinator 122 obtains the current connected terminal number (i.e., the number of wireless terminals 104 which have currently been connected to each cell) as the connected terminal number Nue$_i$ (i=1, ..., N$_{cell}$) for each connection destination candidate (a cell in the present example) (step S131 in FIG. 39).

Next, the cell determinator 122 initializes the number of changed cells N$_{change}$ (sets the number of changed cells to "0" as an initial value) (step S132 in FIG. 39). The number of changed cells $N_{change}$ represents the number of wireless terminals 104 whose connection destinations are changed by a current process illustrated in FIG. 39.

Next, the cell determinator 122 updates a metric value $A_{n,i,c(n)}$ whose value is other than 0 based on following formula (20) and formula (21) (step S133 in FIG. 39).

c(n) represents an index of a cell (an index of a connected cell) whose reception quality is minimum among cells to which the n-th wireless terminal 104 has already (currently) been connected. Alternatively, c(n) may be an index of a cell whose reception quality is equal to or less than a certain threshold among cells to which the n-th wireless terminal 104 has already (currently) been connected. The index c(n) represents one of natural numbers from 1 to $N_{Cell}$ (i.e., i=1, . . . , $N_{Cell}$).

In addition, the cell determinator 122 updates the metric value $A_{n,i,c(n)}$ using formula (20) in case of i≠c(n), and updates the metric value $A_{n,i,c(n)}$ using formula (21) in case of i=c(n).

[Mathematical Formula 27]

$$A_{n,i,c(n)} = \frac{t_{n,i}/(Nue_i+1)}{\sum_{\substack{m=1 \\ m \neq c(n)}}^{N_{Cell}} \{t_{n,m}/(Nue_m+1)\} + t_{n,c(n)}/(Nue_{c(n)}+1)} \quad (20)$$

[Mathematical Formula 28]

$$A_{n,i,c(n)} = \frac{t_{n,i}/Nue_i}{\sum_{\substack{m=1 \\ m \neq c(n)}}^{N_{Cell}} \{t_{n,m}/(Nue_m+1)\} + t_{n,c(n)}/Nue_{c(n)}} \quad (21)$$

Alternatively, the cell determinator 122 may update the metric value based on following formula (20)' corresponding to formula (20) and following formula (21)' corresponding to formula (21).

[Mathematical Formula 29]

$$A_{n,i,c(n)} = \frac{t_{n,i}/(Nue_i+1)}{\sum_{\substack{m=1 \\ m \neq c(n) \\ m \neq i}}^{N_{Cell}} \{t_{n,m}/(Nue_m+1)\} + t_{n,c(n)}/Nue_{c(n)}} \quad (20)'$$

[Mathematical Formula 30]

$$A_{n,i,c(n)} = \frac{t_{n,i}/Nue_i}{\sum_{\substack{m=1 \\ m \neq c(n)}}^{N_{Cell}} \{t_{n,m}/(Nue_m+1)\}} \quad (21)'$$

In the present example, the metric value $A_{n,i,c(n)}$ may be rephrased as a value calculated based on whether or not the wireless terminal 104 of a calculation target pair has already been connected to a connection destination candidate of the pair.

Alternatively, the metric value $A_{n,i,c(n)}$ may be calculated according to formula other than formula (20), formula (21), formula (20)' and formula (21)'. The metric value $A_{n,i,c(n)}$ may preferably increase as a value of a numerator in formula (20), formula (21), formula (20)' or formula (21)' increases, and increase as a value of a denominator in formula (20), formula (21), formula (20)' or formula (21)' decreases.

Further, the cell determinator 122 searches for and obtains the index nmax of the wireless terminal 104, the index imax of the cell and the index cmax(n) of a connected cell corresponding to the metric value $A_{n,i,c(n)}$ which is maximum among the metric values updated in step S122 (step S134 in FIG. 39).

Next, the cell determinator 122 determines whether or not the index imax of the cell and the index cmax(n) of the connected cell are different (step S135 in FIG. 39).

When the index imax of the cell and the index cmax(n) of the connected cell are different (a Yes route of step S135 in FIG. 39), the cell determinator 122 determines whether or not the number of cells selected for a wireless terminal #nmax (the wireless terminal 104 identified based on the index nmax) is smaller than the upper limit number of cells set in advance for the wireless terminal #nmax (step S136 in FIG. 39).

When the number of cells selected for the wireless terminal #nmax is smaller than the upper limit number of cells (a Yes route of step S136 in FIG. 39), the cell determinator 122 changes the cell to which the wireless terminal #nmax has already been connected, from the cell #cmax(n) (the cell identified based on the index cmax(n)) to the cell #imax (a cell identified based on the index imax) (i.e., selects the cell #imax as a connection destination to which the wireless terminal #nmax is to be connected) (step S137 in FIG. 39).

Further, the cell determinator 122 adds 1 to the connected terminal number $Nue_{imax}$ for the cell #imax. Furthermore, the cell determinator 122 adds 1 to the connected terminal number $Nue_{cmax(n)}$ for the cell #cmax(n). In addition, the cell determinator 122 adds 1 to the number of changed cells $N_{charge}$ (step S138 in FIG. 39).

Next, the cell determinator 122 determines whether or not at least one of a first condition and a second condition is satisfied (step S139 in FIG. 39). The first condition is that the number of changed cells $N_{change}$ is equal to or more than a certain change count threshold. The second condition is that all metric values $A_{n,i,c(n)}$ are "0".

When at least one of the first condition and the second condition is satisfied (a Yes route of step S139 in FIG. 39), the cell determinator 122 finishes the process illustrated in FIG. 39.

Meanwhile, when both of the first condition and the second condition are not satisfied (a No route of step S139 in FIG. 39), the cell determinator 122 sets a metric value $A_{nmax,imax,cmax(n)}$ to "0" (step S140 in FIG. 39), and then returns to step S133 in FIG. 39. Further, the cell determinator 122 repeatedly executes the processes in step S133 to step S141.

Hence, in step S133 in FIG. 39, the cell determinator 122 updates (calculates) a metric value based on the connected terminal number having been changed by the selection (change) in step S138. Further, when moving to step S137 in FIG. 39 again, the cell determinator 122 selects the cell #imax as a connection destination to which the wireless terminal #nmax corresponding to the updated metric value $A_{n,i,c(n)}$, which is maximum, is to be connected. That is, the processes in step S133 to step S141 in FIG. 39 are an example of a selection process.

Further, when the cell determinator 122 moves to step S135 in FIG. 39, if the index imax of the cell matches with the index cmax(n) of the connected cell (a No route of step S135 in FIG. 39), the cell determinator 122 sets the metric value $A_{nmax,imax,cmax(n)}$ to "0" (step S141 in FIG. 39), and then returns to step S134 in FIG. 39.

Furthermore, when the cell determinator 122 moves to step S136 in FIG. 39, if the number of cells selected for the wireless terminal #nmax is equal to or more than the upper limit number of cells (a No route of step S136 in FIG. 39), the cell determinator 122 sets the metric value $A_{nmax,imax,cmax(n)}$ to "0" (step S141 in FIG. 39), and then returns to step S134 in FIG. 39.

Thus, the cell determinator 122 repeatedly executes the selection process until the number of times (the number of changed cells $N_{change}$ in the present example) of selecting a connection destination candidate which is different from a connection destination to which the wireless terminal 104 has already been connected, as a connection destination to which the wireless terminal 104 is to be connected is equal to or more than a certain changed count threshold.

Thus, the cell determinator 122 executes the cell change process. By this means, the cell determinator 122 selects a connection destination (a serving cell in the present example) to which each wireless terminal 104 is to be connected, from a plurality of connection destination candidates.

Information about the selected (determined) serving cell is notified to a wireless base station 103 by the cell determinator 122, and the wireless base station 103 changes, adds and deletes the serving cell of each user based on the notification.

As described above, according to the present example, a serving cell is selected and changed taking into account a load balance between users, so that it is possible to prevent a throughput of the wireless communication system 101 from lowering.

[8] Second Modified Example (8.1) Configuration Example of Wireless Communication System 101A Next, a wireless communication system according to the second modified example of the second embodiment of the present disclosure will be described. The wireless communication system according to the second modified example differs from the wireless communication system according to the second embodiment in selecting connection destination candidates based on a data rate and the connected terminal number for each of periods whose data rates are different from each other. This difference will be mainly described below.

Figure 40:
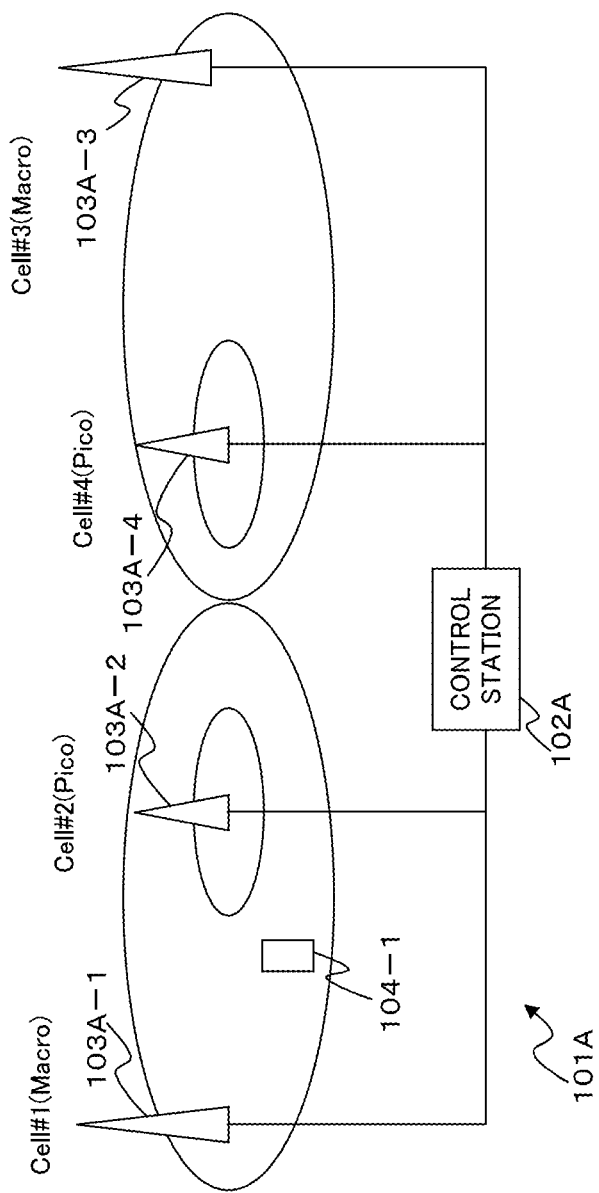
FIG. 40 illustrates a view illustrating a configuration example of a wireless communication system according to a second modified example of the second embodiment.

As illustrated in FIG. 40, a wireless communication system 101A according to the second modified example configures HetNet (Heterogeneous Network). The wireless communication system 101A illustrated in FIG. 40 includes, for example, a control station 102A, wireless base stations 103A-1, 103A-2, 103A-3 and 103A-4 and a wireless terminal 104-1 which is an example of user equipment (UE).

In FIG. 40, the wireless terminal 104-1 has the same function and configuration as those of each of wireless terminals 104-1, 104-2 and 104-3 illustrated in FIG. 33, and therefore will not be described. Further, the wireless base stations 103A-1, 103A-2, 103A-3 and 103A-4 may be also referred to as a base station #1, a base station #2, a base station #3 and a base station #4, respectively. Furthermore, when the wireless base stations 103A-1, 103A-2, 103A-3 and 103A-4 are not distinguished, each of the wireless base stations 103A-1, 103A-2, 103A-3 and 103A-4 may be also referred to simply as a wireless base station 103A or the base station 103A. Still further, the number of the wireless base stations 103A and the number of the wireless terminals 104 are not limited to the numbers illustrated in FIG. 40.

The wireless communication system 101A has a plurality of cells of different types such as macrocells, microcells, picocells and femtocells.

The wireless base station 103A has the same function and configuration as those of a wireless base station 103 illustrated in FIG. 33. In the present example, the wireless base stations 103A-1 and 103A-3 have functions of providing wireless areas as macrocells, and performing wireless communication with the wireless terminals 104 through the wireless areas. In the present example, the wireless base stations 103A-2 and 103A-4 have functions of providing wireless areas as picocells, and performing wireless communication with the wireless terminals 104 through the wireless areas.

In the present example, a picocell (cell #2) provided by the base station #2 is included in a macrocell (cell #1) provided by the base station #1. Similarly, a picocell (cell #4) provided by the base station #4 is included in a macrocell (cell #3) provided by the base station #3.

In the present example, connection destination candidates of the wireless terminals 104 are the cell #1 to the cell #4. The connection destination candidates of the wireless terminals 104 may vary depending on movement of the wireless terminals 104 and opening, stopping or closing of the wireless base station 103A.

Wireless signals in a plurality of cells interfere with each other in a region in which the plurality of cells is provided. Hence, in the present example, the wireless communication system 101A uses eICIC (Enhanced Inter Cell Interference Coordination) to reduce an inter-cell interference.

For example, the wireless communication system 101A uses "Time domain resource partitioning" which is one of control methods of eICIC. In the present example, the wireless communication system 101A does not perform communication in a part of a cycle period in a macrocell (i.e., transmission and reception of data in a part of a plurality of subframes forming a frame are stopped). A subframe in which transmission and reception of data are stopped may be referred to as an ABS (Almost Blank Subframe).

As illustrated in FIG. 15, the wireless communication system 101A has a frame consisting of four subframes consecutive in time. Each subframe has the same time duration.

For example, a period from a time $t_1$ to a time $t_2$ is allocated to a first subframe, a period from the time $t_2$ to a time $t_3$ is allocated to a second subframe, a period from the time $t_3$ to a time $t_4$ is allocated to a third subframe and a period from the time $t_4$ to a time $t_5$ is allocated to a fourth subframe.

A plurality of subframes may have different time durations.

Each of the base station #1 and the base station #3 transmits and receives data in the first subframe and the second subframe. Meanwhile, each of the base station #1 and the base station #3 stops transmitting and receiving data in the third subframe and the fourth subframe. That is, each of the base station #1 and the base station #3 sets the third subframe and the fourth subframe as ABSs. Further, each of the base station #2 and the base station #4 transmits and receives data in all subframes.

The wireless communication system 101A has a plurality of periods whose data rates are different in a cycle (one frame period in the present example). For example, the first period (period #1) is a period of the first subframe plus the second subframe, and the second period (period #2) is a period of the third subframe plus the fourth subframe.

In the present example, a stop time ratio α is 0.5. The stop time ratio α is a ratio of a time during which transmission and reception of data are stopped using eICIC (i.e., a sum of a time duration of the third subframe and a time duration of the fourth subframe) with respect to a time during which data can be transmitted and received without using eICIC (i.e., a time duration of one frame). The stop time ratio α may be set to an arbitrary value from 0 through 1.

A cell determinator 122 according to the second modified example calculates a data rate (expectation rate) expected in cases where each wireless terminal 104 is allocated to each cell of a connection destination candidate in each period (each wireless terminal 104 is connected to each cell of a connection destination candidate), based on information related to the reception strength obtained by a user information obtainer 121.

Next, the cell determinator 122 calculates a metric value based on the calculated data rate per period and the connected terminal number, which is the number of wireless terminals 104 to be connected to each connection destination candidate in each period. Further, the cell determinator 122 selects (determines) a serving cell as a connection destination of each wireless terminal 104 in each period based on the calculated metric value.

Furthermore, the cell determinator 122 notifies the selection (determination) result to the wireless base station 103A, and the wireless base station 103A controls the cells based on the selection (determination) result to change, add and delete the cells to which the wireless terminals 104 are to be connected in each period.

That is, the cell determinator 122 functions as an example of a processor which selects connection destinations to which the wireless terminals 104 are connected in each period from a plurality of connection destination candidates based on each data rate in cases where each wireless terminal 104 is connected to each connection destination candidate in each period and the connected terminal number, which is the number of wireless terminals 104 to be connected to each connection destination candidate in each period.

Each operation of the cell determinator 122 will be described in detail below.

(8.2) Operation Example of Wireless Communication System 101A

The wireless communication system 101A according to the second modified example executes the process illustrated in FIG. 37 similar to a wireless communication system 101. In this case, unlike the wireless communication system 101, the wireless communication system 101A calculates a signal-to-interference plus noise power ratio (SINR) in cases where each wireless terminal 104 is connected to each cell in each period according to following formula (22).

[Mathematical Formula 31]

$$SINR_{n,i,k} = \frac{P_{i,k}/L_{n,i}}{\sum_{\substack{j=1 \\ j \neq i}}^{N_{Cell}} P_{j,k}/L_{n,j} + N} \quad (22)$$

$SINR_{n,i,k}$ represents a SINR in cases where it is assumed that a wireless terminal 104-n (user #n) (n represents a natural number) is connected to a cell #i (i represents a natural number) in a kth (k represents a natural number) period (period #k), $P_{i,k}$ represents transmission power of the cell #i in the period #k, $L_{n,i}$ represents a path loss value between the user #n and the cell #i (i.e., propagation loss for the user #n in the cell #i), and N represents noise power.

In the present example, the control station 102A stores transmission power of each wireless base station 103A in advance. For example, transmission power $P_{i,k}$ is stored as illustrated in FIG. 16. $P_M$ represents a basic value of transmission power in a macrocell, and $P_p$ represents a basic value of transmission value in a picocell.

The control station 102A may receive a notification of transmission power from each wireless base station 103A. The control station 102A calculates a path loss value based on RSRP and transmission power of a reference signal.

Next, the cell determinator 122 creates an expectation rate table by calculating a data rate (expectation rate) for the cell #i of the wireless terminal 104-n in cases where it is assumed that the wireless terminal 104-n is connected to the cell #i in the period #k, using following formula (23).

[Mathematical Formula 32]

$$t_{n,i,k} = \eta_B B \log_2(1 + SINR_{n,i,k}/\eta_{SINR}) \quad (23)$$

$t_{n,i,k}$ represents an expectation rate in cases where it is assumed that the user #n is connected to the cell #i in the period #k, B represents a communication bandwidth, $\eta_B$ represents bandwidth efficiency, and $\eta_{SINR}$ represents SINR efficiency.

Further, the cell determinator 122 executes a cell determination process of selecting (determining) a serving cell of each user in each period by referring to the expectation rate table created as described above (step S116 in FIG. 37).

In the present example, the cell determinator 122 selects (determines) serving cells the number of which is equal to the upper limit number of cells (one or plural, for example, five) set in advance for each wireless terminal 104. For example, the upper limit number of cells may be set based on a limitation of the number of component carriers which the wireless terminals 104 support or a limitation of a scheduling process amount. In the present example, the upper limit number of cells is set per period and per wireless terminal 104.

Figure 41:
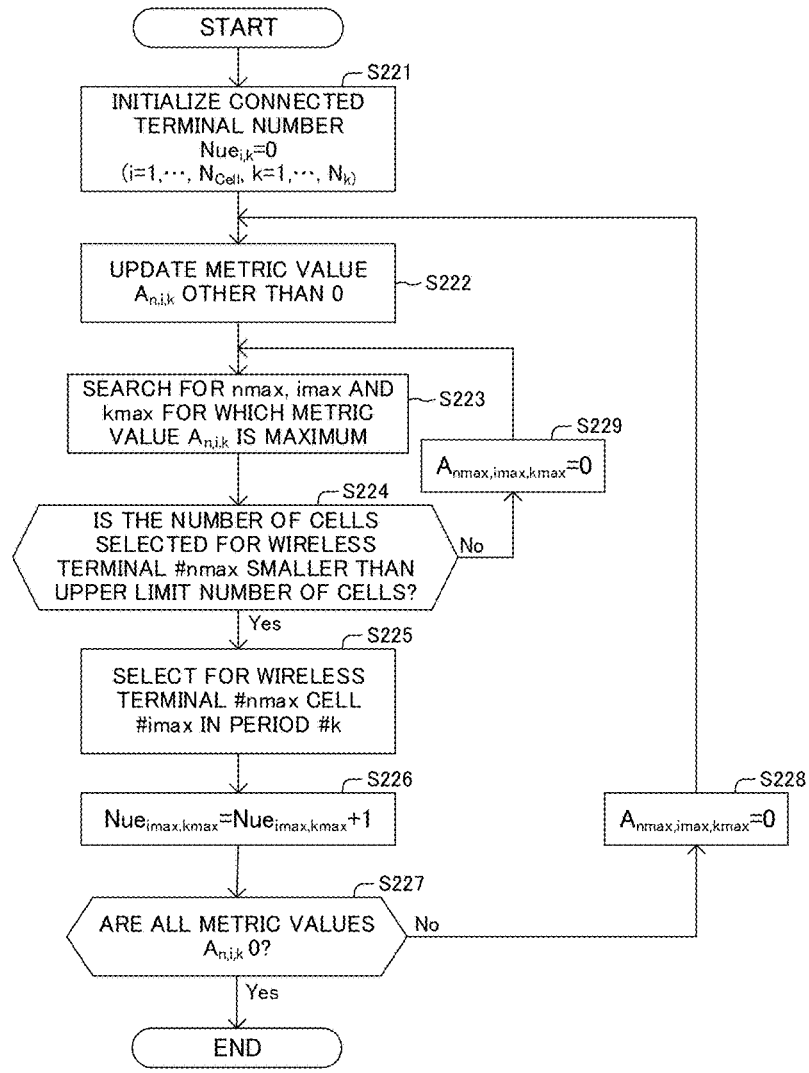
FIG. 41 is a flowchart illustrating an example of a process executed by a control station according to the second modified example of the second embodiment.

For example, the cell determinator 122 executes a process according to the flowchart illustrated in FIG. 41 as a cell determination process.

First, the cell determinator 122 initializes the connected terminals number $Nue_{i,k}$ (i=1, ..., $N_{cell}$ and k=1, ..., $N_k$) for each connection destination candidate (a cell in the present embodiment) in each period (sets the connected terminal number to "0" as an initial value) (step S221 in FIG. 41). $N_{cell}$ represents the number of all cells (i.e., the total number of connection destination candidates) related to a cell selection (determination) process. Further, $N_k$ represents the number of periods (2 in the present example).

Next, the cell determinator 122 updates a metric value $A_{n,i,k}$ whose values are other than 0 based on following formula (24) (step S222 in FIG. 41). n represents an index of the n-th wireless terminal 104 (a number for identifying the n-th wireless terminal 104). The index n of the wireless terminal 104 represents one of natural numbers from 1 to $N_{UE}$ (i.e., n=1, ..., $N_{UE}$). Further, i represents an index of an ith cell (a number for identifying the ith cell). The index i of the cell represents one of natural numbers from 1 to $N_{Cell}$ (i.e., i=1, ..., $N_{UE}$). Further, k represents an index of a kth period (a number for identifying the kth period). The index k of the period represents one of natural numbers from 1 to $N_k$ (i.e., k=1, ..., $N_k$). $N_{UE}$ represents the total number of wireless terminals 104. In the present example, the initial value of the metric value is set to a value (e.g., a negative value) other than 0.

[Mathematical Formula 33]

$$A_{n,i,k} = \frac{\beta_{i,k} t_{n,i,k} / (Nue_{i,k} + 1)}{\sum_{m=1}^{N_{Cell}} \sum_{s=1}^{N_k} \{\beta_{m,s} t_{n,m,s} / (Nue_{m,s} + 1)\}} \quad (24)$$

$\beta_{i,k}$ represents a transmittable/receivable time ratio. The transmittable/receivable time ratio is a ratio of a duration of a time during which data can be transmitted and received in the period #k with respect to a duration of a cycle (a time duration of one frame in the present example) in the cell #i.

In the present example, the control station 102A stores the transmittable/receivable time ratio of each wireless base station 103A in advance. For example, the transmittable/receivable time ratio $\beta_{i,k}$ is stored as illustrated in FIG. 18. α represents a stop time ratio (0.5 in the present example). The control station 102A may receive a notification of the transmittable/receivable time ratio from each wireless base station 103A.

That is, the metric value $A_{n,i,k}$ takes a value as a numerator. The value is obtained by dividing a value obtained by multiplying a data rate $t_{n,i,k}$ in cases where a wireless terminal #n of a calculation target pair is connected to a connection destination candidate #i of the pair in a period #k of the pair, with a transmittable/receivable time ratio corresponding to the period #k and the connection destination candidate #i, by the connected terminal number (Nue$_{i,k}$+1), which is the number of wireless terminals 104 to be connected to the connection destination candidate #i of the pair in the period #k of the pair. Further, the metric value $A_{n,i,k}$ takes a value as a denominator. The value is obtained by summing element values for all of a plurality of connection destination candidates and for all of a plurality of periods. The element value is obtained by dividing a value obtained by multiplying a data rate $t_{n,m,s}$ in cases where the wireless terminal #n of a calculation target pair is connected to a connection destination candidate #m in a period #s, with the transmittable/receivable time ratio $\beta_{m,s}$ corresponding to the period #s and the connection destination candidate #m, by the connected terminal number (Nue$_{n,s}$+1), which is the number of wireless terminals 104 to be connected to the connection destination candidate #m in the period #s.

Alternatively, the cell determinator 122 may update the metric value $A_{n,i,k}$ based on following formula (24)'.

[Mathematical Formula 34]

$$A_{n,i,k} = \frac{\beta_{i,k} t_{n,i,k} / (Nue_{i,k} + 1)}{\sum_{\substack{m=1 \\ m \neq i}}^{N_{Cell}} \sum_{s=1}^{N_k} \{\beta_{m,s} t_{n,m,s} / (Nue_{m,s} + 1)\}}, \quad (24)'$$

In this case, the metric value $A_{n,i,k}$ takes a value as a numerator. The value is obtained by dividing a value obtained by multiplying the data rate $t_{n,i,k}$ in cases where the wireless terminal #n of a calculation target pair is connected to the connection destination candidate #i of the pair in the period #k of the pair, with the transmittable/receivable time ratio corresponding to the period #k and the connection destination candidate #i, by the connected terminal number (Nue$_{i,k}$+1) which is the number of wireless terminals 104 to be connected to the connection destination candidate #i of the pair in the period #k of the pair. Further, the metric value $A_{n,i,k}$ takes a value as a denominator. The value is obtained by summing element values for all connection destination candidates other than the connection destination candidate #i of the pair among a plurality of connection destination candidates and for all of a plurality of periods. The element value is obtained by dividing a value obtained by multiplying the data rate $t_{n,m,s}$ in cases where the wireless terminal #n of a calculation target pair is connected to a connection destination candidate #m in a period #s, with the transmittable/receivable time ratio $\beta_{m,s}$ corresponding to the period #s and the connection destination candidate #m, by the connected terminal number (Nue$_{m,s}$+1), which is the number of wireless terminals 104 to be connected to the connection destination candidate #m in the period #s.

Alternatively, the metric value $A_{n,i,k}$ may be calculated according to formula other than formula (24) and formula (24)'. The metric value $A_{n,i,k}$ may preferably increase as the value of the numerator in formula (24) or formula (24)' increases, and increase as the value of the denominator in formula (24) or formula (24)' decreases.

Further, the cell determinator 122 searches for and obtains the index nmax of the wireless terminal 104, the index imax of the cell and the index kmax of the period corresponding to the metric value $A_{n,i,k}$ which is maximum among the metric values updated in step S222 (step S223 in FIG. 41).

Next, the cell determinator 122 determines whether or not the number of cells selected for the wireless terminal #nmax (the wireless terminal 104 identified based on the index nmax) is smaller than the upper limit number of cells set to the wireless terminal #nmax and the period #kmax in advance (step S224 in FIG. 41).

When the number of cells selected for the wireless terminal #nmax is smaller than the upper limit number of cells (a Yes route of step S224 in FIG. 41), the cell determinator 122 selects the cell #imax (the cell identified based on the index imax) for the wireless terminal #nmax in the period #kmax (period identified based on the index kmax) (i.e., selects the cell #imax as a connection destination to which the wireless terminal #nmax is to be connected in the period #kmax) (step S225 in FIG. 41).

Further, the cell determinator 122 adds 1 to the connected terminal number Nue$_{imax,kmax}$ for the cell #imax in the period #kmax (step S226 in FIG. 41). Next, the cell determinator 122 determines whether or not all metric values $A_{n,i,k}$ are "0" (step S227 in FIG. 41).

When all metric values $A_{n,i,k}$ are "0" (a Yes route of step S227 in FIG. 41), the cell determinator 122 finishes the process illustrated in FIG. 41.

Meanwhile, when one of the metric values $A_{n,i,k}$ is not 0 (a No route of step S227 in FIG. 41), the cell determinator 122 sets the a metric value $A_{nmax,imax,kmax}$ to "0" (step S228 in FIG. 41) and then returns to step S222 in FIG. 41. Further, the cell determinator 122 repeatedly executes the processes in step S222 to step S229.

Hence, in step S222 in FIG. 41, the cell determinator 122 updates (calculates) a metric value based on the connected terminal number having changed by the selection in step S225. Further, when moving to step S225 in FIG. 41 again, the cell determinator 122 selects the cell #imax as a connection destination to which the wireless terminal #nmax corresponding to the updated metric value $A_{n,i,k}$ which is maximum, is to be connected in the period #kmax. That is, the processes in step S222 to step S229 in FIG. 41 are an example of a selection process.

Further, when the cell determinator 122 moves to step S224 in FIG. 41, if the number of cells selected for the wireless terminal #nmax is equal to or more than the upper limit number of cells (a No route of step S224 in FIG. 41), the cell determinator 122 sets the metric value $A_{nmax,imax,kmax}$ to "0" (step S229 in FIG. 41), and then returns to step S223 in FIG. 41.

By so doing, the cell determinator 122 executes the cell determination process. By this means, the cell determinator 122 selects a connection destination (a serving cell in the present example) to which each wireless terminal 104 is to be connected in each period, from a plurality of connection destination candidates.

In addition, when the calculated metric value is lower than a certain threshold, the cell determinator 122 may set a connection destination candidate corresponding to the metric value not to be selected as connection destinations of the wireless terminals 104.

Information about the selected (determined) serving cell is notified to the wireless base station 103A by the cell determinator 122 (step S117 in FIG. 37), and the wireless base station 103A changes, adds and deletes the serving cell of each user based on the notification (step S118 in FIG. 37).

As described above, according to the present example, a serving cell is selected taking into account a load balance between users, so that it is possible to prevent a throughput of the wireless communication system 101A from lowering.

In the wireless communication system 101A, the wireless terminal 104 may be a terminal which does not support carrier aggregation. In this case, the wireless communication system 101A is preferably configured to select only one connection destination candidate as a connection destination to which each wireless terminal 104 is to be connected.

Alternatively, the wireless communication system 101A may be configured such that the wireless base station 103A has the function and the configuration of the control station 102A. In this case, the wireless communication system 101A may omit the control station 102A.

In the above example, each of a base station #1 and a base station #3 is configured to stop transmitting and receiving data in the third subframe and the fourth subframe (i.e., stop transmitting and receiving data in the third subframe and the fourth subframe in a macrocell (a cell #1 and a cell #3)).

Alternatively, each of the base station #1 and the base station #3 may be configured to make transmission power in the third subframe and the fourth subframe lower than transmission power in other subframes as illustrated in FIG. 20.

In the present example, each of the base station #1 and the base station #3 sets transmission power in the first subframe and the second subframe to a basic value $P_m$ of transmission power in a macrocell. Further, each of the base station #1 and the base station #3 sets transmission power in the third subframe and the fourth subframe to a value $P_m - \delta$ obtained by subtracting a reduction amount $\delta$ from the basic value $P_m$. Furthermore, each of the base station #2 and the base station #4 sets transmission power in each subframe to a basic value $P_p$ of transmission power in a picocell.

Hence, the control station 102A stores the transmission power $P_{i,k}$ as illustrated in FIG. 21. Alternatively, the control station 102A may receive a notification of transmission power from each wireless base station 103A.

Further, the control station 102A stores the transmittable/receivable time ratio $\beta_{i,k}$ as illustrated in FIG. 22. $\alpha$ represents a reduction time ratio (0.5 in the present example). The reduction time ratio $\alpha$ is a ratio of a time (i.e., a sum of a time duration of the third subframe and a time duration of the fourth subframe) during which transmission power is reduced with respect to a time (i.e., a time duration of one frame) during which data can be transmitted and received. The reduction time ratio $\alpha$ may be set to an arbitrary value from 0 through 1. Alternatively, the control station 102A may receive a notification of the transmittable/receivable time ratio from each wireless base station 103A.

In the present example, the wireless communication system 101A operates similar to the above case, so that it is also possible to prevent the throughput of the wireless communication system 101A from lowering.

Alternatively, as illustrated in FIG. 23, the base station #1 and the base station #3 may be configured to stop transmitting and receiving data in different subframes. For example, the base station #1 may be configured to stop transmitting and receiving data in the second subframe and the third subframe, and the base station #3 may be configured to stop transmitting and receiving data in the second subframe and the fourth subframe.

In the present example, the base station #1 sets transmission power in the first subframe and the fourth subframe to the basic value $P_m$ of transmission power in a macrocell. Further, the base station #3 sets transmission power in the first subframe and the third subframe to the basic value $P_m$. Furthermore, each of the base station #2 and the base station #4 sets transmission power in each subframe to a basic value $P_p$ of transmission power in a picocell.

Hence, the control station 102A stores the transmission power $P_{i,k}$ as illustrated in FIG. 24. Alternatively, the control station 102A may receive a notification of transmission power from each wireless base station 103A.

The control station 102A stores the transmittable/receivable time ratio $\beta_{i,k}$ as illustrated in FIG. 25. $\alpha_0$ represents a time duration of the first subframe (i.e., a time from a time point $t_1$ to a time point $t_2$), $\alpha_1$ represents a time duration of the second subframe (i.e., a time from the time point $t_2$ to a time point $t_3$), $\alpha_2$ represents a time duration of a third subframe (i.e., a time from the time point $t_3$ to a time point $t_4$) and $\alpha_3$ represents a time duration of the fourth subframe (i.e., a time from the time point $t_4$ to a time point $t_5$). Alternatively, the control station 102A may receive a notification of the transmittable/receivable time ratio from each wireless base station 103A.

In the present example, the wireless communication system 101A operates similar to the above case, so that it is also possible to prevent the throughput of the wireless communication system 101A from lowering.

Alternatively, the base station #1 and the base station #3 may be configured to make transmission power in different subframes lower than transmission power in other subframes as illustrated in FIG. 26.

In the present example, the base station #1 sets transmission power in the first subframe and the fourth subframe to the basic value $P_m$ of transmission power in a macrocell. Further, the base station #1 sets transmission power in the second subframe and the third subframe to a value $P_m - \delta$ obtained by subtracting the reduction amount $\delta$ from the basic value $P_m$. Furthermore, the base station #3 sets transmission power in the first subframe and the third subframe to the basic value $P_m$. Still further, the base station #3 sets transmission power in the second subframe and the fourth subframe to the value $P_m - \delta$ obtained by subtracting the reduction amount $\delta$ from the basic value $P_m$. Moreover, each of the base station #2 and the base station #4 sets transmission power in each subframe to the basic value $P_p$ of transmission power in a picocell.

Hence, the control station 102A stores the transmission power $P_{i,k}$ as illustrated in FIG. 27. Alternatively, the control station 102A may receive a notification of transmission power from each wireless base station 103A.

The control station 102A stores the transmittable/receivable time ratio $\beta_{i,k}$ as illustrated in FIG. 28. $\alpha_0$ represents a time duration of the first subframe (i.e., a time from a time point $t_1$ to a time point $t_2$), $\alpha_1$ represents a time duration of the second subframe (i.e., a time from the time point $t_2$ to a time point $t_3$), $\alpha_2$ represents a time duration of a third subframe (i.e., a time from the time point $t_3$ to a time point $t_4$) and $\alpha_3$ represents a time duration of the fourth subframe (i.e., a time from the time point $t_4$ to a time point $t_5$). Alternatively, the control station 102A may receive a notification of the transmittable/receivable time ratio from each wireless base station 103A.

In the present example, the wireless communication system 101A operates similar to the above case, so that it is also possible to prevent the throughput of the wireless communication system 101A from lowering.

[9] Hardware Configuration Example

Next, FIG. 29 illustrates a hardware configuration example of control station 102 or 102A.

As illustrated in FIG. 29, the control station 102 or 102A includes, for example, a processor 201, a storage device 202 and a wired interface (IF) 203.

The processor 201 is a device which processes data, and includes, for example, a CPU (Central Processing Unit), a DSP (Digital Signal Processor), a LSI (Large Scale Integration), and a FPGA (Field Programmable Gate Array).

The storage device 202 is a device which stores data, and includes, for example, a ROM (Read Only Memory), a RAM (Random Access Memory), a magnetic disk, an optical disk and a flash memory.

The wired IF 203 is an interface device which performs communication with a core network and wireless base stations 103 or 103A.

A correlation relationship between each configuration of the control station 102 illustrated in FIG. 34 and each configuration of the control station 102 illustrated in FIG. 29 is, for example, as follows.

The wired IF 203 corresponds to, for example, the user information obtainer 121, and the processor 201 and the storage device 202 correspond to, for example, the cell determinator 122.

That is, the processor 201 and the storage device 202 may function as an example of a processor which calculates a metric value based on each data rate in cases where each wireless terminal 104 is connected to each connection destination candidate and the connected terminal number, which is the number of wireless terminals 104 to be connected to each connection destination candidate, and selects a connection destination of each wireless terminal 104 from a plurality of connection destination candidates based on the calculated metric value.

A correlation relationship between each configuration of the control station 102A and each configuration of the control station 102A illustrated in FIG. 29 is, for example, as follows.

The wired IF 203 corresponds to, for example, the user information obtainer 121, and the processor 201 and the storage device 202 correspond to, for example, the cell determinator 122.

That is, the processor 201 and the storage device 202 may function as an example of a processor which calculates a metric value based on each data rate in cases where each wireless terminal 104 is connected to each connection destination candidate in each period and the connected terminal number, which is the number of wireless terminals 104 to be connected to each connection destination candidate in each period, and selects a connection destination of each wireless terminal 104 in each period from a plurality of connection destination candidates based on the calculated metric value.

FIG. 30 illustrates a hardware configuration example of the wireless base station 103 or 103A.

As illustrated in FIG. 30, the wireless base station 103 or 103A includes, for example, a processor 301, a storage device 302, a wired IF 303, a wireless interface (IF) 304, a wireless process circuit 305 and a baseband (BB) process circuit 306.

The processor 301 is a device which processes data, and includes, for example, a CPU, a DSP, a LSI and a FPGA.

The storage device 302 is a device which stores data, and includes, for example, a ROM, a RAM, a magnetic disk, an optical disk and a flash memory.

The wired IF 303 is an interface device which performs wired communication with the control station 102 or 102A and a network (so-called backhaul network) on a core network side.

The wireless IF 304 is an interface device which performs wireless communication with the wireless terminals 104.

The wireless process circuit 305 is a circuit which performs a process such as low noise amplification, frequency conversion into a baseband frequency (down-conversion) and A/D (analog/digital) conversion on wireless signals received by the wireless IF 304, and a process such as D/A conversion of transmission data, frequency conversion into a wireless frequency (up-conversion) and power amplification on the wireless signals transmitted from the wireless IF 304.

The BB process circuit 306 is a circuit which performs a certain baseband process on wireless signals received by the wireless IF 304 and performs a certain baseband process on signals transmitted through the wireless IF 304, and includes, for example, a LSI and a FPGA.

A correlation relationship between each configuration of the wireless base station 103 illustrated in FIG. 35 and each configuration of the wireless base station 103 illustrated in FIG. 30 is, for example, as follows.

The wireless IF 304 corresponds to, for example, an antenna 131 and an antenna duplexer 132, and the wireless process circuit 305 and the BB process circuit 306 corresponds to, for example, a transmission processor 137 and a reception processor 133.

Further, the processor 301 and the storage device 302 correspond to, for example, a UL scheduler 134, a user information manager 135 and a DL scheduler 136, and the wired IF 303 corresponds to, for example, the user information manager 135.

A correlation relationship between each configuration of the wireless base station 103A and each configuration of the wireless base station 103A illustrated in FIG. 30 is, for example, as follows.

The wireless IF 304 corresponds to, for example, the antenna 131 and the antenna duplexer 132, and the wireless process circuit 305 and the BB process circuit 306 correspond to, for example, the transmission processor 137 and the reception processor 133.

Further, the processor 301 and the storage device 302 correspond to, for example, the UL scheduler 134, the user information manager 135 and the DL scheduler 136, and the wired IF 303 corresponds to, for example, the user information manager 135.

FIG. 31 illustrates a hardware configuration example of the wireless terminal 104.

As illustrated in FIG. 31, the wireless terminal 104 includes, for example, a processor 401, a storage device 402, a wireless IF 403 and a wireless process circuit 404.

The processor 401 is a device which processes data, and includes, for example, a CPU, a DSP, a LSI or a FPGA.

The storage device 402 is a device which stores data and includes, for example, a ROM, a RAM, a magnetic disk, an optical disk or a flash memory.

The wireless IF 403 is an interface device which performs wireless communication with the wireless base station 103 or 103A.

The wireless process circuit 404 is a circuit which performs a process such as low noise amplification, frequency conversion into a baseband frequency (down-conversion) and A/D (analog/digital) conversion on wireless signals received by the wireless IF 403, and a process such as D/A conversion of transmission data, frequency conversion into a wireless frequency (up-conversion) and power amplification on the wireless signals transmitted from the wireless IF 403.

A correlation relationship between each configuration of the wireless terminal 104 illustrated in FIG. 36 and each configuration of the wireless terminal 104 illustrated in FIG. 31 is, for example, as follows.

The wireless IF 403 corresponds to, for example, an antenna 141 and an antenna duplexer 142, the wireless process circuit 404 corresponds to, for example, a transmission processor 145 and a reception processor 143 and the processor 401 and the storage device 402 correspond to, for example, a controller 144.

That is, the wireless IF 403 functions as an example of a communicator which performs wireless communication through a connection destination selected by the control station 102 or 102A.

[10] Others

Each configuration, each means and each function of the above wireless communication systems 101 and 101A, the control stations 102 and 102A, the wireless base stations 103 and 103A and the wireless terminals 104 may be taken and left when necessary or may be optionally combined. That is, each configuration and each function may be taken and left or may be optionally combined and used to fulfill the above function of the present disclosure.

Alternatively, the above serving cell selection (determination) process targets may be, for example, all wireless terminals 104 which are connected to the wireless communication system 101 or 101A or may be limited to the wireless terminals 104 which are actually performing communication.

Alternatively, the above serving cell selection (determination) process targets may be, for example, the wireless terminals 104 which continue communication for a certain time or more or may be limited to the wireless terminals 104 whose moving speeds are smaller than a certain speed.

The present disclosure has been described with reference to the embodiments. The present disclosure is not limited to the above embodiments. Various changes which one of ordinary skill in the art can understand can be applied to the configurations and the details of the present disclosure within the scope of the present invention.

In addition, in the each of the embodiments, each function of the control stations, the wireless base stations and/or the wireless terminals can be realized when the processors execute programs (software). In this case, the programs may be stored in computer-readable recording media. For example, the recording media are portable media such as flexible disks, optimal disks, magnetooptical disks and semiconductor memories.

Further, an arbitrary combination of the above embodiments and modified examples may be adopted as another modified example of the embodiments within the scope of the present invention.

According to the above disclosure, it is possible to prevent a throughput of a wireless communication system from lowering.

All examples and conditional language provided herein are intended for pedagogical purposes of aiding the reader in understanding the invention and the concepts contributed by the inventor to furthering the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system comprising:
a plurality of wireless terminals; and
a control device which selects connection destinations of the plurality of wireless terminals from a plurality of connection destination candidates, wherein
the control device includes a processor which selects the connection destinations of the plurality of wireless terminals from the plurality of connection destination candidates to maximize an evaluation value based on each of data rates in cases where each of the wireless terminals is connected to each of the connection destination candidates and each of resource allocation rates for each of the wireless terminals at each of the connection destination candidates,
wherein the processor uses as the evaluation value a logarithm of a geometric mean of sum values for the plurality of wireless terminals based on each of the data rates and each of the resource allocation rates, the sum values obtained by summing throughputs for the connection destination candidates in cases where each of the wireless terminals is connected to each of the connection destination candidates, and
each of the wireless terminals includes a communicator which performs wireless communication through the connection destinations selected by the processor.

2. The wireless communication system according to claim 1, wherein the processor calculates the data rates based on information related to reception power strengths of wireless signals which the plurality of wireless terminals can receive from the plurality of connection destination candidates.

3. The wireless communication system according to claim 1, wherein the processor
calculates each of the resource allocation rates to maximize the evaluation value, and
selects the connection destinations of the plurality of wireless terminals from the plurality of the connection destination candidates based on each of the calculated resource allocation rates.

4. The wireless communication system according to claim 3, wherein the processor is configured to calculate the resource allocation rate $p_{n,i}$ for an n-th (n represents a natural number) wireless terminal at a connection destination candidate #i (i represents a natural number) based on a total value T'$_{n,i}$ of throughputs of the n-th wireless terminal at connection destination candidates #q (q represents a natural number and q≠i) other than the connection destination candidate #i,
a data rate t$_{n,i}$ in cases where the n-th wireless terminal is connected to the connection destination candidate #i,
a parameter μi which is determined to satisfy a constraint condition expressed by following formula (4), and following formula (5).

[Mathematical Formula 35]

$$\sum_n \max\left(\mu_i - \frac{T'_{n,i}}{t_{n,i}}, 0\right) = 1 \quad (4)$$

[Mathematical Formula 36]

$$p_{n,i} = \max\left(\mu_i - \frac{T'_{n,i}}{t_{n,i}}, 0\right). \quad (5)$$

5. The wireless communication system according to claim 3, wherein the processor is configured to calculate the resource allocation rate p$_{n,i,k}$ for an n-th (n represents a natural number) wireless terminal at a connection destination candidate #i (i represents a natural number) in a period #k (k represents a natural number) based on
a total value T'$_{n,i,k}$ of throughputs of the n-th wireless terminal at connection destination candidates #q (q represents a natural number and q≠i) other than the connection destination candidate #i in the period #k,
a data rate t$_{n,i,k}$ in cases where the n-th wireless terminal is connected to the connection destination candidate #i in the period #k,
a parameter μ$_{i,k}$ which is determined to satisfy a constraint condition expressed by following formula (11),
an allocatable resource rate (β$_{i,k}$ which is set to a rate of a duration of the period with respect to the cycle when communication can be performed in the period #k and which is set to 0 when communication can not be performed in the period #k, and
following formula (12).

[Mathematical Formula 37]

$$\sum_n \max\left(\mu_{i,k} - \frac{T'_{n,i,k}}{t_{n,i,k}}, 0\right) = \beta_{i,k} \quad (11)$$

[Mathematical Formula 38]

$$p_{n,i,k} = \max\left(\mu_{i,k} - \frac{T'_{n,i,k}}{t_{n,i,k}}, 0\right). \quad (12)$$

6. The wireless communication system according to claim 3, wherein the processor selects a connection destination candidate as the connection destination of the wireless terminal in descending order of the calculated resource allocation rate.

7. The wireless communication system according to claim 3, wherein, when the calculated resource rate is lower than a threshold value, the processor does not select a connection destination candidate corresponding to the resource allocation rate as a connection destination of the wireless terminal.

8. The wireless communication system according to claim 1, wherein the wireless communication system includes a plurality of periods whose data rates are different in a cycle.

9. The wireless communication system according to claim 8, wherein the processor
calculates each of the resource allocation rates to maximize the evaluation value, and
selects the connection destinations of the plurality of wireless terminals in each of the periods from the plurality of the connection destination candidates based on each of the calculated resource allocation rates.

10. The wireless communication system according to claim 1, wherein the processor calculates a resource allocation rate for one wireless terminal at one connection destination candidate based on each of data rates at other connection destination candidates, each of date rates at the one connection destination candidate and resource allocation rates for other wireless terminals at the other connection destination candidates.

11. The wireless communication system according to claim 10, wherein the processor sequentially performs processes for the connection destination candidates, the processes being for calculating the resource allocation rates for the one wireless terminal at respective connection destination candidates.

12. A communication control method of a wireless communication system which comprises:
a plurality of wireless terminals; and
a control device which selects connection destinations of the plurality of wireless terminals from a plurality of connection destination candidates, wherein
the control device selects the connection destinations of the plurality of wireless terminals from the plurality of connection destination candidates to maximize an evaluation value based on each of data rates in cases where each of the wireless terminals is connected to each of the connection destination candidates and each of resource allocation rates for each of the wireless terminals at each of the connection destination candidates,
wherein the control device uses as the evaluation value a logarithm of a geometric mean of sum values for the plurality of wireless terminals based on each of the data rates and each of the resource allocation rates, the sum values obtained by summing throughputs for the connection destination candidates in cases where each of the wireless terminals is connected to each of the connection destination candidates, and
each of the wireless terminals performs wireless communication through the connection destination selected by the control device.

13. A control device of a wireless communication system which comprises:
a plurality of wireless terminals; and
the control device which selects connection destinations of the plurality of wireless terminals from a plurality of connection destination candidates, the control device comprising
a processor which selects the connection destinations of the plurality of wireless terminals from the plurality of connection destination candidates to maximize an evaluation value based on each of data rates in cases where each of the wireless terminals is connected to each of the connection destination candidates and each of resource allocation rates for each of the wireless terminals at each of the connection destination candidates, and which controls the connection destinations of the plurality of wireless terminals based on a result of the selection, wherein the processor uses as the evaluation value a logarithm of a geometric mean of sum values for the plurality of wireless terminals based on each of the data rates and each of the resource allocation rates, the sum values obtained by summing throughputs for the connection destination candidates in cases where each of the wireless terminals is connected to each of the connection destination candidates.

14. A wireless terminal of a wireless communication system which comprises:

a plurality of wireless terminals including the wireless terminal; and a control device which selects connection destinations of the plurality of wireless terminals from a plurality of connection destination candidates, the wireless terminal comprising a communicator which performs wireless communication through a connection destination selected by the control device, the control device selecting the connection destinations of the plurality of wireless terminals from the plurality of connection destination candidates to maximize an evaluation value based on each of data rates in cases where each of the wireless terminals is connected to each of the connection destination candidates and each of resource allocation rates for each of the wireless terminals at each of the connection destination candidates, and controlling the connection destinations of the plurality of wireless terminals based on a result of the selection, wherein the control device uses as the evaluation value a logarithm of a geometric mean of sum values for the plurality of wireless terminals based on each of the data rates and each of the resource allocation rates, the sum values obtained by summing throughputs for the connection destination candidates in cases where each of the wireless terminals is connected to each of the connection destination candidates.

15. A control device of a wireless communication system which comprises:

a plurality of wireless terminals; and the control device which selects connection destinations of the plurality of wireless terminals from a plurality of connection destination candidates, the control device comprising a processor which selects the connection destinations, to which the wireless terminals are to be connected, from the plurality of connection destination candidates based on each of data rates in cases where each of the wireless terminals is connected to each of the connection destination candidates and each connected terminal number, which is the number of the wireless terminals to be connected to each of the connection destination candidates, wherein the processor is configured to calculate for each pair of a wireless terminal and a connection destination candidate a metric value based on each of data rates in cases where the wireless terminal is connected to each of the connection destination candidates and each connected terminal number which is the number of the wireless terminals to be connected to each of the connection destination candidates, and select a connection destination candidate of a pair as a connection destination to which a wireless terminal of the pair, for which the calculated metric value is maximum, is to be connected, and the metric value increases as a first value increases and increases as a second value decreases, the first value being obtained by dividing a data rate in cases where a wireless terminal of a calculation target pair is connected to a connection destination candidate of the pair by a connected terminal number, which is the number of the wireless terminals to be connected to the connection destination candidate of the pair, the second value being obtained by summing values for all of the plurality of connection destination candidates or all of connection destination candidates other than the connection destination candidate of the pair among the plurality of connection destination candidates, each of the values being obtained by dividing a data rate in cases where the wireless terminal of the pair is connected to a connection destination candidate by a connected terminal number, which is the number of the wireless terminals to be connected to the connection destination candidate.

16. The control device according to claim 15, wherein the metric value is obtained by dividing the first value by the second value.

17. The control device according to claim 15, wherein the processor calculates each of the data rates based on information related to reception power strengths of wireless signals which the plurality of wireless terminals can receive from the plurality of connection destination candidates.

18. The control device according to claim 15, wherein the processor is configured to calculate the metric value based on the connected terminal number having been changed by the determination, and repeatedly execute a selection process of selecting a connection destination candidate of a pair, for which the calculated metric value is maximum among the calculated metric values for pairs other than the pair for which the determination has already been performed, as a connection destination to which a wireless terminal of the pair is to be connected.

19. The control device according to claim 18, wherein the processor is configured to repeatedly execute the selection process until the number of times of selecting a connection destination candidate which is different from the connection destination to which the wireless terminal has already been connected, as a connection destination to which the wireless terminal is to be connected is equal to or more than a change count threshold value.

20. The control device according to claim 15, wherein the metric value is based on whether a wireless terminal of a calculation target pair has already been connected to a connection destination candidate of the pair.

21. A control device of a wireless communication system which comprises:

a plurality of wireless terminals; and the control device which selects connection destinations of the plurality of wireless terminals from a plurality of connection destination candidates, the control device comprising a processor which selects the connection destinations, to which the wireless terminals are to be connected, from the plurality of connection destination candidates based on each of data rates in cases where each of the wireless terminals is connected to each of the connection destination candidates and each connected terminal number, which is the number of the wireless terminals to be connected to each of the connection destination candidates, wherein the wireless communication system includes a plurality of periods whose data rates are different in a cycle, and the processor is configured to calculate for each pair of a wireless terminal, a connection destination candidate and a period a metric value based on each of data rates in cases where the wireless terminal is connected to each of the connection destination candidates in the period, and each connected terminal number which is the number of the wireless terminals to be connected to each of the connection destination candidates in the period, and select a connection destination candidate of a pair as a connection destination to which a wireless terminal of the pair, for which the calculated metrical value is maximum, is to be connected in a period of the pair.

22. The control device according to claim 21, wherein the metric value increases as a first value increases and increases as a second value decreases, the first value being obtained by dividing a data rate in cases where a wireless terminal of a calculation target pair is connected to a connection destination candidate of the pair in a period of the pair by a connected terminal number, which is the number of the wireless terminals to be connected to the connection destination candidate of the pair in the period of the pair, the second value being obtained by summing values for all of the plurality of connection destination candidates or all of connection destination candidates other than the connection destination candidate of the pair among the plurality of connection destination candidates and for all of the plurality of periods, each of the values being obtained by dividing a data rate in cases where the wireless terminal of the pair is connected to a connection destination candidate in a period by a connected terminal number, which is the number of the wireless terminals to be connected to the connection destination candidate in the period.

23. The control device according to claim 22, wherein the metric value is obtained by dividing the first value by the second value.

24. The control device according to claim 21, wherein the processor is configured to calculate the metric value based on the connected terminal number having been changed by the determination, and repeatedly execute a selection process of selecting a connection destination candidate of a pair, for which the calculated metric value is maximum among the calculated metric values for pairs other than the pair for which the determination has already been performed, as a connection destination to which a wireless terminal of the pair is to be connected.

25. The control device according to claim 24, wherein the processor is configured to repeatedly execute the selection process until the number of times of selecting a connection destination candidate which is different from the connection destination to which the wireless terminal has already been connected, as a connection destination to which the wireless terminal is to be connected is equal to or more than a change count threshold value.

26. The control device according to claim 21, wherein the metric value is based on whether a wireless terminal of a calculation target pair has already been connected to a connection destination candidate of the pair.

27. A control method of a wireless communication system which comprises:
  a plurality of wireless terminals; and
  a control device which selects connection destinations of the plurality of wireless terminals from a plurality of connection destination candidates, the control method comprising selecting the connection destinations, to which the wireless terminals are to be connected, from the plurality of connection destination candidates based on each of data rates in cases where each of the wireless terminals is connected to each of the connection destination candidates and each connected terminal number which is the number of the wireless terminals connected to each of the connection destination candidates,
  wherein the selecting includes calculating for each pair of a wireless terminal and a connection destination candidate a metric value based on each of data rates in cases where the wireless terminal is connected to each of the connection destination candidates and each connected terminal number which is the number of the wireless terminals to be connected to each of the connection destination candidates, and selecting a connection destination candidate of a pair as a connection destination to which a wireless terminal of the pair, for which the calculated metric value is maximum, is to be connected, and
  the metric value increases as a first value increases and increases as a second value decreases, the first value being obtained by dividing a data rate in cases where a wireless terminal of a calculation target pair is connected to a connection destination candidate of the pair by a connected terminal number, which is the number of the wireless terminals to be connected to the connection destination candidate of the pair, the second value being obtained by summing values for all of the plurality of connection destination candidates or all of connection destination candidates other than the connection destination candidate of the pair among the plurality of connection destination candidates, each of the values being obtained by dividing a data rate in cases where the wireless terminal of the pair is connected to a connection destination candidate by a connected terminal number, which is the number of the wireless terminals to be connected to the connection destination candidate.

28. A non-transitory computer-readable recording medium having stored therein a program for causing a computer to execute a process for controlling a control device of a wireless communication system which comprises:
  a plurality of wireless terminals; and
  the control device which selects connection destinations of the plurality of wireless terminals from a plurality of connection destination candidates, the process comprising
  selecting the connection destinations, to which the wireless terminals are to be connected, from the plurality of connection destination candidates based on each of data rates in cases where each of the wireless terminals is connected to each of the connection destination candidates and each connected terminal number which is the number of the wireless terminals connected to each of the connection destination candidates,
  wherein the selecting includes calculating for each pair of a wireless terminal and a connection destination candidate a metric value based on each of data rates in cases where the wireless terminal is connected to each of the connection destination candidates and each connected terminal number which is the number of the wireless terminals to be connected to each of the connection destination candidates, and selecting a connection destination candidate of a pair as a connection destination to which a wireless terminal of the pair, for which the calculated metric value is maximum, is to be connected, and the metric value increases as a first value increases and increases as a second value decreases, the first value being obtained by dividing a data rate in cases where a wireless terminal of a calculation target pair is connected to a connection destination candidate of the pair by a connected terminal number, which is the number of the wireless terminals to be connected to the connection destination candidate of the pair, the second value being obtained by summing values for all of the plurality of connection destination candidates or all of connection destination candidates other than the connection destination candidate of the pair among the plurality of connection destination candidates, each of the values being obtained by dividing a data rate in cases where the wireless terminal of the pair is connected to a connection destination candidate by a connected terminal number, which is the number of the wireless terminals to be connected to the connection destination candidate.

* * * * *